US012669981B2

(12) United States Patent
Fan et al.

(10) Patent No.: US 12,669,981 B2
(45) Date of Patent: Jun. 30, 2026

(54) MULTI-MODE FUSION MULTIPLIER

(71) Applicant: HUAWEI TECHNOLOGIES CO., LTD., Shenzhen (CN)

(72) Inventors: Tuanbao Fan, Shanghai (CN); Yuexing Jiang, Shanghai (CN); Xiaoshan Shi, Shanghai (CN); Zhao Yang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1003 days.

(21) Appl. No.: 17/879,021

(22) Filed: Aug. 2, 2022

(65) Prior Publication Data

US 2022/0374205 A1 Nov. 24, 2022

Related U.S. Application Data

(63) Continuation of application No. PCT/CN2020/082840, filed on Apr. 1, 2020.

(51) Int. Cl.
*G06F 7/544* (2006.01)
*G06F 7/53* (2006.01)

(52) U.S. Cl.
CPC .............. *G06F 7/5443* (2013.01); *G06F 7/53* (2013.01); *G06F 7/5318* (2013.01)

(58) Field of Classification Search
CPC .......... G06F 7/523; G06F 7/53; G06F 7/5306; G06F 7/5318; G06F 7/5443; G06F 7/575
See application file for complete search history.

(56) References Cited

U.S. PATENT DOCUMENTS 5,303,178 A * 4/1994 Ozaki ................... G06F 7/5443
708/632
2005/0144215 A1* 6/2005 Simkins ................ G06F 7/5443
708/620

(Continued)

FOREIGN PATENT DOCUMENTS

CN 102360276 A 2/2012
CN 110058840 A 7/2019

(Continued)

OTHER PUBLICATIONS

Extended European Search Report for Application No. 20928129 dated Nov. 28, 2022, 9 pages.

(Continued)

*Primary Examiner* — Emily E Larocque

(57) ABSTRACT

A multiplier is configured to implement a binary single-multiplication operation $A[m_1-1:0] \times B[m_2-1:0]$, or an accumulated sum operation of 2N binary multiplications $A0[m_3-1:0] \times B0[m_4-1:0]$. The multiplier includes P precoders, Q groups of fusion coders, and a compressor. The P precoders and the Q groups of fusion coders are configured to code a first value and a second value in the single-multiplication operation or the multi-multiplication accumulated sum operation, and output a plurality of partial products to the compressor. In an example implementation, the compressor may be configured to compress the plurality of partial products corresponding to the single-multiplication operation or the multi-multiplication accumulated sum operation to obtain two accumulated values.

18 Claims, 28 Drawing Sheets

(56) References Cited

U.S. PATENT DOCUMENTS

| | | | |
|---|---|---|---|
| 2006/0253520 A1 | 11/2006 | Tran | |
| 2013/0144927 A1 | 6/2013 | Arekapudi et al. | |
| 2018/0246855 A1* | 8/2018 | Redfern | ................ G06F 3/0647 |

FOREIGN PATENT DOCUMENTS

| | | | | |
|---|---|---|---|---|
| CN | 110196709 | A | | 9/2019 |
| CN | 210006030 | U | * | 1/2020 |
| EP | 1178398 | A1 | | 2/2002 |

OTHER PUBLICATIONS

PCT International Search Report for Application No. PCT/CN2020/082840 dated Apr. 1, 2020, 10 pages.

* cited by examiner (a)

(b)

(a)

(b)

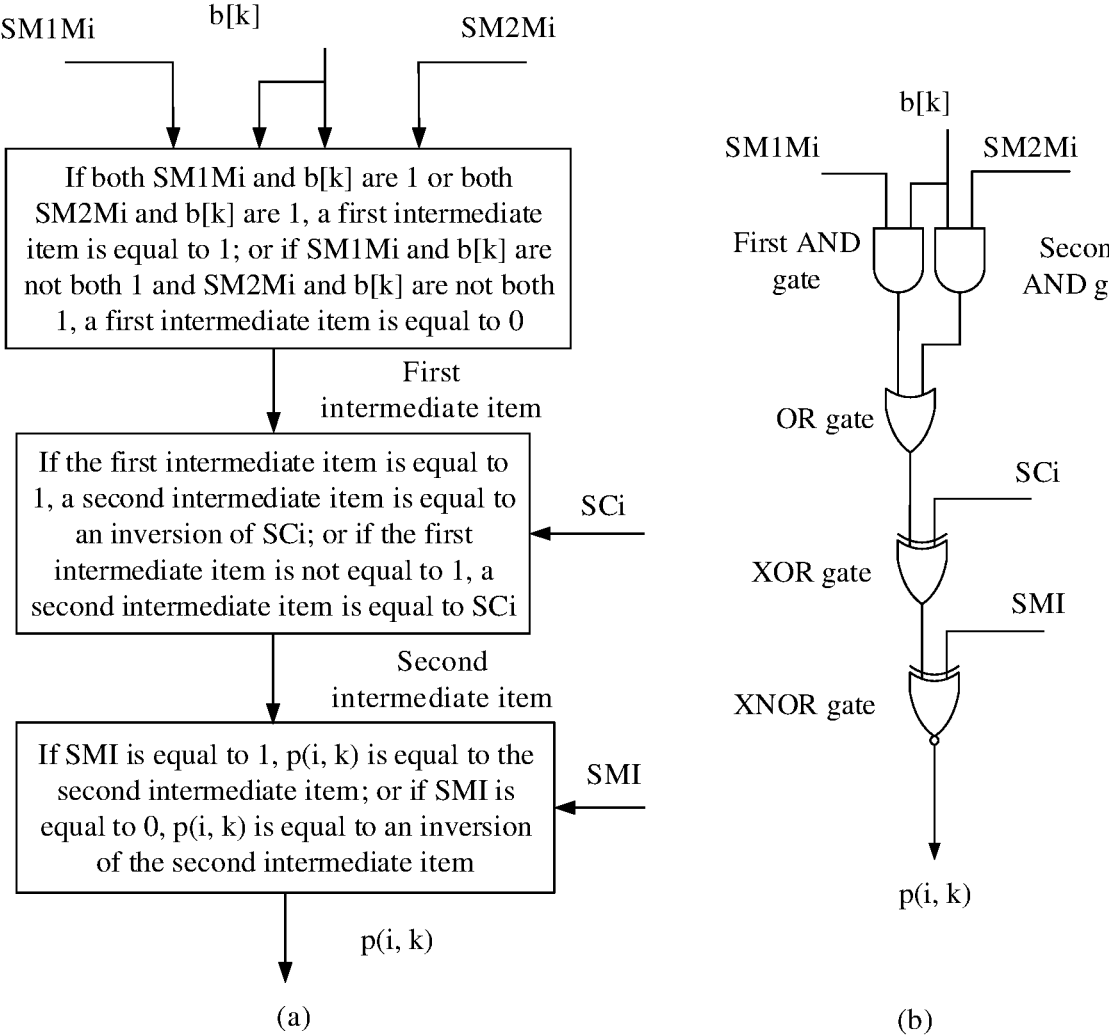

SM1Mi          b[k]                    SM2Mi

If both SM1Mi and b[k] are 1 or both
SM2Mi and b[k] are 1, a first intermediate
item is equal to 1; or if SM1Mi and b[k] are
not both 1 and SM2Mi and b[k] are not both
1, a first intermediate item is equal to 0

First
intermediate item

If the first intermediate item is equal to
1, a second intermediate item is equal to          SCi
an inversion of SCi; or if the first
intermediate item is not equal to 1, a
second intermediate item is equal to SCi Second
intermediate item If SMI is equal to 1, p(i, k) is equal to the
second intermediate item; or if SMI is          SMI
equal to 0, p(i, k) is equal to an inversion
of the second intermediate item p(i, k)

(a)

b[k]

SM1Mi          SM2Mi

First AND                     Second
gate                        AND gate

OR gate

SCi

XOR gate

SMI

XNOR gate p(i, k)

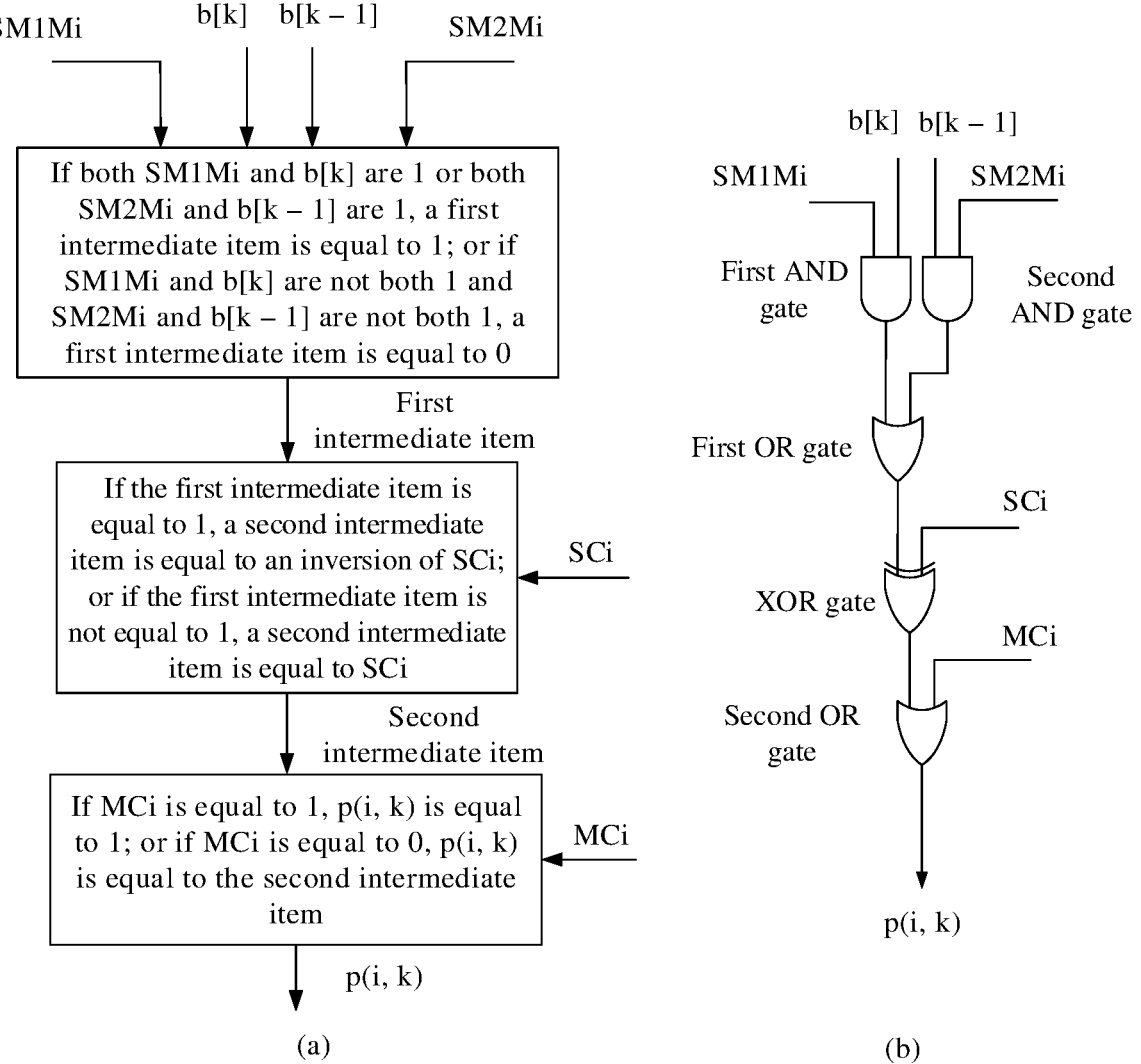

SM1Mi        b[k]    b[k − 1]        SM2Mi

If both SM1Mi and b[k] are 1 or both SM2Mi and b[k − 1] are 1, a first intermediate item is equal to 1; or if SM1Mi and b[k] are not both 1 and SM2Mi and b[k − 1] are not both 1, a first intermediate item is equal to 0

First intermediate item

If the first intermediate item is equal to 1, a second intermediate item is equal to an inversion of SCi; or if the first intermediate item is not equal to 1, a second intermediate item is equal to SCi SCi Second intermediate item If MCi is equal to 1, p(i, k) is equal to 1; or if MCi is equal to 0, p(i, k) is equal to the second intermediate item MCi p(i, k)

(a)

b[k]   b[k − 1]

SM1Mi                    SM2Mi

First AND gate                    Second AND gate

First OR gate

SCi

XOR gate

MCi

Second OR gate p(i, k)

MULTI-MODE FUSION MULTIPLIER

CROSS-REFERENCE TO RELATED APPLICATIONS

This application is a continuation of International Application No. PCT/CN2020/082840, filed on Apr. 1, 2020, which is hereby incorporated by reference in its entirety.

TECHNICAL FIELD

This application relates to the field of electronic technologies, and in particular, to a multi-mode fusion multiplier.

BACKGROUND

With continuous development and maturity of artificial intelligence (AI) technologies, the AI technologies have been gradually popularized in communications devices such as servers and terminals. The AI technology requires a relatively high computing capability of a processor such as a central processing unit (CPU), a neural-network processing unit (NPU), a graphics processing unit (GPU), or a digital signal processor (DSP) in the communications device. As a core computing unit of the processor, a multiplier plays an increasingly important role.

To support multiplication operations in different modes, an existing multi-mode multiplier is usually implemented in a manner of multiplexing standard multipliers. For example, an int (integer) 8 bit multiplexing multiplier shown in FIG. 1 is used as an example. The multiplier includes standard multipliers M1 and M2 and an adder, and may be configured to support multiplication operations in two modes, that is, an 8 bit multiplication and an accumulated sum operation of two int 4 bit multiplications. The standard multiplier M1 implements the 8 bit multiplication and a 4 bit multiplication through multiplexing, A0 and B0 represent multiplicators, and when M1 implements the 4 bit multiplication, sign extension is performed on high bits A0[7:4] and B0[7:4] of the multiplicators. The standard multiplier M2 implements a 4 bit multiplication, A1 and B1 represent multiplicators, and M2 cannot be multiplexed. The adder is configured to calculate a sum of products of the two 4 bit multiplications.

FIG. 2 is a schematic diagram of a structure of an int 8 bit multiplexing multiplier, and the multiplier includes standard multipliers M1 and M2, a compressor 0, and an adder. The standard multiplier M1 includes a coder 1 for coding A0[7:0] and B0[7:0], and a compressor 1 for compressing a partial product that is output by the coder 1. The standard multiplier M2 includes a coder 2 for coding A1[3:0] and B1[3:0], and a compressor 2 for compressing a partial product that is output by the coder 2. The compressor 0 is configured to compress output values (out11 and out12, and out21 and out22) that are output by the standard multipliers M1 and M2. The adder is configured to calculate a sum of two output values (out01 and out02) that are output by the compressor 0, to obtain a product out[15/8:0]. The compressor 0, the compressor 1, and the compressor 2 are all compressors designed based on the Wallace Tree algorithm, and both the coder 1 and the coder 2 are coders based on the Booth algorithm. In the multiplier shown in FIG. 2, the standard multipliers M1 and M2 are independent of each other. After the standard multipliers M1 and M2 complete related operations and output out11 and out12, and out21 and out22, the Wallace compressor 0 performs compression.

Based on the structure of the multiplier shown in FIG. 2, the multiplier requires a total of 52 coder units and 38 full adders, and therefore occupies a large area. In addition, the Wallace compressor includes a plurality of layers of full adders, and execution of a plurality of full adders included in each layer of full adders is serial. Therefore, a long operation time is required, and power consumption of the multiplier is relatively high.

SUMMARY

This application provides a multi-mode fusion multiplier, to reduce an operation time and power consumption of the multiplier. To achieve the foregoing objective, the following technical solutions are used in this application:

According to a first aspect, a multi-mode fusion multiplier is provided, configured to implement a binary single-multiplication operation $A[m_1-1:0] \times B[m_2-1:0]$, or an accumulated sum operation of 2N binary multiplications $A0[m_3-1:0] \times B0[m_4-1:0]$, where $m_1 > 2N \times m_3$, $m_2 \geq 2N \times m_4$, and N is a positive integer. The multi-mode fusion multiplier includes P precoders, Q groups of fusion coders, and a compressor, and $m_1$, $m_2$, $m_3$, $m_4$, P, and Q are integers greater than 1. The P precoders are configured to precode a first value based on a single-multiplication indication signal or a multi-multiplication indication signal, to obtain a precoding result, where the first value is $A[m_1-1:0]$ when the single-multiplication indication signal indicates that the single-multiplication operation is performed, or the first value includes 2N pieces of $A0[m_3-1:0]$ when the multi-multiplication indication signal indicates that the accumulated sum operation is performed, where the 2N pieces of $A0[m_3-1:0]$ are arranged in a sequence from a low digit weight to a high digit weight. The Q groups of fusion coders are configured to code the precoding result and a second value, to obtain a plurality of partial products, where the second value is $B[m_2-1:0]$ when the single-multiplication indication signal indicates that the single-multiplication operation is performed, or the second value includes 2N pieces of $B0[m_4-1:0]$ when the multi-multiplication indication signal indicates that the accumulated sum operation is performed, where the 2N pieces of $B0[m_4-1:0]$ are arranged in a sequence from a high digit weight to a low digit weight. The compressor is configured to compress the plurality of partial products, to obtain two accumulated values, where a sum of the two accumulated values is a result of the single-multiplication operation or the accumulated sum operation.

In the foregoing technical solution, the fusion coders may all be configured to code a value in the single-multiplication operation or the multi-multiplication accumulated sum operation, and output the plurality of partial products to the compressor. The compressor may be configured to compress the plurality of partial products corresponding to the single-multiplication operation or the multi-multiplication accumulated sum operation to obtain the two accumulated values. Finally, an adder calculates a sum of the two accumulated values to obtain the result of the single-multiplication operation or the accumulated sum operation. Therefore, compared with a multiplier that supports two different multiplication modes in the conventional technology, the multiplier provided in embodiments of this application does not need to separately code and compress values in two different multiplication modes by using different coders or compressors, so that a quantity of coders required by the multiplier is reduced, operation duration is shortened, and power consumption of the multiplier is reduced.

In a possible implementation of the first aspect, when $m_1 > 2N \times m_3$, first $(m_1 - 2N \times m_3)$ high digit weights in the first value are filled with sign bits; and/or when $m_2 > 2N \times m_4$, last $(m_2-2N\times m_4)$ low digit weights in the second value are filled with invalid bits. In the foregoing possible implementation, a same fusion coder can be configured to precode and code a value in the single-multiplication operation or the multi-multiplication accumulated sum operation, so that a quantity of coders required by the multiplier is reduced.

In a possible implementation of the first aspect, the P precoders include an $i^{th}$ precoder, configured to: determine an $i^{th}$ group of selection signals, an $i^{th}$ group of single-multiplication selection signals, a single-multiplication control signal SCi, and a first multi-multiplication control signal MCi in the precoder result based on the single-multiplication indication signal, the multi-multiplication indication signal, and at least two bits in the first value when $0\le i\le N\times m_3-1$, where i is an even number; or determine an $i^{th}$ group of selection signals, an group of single-multiplication selection signals, a single-multiplication control signal SCi, a second multi-multiplication control signal MCNi, and a control signal Si in the precoder result based on the single-multiplication indication signal, the multi-multiplication indication signal, and at least two bits in the first value when $N\times m_3\le i\le m_1-1$, where i is an even number. The $i^{th}$ group of selection signals includes a first selection signal M1Mi and a second selection signal M2Mi, and the $i^{th}$ group of single-multiplication selection signals includes a first single-multiplication selection signal SM1Mi and a second single-multiplication selection signal SM2Mi. In the foregoing possible implementation, a same precoder can be configured to precode a value in the single-multiplication operation or the multi-multiplication accumulated sum operation, so that a quantity of precoders required by the multiplier is reduced.

In a possible implementation of the first aspect, when i is equal to 0, the at least two bits include a first bit a[0] and a second bit a[1] in the first value; and the $0^{th}$ precoder is configured to perform the following coding operations: setting the first selection signal M1M0 to the first bit a[0]; setting the second selection signal M2M0 to 1 when the first bit a[0] is 0 and the second bit a[1] is 1; or setting the second selection signal M2M0 to 0 when the first bit a[0] is not 0 or the second bit a[1] is not 1; setting the single-multiplication control signal SC0 to the second bit a[1] when the single-multiplication indication signal is 1; or setting the single-multiplication control signal SC0 to 0 when the single-multiplication indication signal is 0; setting the first multi-multiplication control signal MC0 to the second bit a[1] when the multi-multiplication indication signal is 1; or setting the first multi-multiplication control signal MC0 to 0 when the multi-multiplication indication signal is 0; and setting the first single-multiplication selection signal SM1M0 to the first bit a[0] and setting the second single-multiplication selection signal SM2M0 to the second selection signal M2M0 when the single-multiplication indication signal is 1; or setting both the first single-multiplication selection signal SM1M0 and the second single-multiplication selection signal SM2M0 to 0 when the single-multiplication indication signal is 0. In the foregoing possible implementation, the provided precoder can be configured to precode the first value in the single-multiplication operation or the multi-multiplication accumulated sum operation, so that a quantity of precoders required by the multiplier is reduced.

In a possible implementation of the first aspect, the $0^{th}$ precoder includes five AND gates and one NOT gate. An input end of the NOT gate is configured to receive the first bit a[0], an output end of the NOT gate is coupled to one input end of the first AND gate in the five AND gates, the other input end of the first AND gate is configured to receive the second bit a[1], and an output end of the first AND gate is configured to output the second selection signal M2M0. One input end of the second AND gate and one input end of the third AND gate in the five AND gates are both configured to receive the second bit a[1], the other input end of the second AND gate is configured to receive the single-multiplication indication signal, an output end of the second AND gate is configured to output the single-multiplication control signal SC0, the other input end of the third AND gate is configured to receive the multi-multiplication indication signal, and an output end of the third AND gate is configured to output the first multi-multiplication control signal MC0. One input end of the fourth AND gate and one input end of the fifth AND gate in the five AND gates are configured to receive the single-multiplication indication signal, the other input end of the fourth AND gate is configured to receive the first bit a[0], an output end of the fourth AND gate is configured to output the first single-multiplication selection signal SM1M0, the other input end of the fifth AND gate is coupled to the output end of the first AND gate, and an output end of the fifth AND gate is configured to output the second single-multiplication selection signal SM2M0.

In a possible implementation of the first aspect, when $0<i\le N\times m_3-1$, the at least two bits include a first bit a[i−1], a second bit a[i], and a third bit a[i+1] in the first value; and the $i^{th}$ precoder is configured to perform the following coding operations: setting the first selection signal M1M1 to 1 when the first bit a[i−1] is not equal to the second bit a[i]; or setting the first selection signal M1Mi to 0 when the first bit a[i−1] is equal to the second bit a[i]; setting the second selection signal M2Mi to 1 when the first bit a[i−1] is equal to the second bit a[i] and the second bit a[i] is not equal to the third bit a[i+1]; or setting the second selection signal M2Mi to 0 when the first bit a[i−1] is not equal to the second bit a[i] or the second bit a[i] is equal to the third bit a[i+1]; setting the single-multiplication control signal SCi to the third bit a[i+1] when the single-multiplication indication signal is 1; or setting the single-multiplication control signal SCi to 0 when the single-multiplication indication signal is 0; setting the first multi-multiplication control signal MCi to the third bit a[i+1] when the multi-multiplication indication signal is 1; or setting the first multi-multiplication control signal MCi to 0 when the multi-multiplication indication signal is 0; and setting the first single-multiplication selection signal SM1Mi to the first selection signal M1Mi and setting the second single-multiplication selection signal SM2Mi to the second selection signal M2Mi when the single-multiplication indication signal is 1; or setting both the first single-multiplication selection signal SM1Mi and the second single-multiplication selection signal SM2Mi to 0 when the single-multiplication indication signal is 0. In the foregoing possible implementation, the provided precoder can be configured to precode the first value in the single-multiplication operation or the multi-multiplication accumulated sum operation, so that a quantity of precoders required by the multiplier is reduced.

In a possible implementation of the first aspect, when $0<i\le N\times m_3-1$, the $i^{th}$ precoder includes four AND gates, one NOR gate, one XOR gate, and one XNOR gate. Two input ends of the XOR gate are configured to separately receive the first bit a[i−1] and the second bit a[i], and an output end of the XOR gate is configured to output the first selection signal M1Mi. Two input ends of the XNOR gate are separately configured to receive the second bit a[i] and the third bit a[i+1]. Two input ends of the NOR gate are separately coupled to the output end of the XOR gate and an output end of the XNOR gate, and an output end of the NOR gate is configured to output the second selection signal M2Mi. One input end of the first AND gate and one input end of the second AND gate in the four AND gates are both configured to receive the third bit a[i+1], the other input end of the first AND gate is configured to receive the single-multiplication indication signal, an output end of the first AND gate is configured to output the single-multiplication control signal SCi, the other input end of the second AND gate is configured to receive the multi-multiplication indication signal, and an output end of the second AND gate is configured to output the first multi-multiplication control signal MCi. One input end of the third AND gate and one input end of the fourth AND gate in the four AND gates are both configured to receive the single-multiplication indication signal, the other input end of the third AND gate is coupled to the output end of the XOR gate, an output end of the third AND gate is configured to output the first single-multiplication selection signal SM1Mi, the other input end of the fourth AND gate is coupled to the output end of the NOR gate, and an output end of the fourth AND gate is configured to output the second single-multiplication selection signal SM2Mi.

In a possible implementation of the first aspect, when i is equal to $N \times m_3$, the at least two bits include a first bit a[i−1], a second bit a[i], and a third bit a[i+1] in the first value; and the $(N \times m_3)^{th}$ precoder is configured to perform the following coding operations: setting a fourth bit to the first bit a[i−1] when the single-multiplication indication signal is 1; or setting a fourth bit to 0 when the single-multiplication indication signal is 0; setting the first selection signal M1Mi to 1 when the fourth bit is not equal to the second bit a[i]; or setting the first selection signal M1Mi to 0 when the fourth bit is equal to the second bit a[i]; setting the second selection signal M2Mi to 1 when the fourth bit is equal to the second bit ail and the second bit a[i] is not equal to the third bit a[i+1]; or setting the second selection signal M2Mi to 0 when the fourth bit is not equal to the second bit a[i] or the second bit a[i] is equal to the third bit a[i+1]; setting the single-multiplication control signal SCi to the third bit a[i+1] when the single-multiplication indication signal is 1; or setting the single-multiplication control signal SCi to 0 when the single-multiplication indication signal is 0; setting the second multi-multiplication control signal MCNi to 0 when the multi-multiplication indication signal is equal to the third bit a[i+1]; or setting the second multi-multiplication control signal MCNi to 1 when the multi-multiplication indication signal is not equal to the third bit a[i+1]; setting the control signal Si to the third bit a[i+1]; and setting the first single-multiplication selection signal SM1Mi to the first selection signal M1Mi and setting the second single-multiplication selection signal SM2Mi to the second selection signal M2Mi when the single-multiplication indication signal is 1; or setting both the first single-multiplication selection signal SM1Mi and the second single-multiplication selection signal SM2Mi to 0 when the single-multiplication indication signal is 0. In the foregoing possible implementation, the provided precoder can be configured to precode the first value in the single-multiplication operation or the multi-multiplication accumulated sum operation, so that a quantity of precoders required by the multiplier is reduced.

In a possible implementation of the first aspect, when i is equal to $N \times m_3$, the $(N \times m_3)^{th}$ precoder includes four AND gates, one NOR gate, two XOR gates, and one XNOR gate. One input end of the first AND gate in the four AND gates is configured to receive the first bit a[i−1], the other input end of the first AND gate is configured to receive the single-multiplication indication signal, and an output end of the first AND gate is coupled to one input end of the first XOR gate in the two XOR gates. The other input end of the first XOR gate is coupled to one input end of the XNOR gate and is configured to receive the second bit a[i], and an output end of the first XOR gate is configured to output the first selection signal M1Mi. The other input end of the XNOR gate is configured to receive the third bit a[i+1], and an output end of the XNOR gate and the output end of the first XOR gate are separately coupled to two input ends of the NOR gate. An output end of the NOR gate is configured to output the second selection signal M2Mi. One input end of the second AND gate in the four AND gates is coupled to one input end of the second XOR gate in the two XOR gates and is configured to receive the third bit a[i+1], the other input end of the second AND gate is configured to receive the single-multiplication indication signal, and an output end of the second AND gate is configured to output the single-multiplication control signal SCi. The other input end of the second XOR gate is configured to receive the multi-multiplication indication signal, and an output end of the second XOR gate is configured to output the second multi-multiplication control signal MCNi. The third bit a[i+1] is output as the control signal Si. One input end of the third AND gate and one input end of the fourth AND gate in the four AND gates are configured to receive the single-multiplication indication signal, the other input end of the third AND gate is coupled to the output end of the first XOR gate, and an output end of the third AND gate is configured to output the first single-multiplication selection signal SM1Mi. The other input end of the fourth AND gate is coupled to the output end of the NOR gate, and an output end of the fourth AND gate is configured to output the second single-multiplication selection signal SM2Mi.

In a possible implementation of the first aspect, when $N \times m_3 < i < m_1 \leq 1$, the at least two bits include a first bit a[i−1], a second bit a[i], and a third bit a[i+1]; and the precoder is configured to perform the following coding operations: setting the first selection signal M1Mi to 1 when the first bit a[i−1] is not equal to the second bit a[i]; or setting the first selection signal M1Mi to 0 when the first bit a[i−1] is equal to the second bit a[i]; setting the second selection signal M2Mi to 1 when the first bit a[i−1] is equal to the second bit a[i] and the second bit a[i] is not equal to the third bit a[i+1]; or setting the second selection signal M2Mi to 0 when the first bit a[i−1] is not equal to the second bit a[i] or the second bit a[i] is equal to the third bit a[i+1]; setting the single-multiplication control signal SCi to the third bit a[i+1] when the single-multiplication indication signal is 1; or setting the single-multiplication control signal SCi to 0 when the single-multiplication indication signal is 0; setting the second multi-multiplication control signal MCNi to 0 when the multi-multiplication indication signal is equal to the third bit a[i+1]; or setting the second multi-multiplication control signal MCNi to 1 when the multi-multiplication indication signal is not equal to the third bit a[i+1]; setting the first single-multiplication selection signal SM1Mi to the first selection signal M1Mi and setting the second single-multiplication selection signal SM2Mi to the second selection signal M2Mi when the single-multiplication indication signal is 1; or setting both the first single-multiplication selection signal SM1Mi and the second single-multiplication selection signal SM2Mi to 0 when the single-multiplication indication signal is 0; and setting the control signal Si to the third bit a[i+1]. In the foregoing possible implementation, the provided precoder can be configured to precode the first value in the single-multiplication operation or the multi-multiplication accumulated sum operation, so that a quantity of precoders required by the multiplier is reduced.

In a possible implementation of the first aspect, when $N \times m_3 < i \le m_1 - 1$, the $i^{th}$ precoder includes three AND gates, one NOR gate, two XOR gates, and one XNOR gate. One input end of the first XOR gate in the two XOR gates is configured to receive the first bit $a[i-1]$, the other input end of the first XOR gate is coupled to one input end of the XNOR gate and is configured to receive the second bit $a[i]$, and an output end of the first XOR gate is configured to output the first selection signal M1Mi. The other input end of the XNOR gate is configured to receive the third bit $a[i+1]$, and an output end of the XNOR gate and the output end of the first XOR gate are separately coupled to two input ends of the NOR gate. An output end of the NOR gate is configured to output the second selection signal M2Mi. One input end of the first AND gate in the three AND gates is coupled to one input end of the second XOR gate in the two XOR gates and is configured to receive the third bit $a[i+1]$, the other input end of the first AND gate is configured to receive the single-multiplication indication signal, and an output end of the first AND gate is configured to output the single-multiplication control signal SCi. The other input end of the second XOR gate is configured to receive the multi-multiplication indication signal, and an output end of the second XOR gate is configured to output the second multi-multiplication control signal MCNi. The third bit $a[i+1]$ is output as the control signal Si. One input end of the second AND gate and one input end of the third AND gate in the three AND gates are configured to receive the single-multiplication indication signal, the other input end of the second AND gate is coupled to the output end of the first XOR gate, and an output end of the second AND gate is configured to output the first single-multiplication selection signal SM1Mi. The other input end of the third AND gate is coupled to the output end of the NOR gate, and an output end of the third AND gate is configured to output the second single-multiplication selection signal SM2Mi.

In a possible implementation of the first aspect, the Q groups of fusion coders include a first coder, configured to perform the following coding operation: setting a partial product $p(i, k)$ to an inversion of the $i^{th}$ single-multiplication control signal SCi when both the first single-multiplication selection signal SM1Mi and a first bit $b[k]$ in the second value are 1 or both the second single-multiplication selection signal SM2Mi and a second bit $b[k-1]$ in the second value are 1; or setting a partial product $p(i, k)$ to the single-multiplication control signal SCi when the first single-multiplication selection signal SM1Mi and a first bit $b[k]$ in the second value are not both 1 and the second single-multiplication selection signal SM2Mi and a second bit $b[k-1]$ in the second value are not both 1. In the foregoing possible implementation, the provided coder can be configured to code a value in the single-multiplication operation or the multi-multiplication accumulated sum operation, so that a quantity of coders required by the multiplier is reduced.

In a possible implementation of the first aspect, the first coder includes two AND gates, an OR gate, and an XOR gate. Output ends of the two AND gates are separately connected to two input ends of the OR gate, and an output end of the OR gate is connected to one input end of the XOR gate. Two input ends of the two AND gates are configured to separately receive the first single-multiplication selection signal SM1Mi and the second single-multiplication selection signal SM2Mi, and the other two input ends of the two AND gates are configured to separately receive the first bit $b[k]$ and the second bit $b[k-1]$. The other input end of the XOR gate is configured to receive the single-multiplication control signal SCi, and an output end of the XOR gate is configured to output the partial product $p(i, k)$.

In a possible implementation of the first aspect, the Q groups of fusion coders further include a second coder, configured to perform the following coding operations: setting a first intermediate item to 1 when both the multi-multiplication indication signal and the first bit $b[k-1]$ in the second value are 1 or both the single-multiplication indication signal and the second bit $b[k]$ in the second value are 1; or setting a first intermediate item to 0 when the multi-multiplication indication signal and the first bit $b[k-1]$ in the second value are not both 1 and the single-multiplication indication signal and the second bit $b[k]$ in the second value are not both 1; setting a second intermediate item to 1 when both the first intermediate item and the first selection signal M1Mi are 1 or both the second selection signal M2Mi and the first bit $b[k-1]$ are 1; or setting a second intermediate item to 0 when the first intermediate item and the first selection signal M1Mi are not both 1 and the second selection signal M2Mi and the first bit $b[k-1]$ are not both 1; and setting an inversion of the second multi-multiplication control signal MCNi to a partial product $p(i, k)$ when the second intermediate item is 1; or setting the second multi-multiplication control signal MCNi to a partial product $p(i, k)$ when the second intermediate item is 0. In the foregoing possible implementation, the provided coder can be configured to code a value in the single-multiplication operation or the multi-multiplication accumulated sum operation, so that a quantity of coders required by the multiplier is reduced.

In a possible implementation of the first aspect, the second coder includes four AND gates, two OR gates, and one XOR gate. An output end of the first AND gate and an output end of the second AND gate in the four AND gates are separately coupled to two input ends of the first OR gate in the two OR gates. An output end of the first OR gate is coupled to one input end of the third AND gate in the four AND gates. An output end of the fourth AND gate and an output end of the third AND gate in the four AND gates are coupled to two input ends of the second OR gate in the two OR gates. An output end of the second OR gate is coupled to one input end of the XOR gate. Two input ends of the first AND gate are separately configured to receive the first bit $b[k-1]$ and the multi-multiplication indication signal, two input ends of the second AND gate are separately configured to receive the second bit $b[k]$ and the single-multiplication indication signal, the other input end of the third AND gate is configured to receive the first selection signal M1Mi, and two input ends of the fourth AND gate are separately configured to receive the first bit $b[k-1]$ and the second selection signal M2Mi. The other input end of the XOR gate is configured to receive the second multi-multiplication control signal MCNi, and an output end of the XOR gate is configured to output the partial product $p(i, k)$.

In a possible implementation of the first aspect, the Q groups of fusion coders further include a third coder, configured to perform the following coding operation: setting a partial product $p(i, k)$ to an inversion of the single-multiplication control signal SCi when both the first single-multiplication selection signal SM1Mi and the first bit $b[k]$ in the second value are 1; or setting a partial product $p(i, k)$ to the single-multiplication control signal SCi when the first single-multiplication selection signal SM1Mi and the first bit $b[k]$ in the second value are not both 1. In the foregoing possible implementation, the provided coder can be configured to code a value in the single-multiplication operation or the multi-multiplication accumulated sum operation, so that a quantity of coders required by the multiplier is reduced.

In a possible implementation of the first aspect, the third coder includes one AND gate and one XOR gate. An output end of the AND gate is coupled to one input end of the XOR gate, two input ends of the AND gate are separately configured to receive the first single-multiplication selection signal SM1Mi and the first bit b[k] in the second value, the other input end of the XOR gate is configured to receive the single-multiplication control signal SCi, and an output end of the XOR gate is configured to output the partial product p(i, k).

In a possible implementation of the first aspect, the Q groups of fusion coders further include a fourth coder, configured to perform the following coding operations: setting a first intermediate item to 1 when both the first single-multiplication selection signal SM1Mi and the first bit b[k] in the second value are 1 or both the second single-multiplication selection signal SM2Mi and the second bit b[k−1] in the second value are 1; or setting a first intermediate item to 0 when the first single-multiplication selection signal SM1Mi and the first bit b[k] in the second value are not both 1 and the second single-multiplication selection signal SM2Mi and the second bit b[k−1] in the second value are not both 1; setting a second intermediate item to an inversion of the single-multiplication control signal SCi when the first intermediate item is 1; or setting a second intermediate item to the single-multiplication control signal SCi when the first intermediate item is 0; and setting a partial product p(i, k) to 1 when the multi-multiplication indication signal is 1; or setting a partial product p(i, k) to the second intermediate item when the multi-multiplication indication signal is 0. In the foregoing possible implementation, the provided coder can be configured to code a value in the single-multiplication operation or the multi-multiplication accumulated sum operation, so that a quantity of coders required by the multiplier is reduced.

In a possible implementation of the first aspect, the fourth coder includes two AND gates, two OR gates, and one XOR gate. Output ends of the two AND gates are separately coupled to two input ends of the first OR gate in the two OR gates, an output end of the first OR gate is coupled to one input end of the XOR gate, and an output end of the XOR gate is coupled to one input end of the second OR gate in the two OR gates. Two input ends of the first AND gate in the two AND gates are separately configured to receive the first single-multiplication selection signal SM1Mi and the first bit b[k] in the second value, two input ends of the second AND gate in the two AND gates are separately configured to receive the second single-multiplication selection signal SM2Mi and the second bit b[k−1] in the second value, the other input end of the XOR gate is configured to receive the single-multiplication control signal SCi, and the other input end of the second OR gate is configured to receive the multi-multiplication indication signal.

In a possible implementation of the first aspect, the Q groups of fusion coders further include a fifth coder, configured to perform the following coding operation: setting a partial product p(i, k) to the single-multiplication control signal SCi when both the first single-multiplication selection signal SM1Mi and the first bit KM in the second value are 1 or both the second single-multiplication selection signal SM2Mi and the first bit KM in the second value are 1; or setting a partial product p(i, k) to an inversion of the single-multiplication control signal SCi when the first single-multiplication selection signal SM1Mi and the first bit KM in the second value are not both 1 and the second single-multiplication selection signal SM2Mi and the first bit b[k] in the second value are not both 1. In the foregoing possible implementation, the provided coder can be configured to code a value in the single-multiplication operation or the multi-multiplication accumulated sum operation, so that a quantity of coders required by the multiplier is reduced.

In a possible implementation of the first aspect, the fifth coder includes two AND gates, one OR gate, and one XNOR gate. Output ends of the two AND gates are separately coupled to two input ends of the OR gate, and an output end of the OR gate is coupled to one input end of the XNOR gate. Two input ends of the first AND gate in the two AND gates are separately configured to receive the first single-multiplication selection signal SM1Mi and the first bit KM in the second value, two input ends of the second AND gate in the two AND gates are separately configured to receive the second single-multiplication selection signal SM2Mi and the first bit KM in the second value, the other input end of the XNOR gate is configured to receive the single-multiplication control signal SCi, and an output end of the XNOR gate is configured to output the partial product p(i, k).

In a possible implementation of the first aspect, the Q groups of fusion coders further include a sixth coder, configured to perform the following coding operation: setting a partial product p(i, k) to an inversion of the control signal Si when both the first selection signal M1Mi and the first bit KM in the second value are 1 or both the second selection signal M2Mi and the first bit KM in the second value are 1; or setting a partial product p(i, k) to the control signal Si when the first selection signal M1Mi and the first bit b[k] in the second value are not both 1 and the second selection signal M2Mi and the first bit b[k] in the second value are not both 1. In the foregoing possible implementation, the provided coder can be configured to code a value in the single-multiplication operation or the multi-multiplication accumulated sum operation, so that a quantity of coders required by the multiplier is reduced.

In a possible implementation of the first aspect, the sixth coder includes two AND gates, one OR gate, and one XOR gate. Output ends of the two AND gates are separately coupled to two input ends of the OR gate, and an output end of the OR gate is coupled to one input end of the XOR gate. Two input ends of the first AND gate in the two AND gates are separately configured to receive the first selection signal M1Mi and the first bit b[k] in the second value, two input ends of the second AND gate in the two AND gates are separately configured to receive the second selection signal M2Mi and the first bit b[k] in the second value, the other input end of the XOR gate is configured to receive the control signal Si, and an output end of the XOR gate is configured to output the partial product p(i, k).

In a possible implementation of the first aspect, the Q groups of fusion coders further include a seventh coder, configured to perform the following coding operations: setting a first intermediate item to 1 when both the first single-multiplication selection signal SM1Mi and the first bit b[k] in the second value are 1 or both the second single-multiplication selection signal SM2Mi and the first bit b[k] in the second value are 1; or setting a first intermediate item to 0 when the first single-multiplication selection signal SM1Mi and the first bit b[k] in the second value are not both 1 and the second single-multiplication selection signal SM2Mi and the first bit b[k] in the second value are not both 1; setting a second intermediate item to an inversion of the single-multiplication control signal SCi when the first intermediate item is 1; or setting a second intermediate item to the single-multiplication control signal SCi when the first intermediate item is 0; and setting a partial product p(i, k) to the second intermediate item when the single-multiplication indication signal is 1; or setting a partial product p(i, k) to 0 when the single-multiplication indication signal is 0. In the foregoing possible implementation, the provided coder can be configured to code a value in the single-multiplication operation or the multi-multiplication accumulated sum operation, so that a quantity of coders required by the multiplier is reduced.

In a possible implementation of the first aspect, the seventh coder includes three AND gates, one OR gate, and one XOR gate. An output end of the first AND gate and an output end of the second AND gate in the three AND gates are separately coupled to two input ends of the OR gate, an output end of the OR gate is coupled to one input end of the XOR gate, and an output end of the XOR gate is coupled to one input end of the third AND gate in the three AND gates. Two input ends of the first AND gate are separately configured to receive the first single-multiplication selection signal SM1Mi and the first bit b[k] in the second value, two input ends of the second AND gate are separately configured to receive the second single-multiplication selection signal SM2Mi and the first bit b[k] in the second value, the other input end of the XOR gate is configured to receive the single-multiplication control signal SCi, and the other input end of the third AND gate is configured to receive the single-multiplication indication signal.

In a possible implementation of the first aspect, the Q groups of fusion coders further include an eighth coder, configured to perform the following coding operations: setting a first intermediate item to 1 when both the first single-multiplication selection signal SM1Mi and the first bit b[k] in the second value are 1 or both the second single-multiplication selection signal SM2Mi and the first bit b[k] in the second value are 1; or setting a first intermediate item to 0 when the first single-multiplication selection signal SM1Mi and the first bit b[k] in the second value are not both 1 and the second single-multiplication selection signal SM2Mi and the first bit b[k] in the second value are not both 1; setting a second intermediate item to an inversion of the single-multiplication control signal SCi when the first intermediate item is 1; or setting a second intermediate item to the single-multiplication control signal SCi when the first intermediate item is 0; and setting a partial product p(i, k) to the second intermediate item when the single-multiplication indication signal is 1; or setting a partial product p(i, k) to an inversion of the second intermediate item when the single-multiplication indication signal is 0. In the foregoing possible implementation, the provided coder can be configured to code a value in the single-multiplication operation or the multi-multiplication accumulated sum operation, so that a quantity of coders required by the multiplier is reduced.

In a possible implementation of the first aspect, the eighth coder includes two AND gates, one OR gate, one XOR gate, and one XNOR gate. Two output ends of the two AND gates are separately coupled to two input ends of the OR gate, an output end of the OR gate is coupled to one input end of the XOR gate, and an output end of the XOR gate is coupled to one input end of the XNOR gate. Two input ends of the first AND gate in the two AND gates are separately configured to receive the first single-multiplication selection signal SM1Mi and the first bit b[k] in the second value, two input ends of the second AND gate in the two AND gates are separately configured to receive the second single-multiplication selection signal SM2Mi and the first bit b[k] in the second value, the other input end of the XOR gate is configured to receive the single-multiplication control signal SCi, the other input end of the XNOR gate is configured to receive the single-multiplication indication signal, and an output end of the XNOR gate is configured to output the partial product p(i, k).

In a possible implementation of the first aspect, the Q groups of fusion coders further include a ninth coder, configured to perform the following coding operations: setting a first intermediate item to 1 when both the first single-multiplication selection signal SM1Mi and the first bit b[k] in the second value are 1 or both the second single-multiplication selection signal SM2Mi and the second bit b[k−1] in the second value are 1; or setting a first intermediate item to 0 when the first single-multiplication selection signal SM1Mi and the first bit b[k] in the second value are not both 1 and the second single-multiplication selection signal SM2Mi and the second bit b[k−1] in the second value are not both 1; setting a second intermediate item to an inversion of the single-multiplication control signal SCi when the first intermediate item is 1; or setting a second intermediate item to the single-multiplication control signal SCi when the first intermediate item is 0; and setting a partial product p(i, k) to 1 when the first multi-multiplication control signal MCi is 1; or setting a partial product p(i, k) to the second intermediate item when the first multi-multiplication control signal MCi is 0. In the foregoing possible implementation, the provided coder can be configured to code a value in the single-multiplication operation or the multi-multiplication accumulated sum operation, so that a quantity of coders required by the multiplier is reduced.

In a possible implementation of the first aspect, the ninth coder includes two AND gates, two OR gates, and one XOR gate. Output ends of the two AND gates are separately coupled to two input ends of the first OR gate in the two OR gates, an output end of the first OR gate is coupled to one input end of the XOR gate, and an output end of the XOR gate is coupled to one input end of the second OR gate in the two OR gates. Two input ends of the first AND gate in the two AND gates are separately configured to receive the first single-multiplication selection signal SM1Mi and the first bit b[k] in the second value, two input ends of the second AND gate in the two AND gates are separately configured to receive the second single-multiplication selection signal SM2Mi and the second bit b[k−1] in the second value, the other input end of the XOR gate is configured to receive the single-multiplication control signal SCi, the other input end of the second OR gate is configured to receive the first multi-multiplication control signal MCi, and an output end of the second OR gate is configured to output the partial product p(i, k).

In a possible implementation of the first aspect, the Q groups of fusion coders further include a tenth coder, configured to perform the following coding operations: setting a first intermediate item to 1 when both the multi-multiplication indication signal and the first bit b[k−1] in the second value are 1 or both the single-multiplication indication signal and the second bit b[k] in the second value are 1; or setting a first intermediate item to 0 when the multi-multiplication indication signal and the first bit b[k−1] in the second value are not both 1 and the single-multiplication indication signal and the second bit b[k] in the second value are not both 1; setting a second intermediate item to 1 when both the first intermediate item and the first selection signal M1Mi are 1 or both the second selection signal M2Mi and the first bit b[k−1] are 1; or setting a second intermediate item to 0 when the first intermediate item and the first selection signal M1Mi are not both 1 and the second selection signal M2Mi and the first bit b[k−1] are not both 1; setting a third intermediate item to an inversion of the second multi-multiplication control signal MCNi when the second intermediate item is 1; or setting a third intermediate item to the second multi-multiplication control signal MCNi when the second intermediate item is 0; and setting a partial product $p(i, k)$ to an inversion of the third intermediate item when the multi-multiplication indication signal is 1; or setting a partial product $p(i, k)$ to the third intermediate item when the multi-multiplication indication signal is 0. In the foregoing possible implementation, the provided coder can be configured to code a value in the single-multiplication operation or the multi-multiplication accumulated sum operation, so that a quantity of coders required by the multiplier is reduced.

In a possible implementation of the first aspect, the tenth coder includes four AND gates, two OR gates, and two XOR gates. An output end of the first AND gate and an output end of the second AND gate in the four AND gates are separately coupled to two input ends of the first OR gate in the two OR gates. An output end of the first OR gate is coupled to one input end of the third AND gate in the four AND gates. An output end of the fourth AND gate and an output end of the third AND gate in the four AND gates are separately coupled to two input ends of the second OR gate in the two OR gates. An output end of the second OR gate is coupled to one input end of the first XOR gate in the two XOR gates. An output end of the first OR gate is coupled to one input end of the second XOR gate in the two XOR gates. Two input ends of the first AND gate are configured to receive the multi-multiplication indication signal and the first bit $b[k-1]$, two input ends of the second AND gate are configured to receive the single-multiplication indication signal and the second bit $b[k]$, the other input end of the third AND gate is configured to receive the first selection signal M1Mi, and two input ends of the fourth AND gate are separately configured to receive the first bit $b[k-1]$ and the second selection signal M2Mi. The other input end of the first XOR gate is configured to receive the second multi-multiplication control signal MCNi, and the other input end of the second XOR gate is configured to receive the multi-multiplication indication signal.

According to a second aspect, a processor is provided, including a multiplier. The multiplier is the multiplier provided in any one of the first aspect or the possible implementations of the first aspect. Optionally, the processor includes a neural-network processing unit.

According to a third aspect, a chip is provided, including a multiplier. The multiplier is the multiplier provided in any one of the first aspect or the possible implementations of the first aspect.

It may be understood that any processor or chip provided above includes the multiplier provided above. Therefore, for beneficial effects that can be achieved by the processor or the chip, refer to the beneficial effects in the multiplier provided above. Details are not described herein again.

BRIEF DESCRIPTION OF DRAWINGS

FIG. 7-1 and FIG. 7-2 are schematic diagrams of a first-type precoder according to an embodiment of this application;

FIG. 8-1 and FIG. 8-2 are schematic diagrams of a second-type precoder according to an embodiment of this application;

FIG. 9-1 and FIG. 9-2 are schematic diagrams of a third-type precoder according to an embodiment of this application;

FIG. 10-1 and FIG. 10-2 are schematic diagrams of a fourth-type precoder according to an embodiment of this application;

FIG. 11 to FIG. 20 are schematic diagrams of a first coder to a tenth coder according to an embodiment of this application;

DESCRIPTION OF EMBODIMENTS

In this application, "at least one" means one or more, and "a plurality of" means two or more. The term "and/or" describes an association relationship between associated objects and indicates that three relationships may exist. For example, A and/or B may represent the following cases: Only A exists, both A and B exist, and only B exists, where A and B may be singular or plural. "At least one of the following items (pieces)" or a similar expression thereof means any combination of these items, including any combination of singular items (pieces) or plural items (pieces). For example, at least one (piece) of a, b, or c may represent: a, b, c, a-b, a-c, b-c, or a-b-c, where a, b, and c may be singular or plural. In addition, in embodiments of this application, the words such as "first" and "second" are used to distinguish between objects whose names or functions are similar. A person skilled in the art may understand that the words such as "first" and "second" do not limit a quantity or an execution sequence. The term "couple" is used to indicate an electrical connection, including a direct connection through a wire or a connection end or an indirect connection through another component. Therefore, "couple" should be considered as a generalized electronic communication connection.

Figure 3:
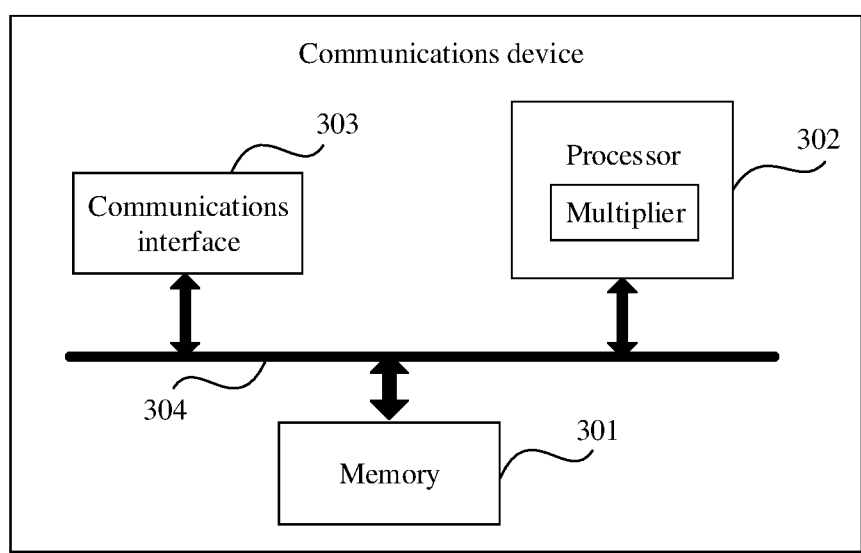
FIG. 3 is a schematic diagram of a structure of a communications device according to an embodiment of this application.

FIG. 3 is a schematic diagram of a structure of a communications device according to an embodiment of this application. The communications device may be a terminal, a server, or the like, or may be a chip, a chip group, a circuit board, a module, or the like in a terminal or a server. As shown in FIG. 3, the communications device may include a memory 301, a processor 302, a communications interface 303, and a bus 304. The memory 301, the processor 302, and the communications interface 303 are connected to each other by using the bus 304. The memory 301 may be configured to store data, a software program, and a module, and mainly includes a program storage area and a data storage area. The program storage area may store an operating system, an application program required for at least one function, and the like. The data storage area may store data created during use of the device, and the like. The processor 302 is configured to control and manage an action of the communications device, for example, perform various functions and data processing of the device by running or executing a software program and/or module stored in the memory 301 and invoking data stored in the memory 301. The communications interface 303 is configured to support communication of the device.

The processor 302 includes but is not limited to a central processing unit (CPU), a network processing unit (NPU), a graphics processing unit (GPU), a digital signal processor (DSP), a general-purpose processor, or the like. The processor 302 includes one or more multipliers, for example, includes a multiplier array. The multiplier is a component that implements a multiplication operation in the processor 302.

The bus 304 may be a peripheral component interconnect (PCI) bus, an extended industry standard architecture (EISA) bus, or the like. The bus may be divided into an address bus, a data bus, a control bus, and the like. For ease of illustration, the bus is represented by using only one thick line in FIG. 3; however, it does not indicate that there is only one bus or only one type of bus.

Figure 4:
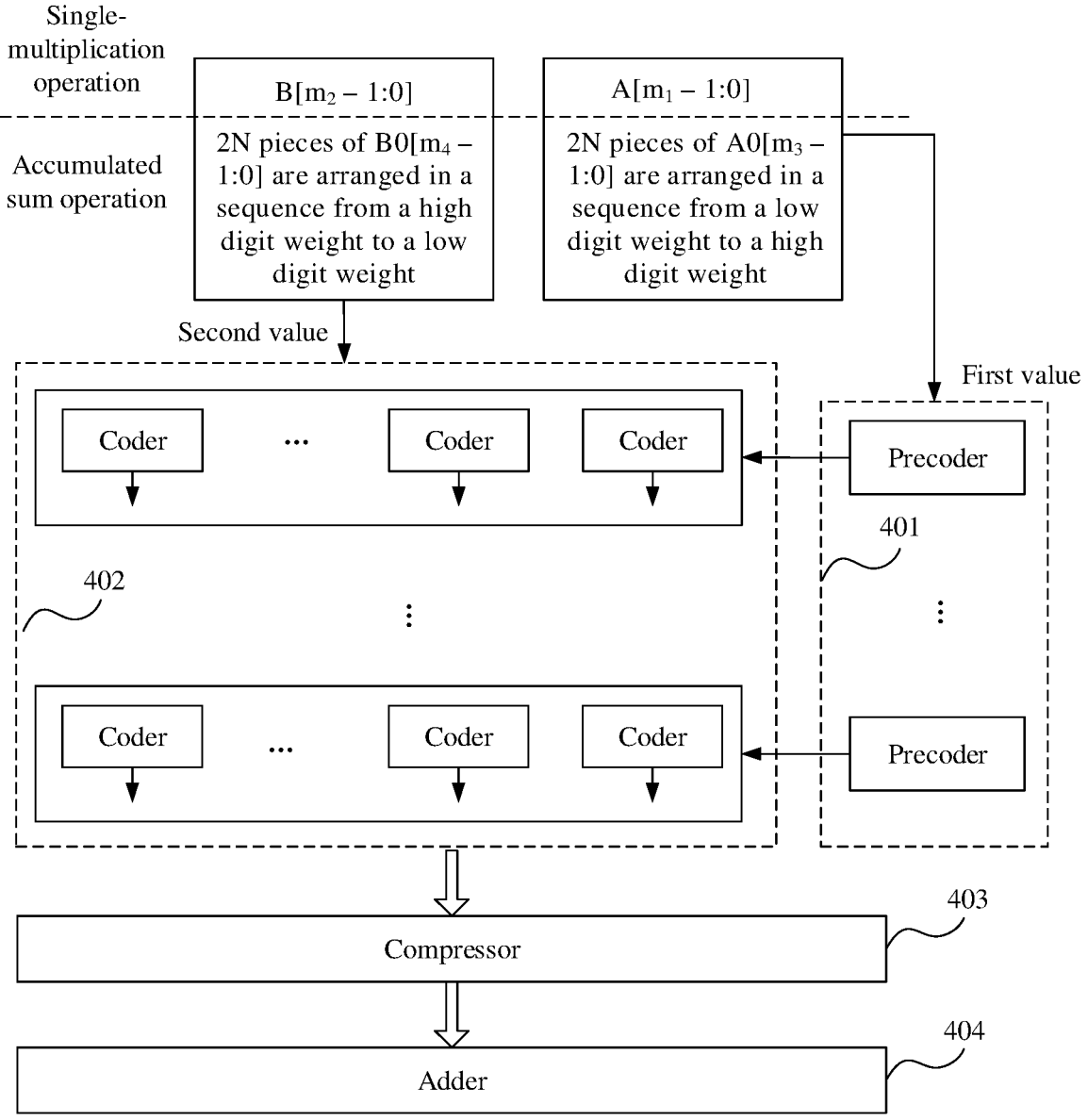
FIG. 4 to FIG. 6 are schematic diagrams of a structure of a multiplier according to an embodiment of this application.

To further describe the technical solutions, FIG. 4 is a schematic diagram of a structure of a multi-mode fusion multiplier according to an embodiment of this application. The multiplier may be configured to implement a binary single-multiplication operation $A[m_1-1:0]\times B[m_2-1:0]$, or an accumulated sum operation of 2N binary multiplications $A0[m_3-1:0]\times B0[m_4-1:0]$, where $m_1 \geq 2N\times m_3$, $m_2 \geq 2N\times m_4$, N is a positive integer, and $\geq$ indicates greater than or equal to. As shown in FIG. 4, the multiplier includes P precoders 401, Q groups of coders 402, and a compressor 403, where $m_1$, $m_2$, $m_3$, $m_4$, P, and Q are integers greater than 1. Compared with a conventional design, the multiplier has features such as a short operation time and low multiplier power consumption. The following provides detailed descriptions.

The P precoders 401 are configured to precode a first value based on a single-multiplication indication signal or a multi-multiplication indication signal, to obtain a precoding result. The first value is $A[m_1-1:0]$ when the single-multiplication indication signal indicates that the single-multiplication operation is performed, or the first value includes 2N pieces of $A0[m_3-1:0]$ when the multi-multiplication indication signal indicates that the accumulated sum operation is performed, where the 2N pieces of $A0[m_3-1:0]$ are arranged in a sequence from a low digit weight to a high digit weight.

The single-multiplication indication signal may be used to indicate whether the multiplier performs the single-multiplication operation $A[m_1-1:0]\times B[m_2-1:0]$, and the single-multiplication indication signal may be represented by a 1-bit binary number. For example, when the single-multiplication indication signal is 1, the single-multiplication indication signal may be used to indicate that the multiplier performs the single-multiplication operation. When the single-multiplication indication signal is 0, the single-multiplication indication signal may be used to indicate that the multiplier does not perform the single-multiplication operation. The multi-multiplication indication signal may be used to indicate whether the multiplier performs the accumulated sum operation of the 2N binary multiplications $A0[m_3-1:$ $0]\times B0[m_4-1:0]$, and the multi-multiplication indication signal may be represented by a 1-bit binary number. For example, when the multi-multiplication indication signal is 1, the multi-multiplication indication signal may be used to indicate that the multiplier performs the accumulated sum operation. When the multi-multiplication indication signal is 0, the multi-multiplication indication signal may be used to indicate that the multiplier does not perform the accumulated sum operation.

In addition, when the multi-multiplication indication signal indicates that the accumulated sum operation is performed, the 2N pieces of $A0[m_3-1:0]$ included in the first value are arranged in the sequence from the low digit weight to the high digit weight. For example, when N=2, the 2N pieces of $A0[m_3-1:0]$ are four pieces of $A0[m_3-1:0]$. If the four pieces of $A0[m_3-1:0]$ are respectively represented as $A1[m_3-1:0]$, $A2[m_3-1:0]$, $A3[_3-1:0]$, and $A4[m_3-1:0]$, the first value is obtained by arranging the four pieces of $A0[m_3-1:0]$ in a sequence from a low digit weight to a high digit weight. If the first value is $a[4m_3-1:0]$, $A1[n_3-1:0]$ is mapped to the $(m_3-1)^{th}$ digit weight to the $0^{th}$ digit weight (that is, $a[m_3]-1:01$) in the first value, $A2[m_3-1:0]$ is mapped to the $(2m_3-1)^{th}$ digit weight to the $(m_3)^{th}$ digit weight (that is, $a[2m_3-1:m_3]$) in the first value, $A3[m_3-1:0]$ is mapped to the $(3m_3-1)^{th}$ digit weight to the $(2m_3)^{th}$ digit weight (that is, $a[3m_3-1:2m_3]$) in the first value, and $A4[m_3-1:0]$ is mapped to the $(4m_3-1)^{th}$ digit weight to the $(3m_3)^{th}$ digit weight (that is, $a[4m_3-1:3m_3]$) in the first value.

Optionally, when $m_1$ is equal to $2N\times m_3$, a value obtained by arranging the 2N pieces of $A0[m_3-1:0]$ in the sequence from the low digit weight to the high digit weight is the first value used when the multiplier performs the accumulated sum operation. When $m_1$ is greater than $2N\times m_3$, a value obtained by arranging the 2N pieces of $A0[m_3-1:0]$ in the sequence from the low digit weight to the high digit weight is a value from the $0^{th}$ digit weight to the $(2N\times m_3-1)^{th}$ digit weight in the first value used when the multiplier performs the accumulated sum operation, and the $(2N\times m_3)^{th}$ digit weight to the $(m_1-1)^{th}$ digit weight in the first value are filled with sign bits, that is, first $(m_1-2N\times m_3)$ high digit weights in the first value are filled with sign bits. This may also be understood as that a value obtained after the value obtained through arrangement is filled with sign bits is the first value, and a quantity of digit weights of the value obtained after filling is equal to $m_1$. It should be noted that, when the single-multiplication operation is performed, a filled sign bit is a sign bit of $A[m_1 1:0]$. If the sign bit of $A[m_1-1:0]$ is 0, the filled sign bit is also 0. If the sign bit of $A[m_3-1:0]$ is 1, the filled sign bit is also 1. When the accumulated sum operation of the plurality of multiplications is performed, a filled sign bit is a sign bit of $A0[m_3-1:0]$. If the sign bit of $A0[m_3-1:0]$ is 0, the filled sign bit is also 0. If the sign bit of $A0[m_3-1:0]$ is 1, the filled sign bit is also 1.

Specifically, when the single-multiplication indication signal indicates that the single-multiplication operation is performed, the P precoders 401 are configured to precode the first value $A[m_1-1:0]$ based on the single-multiplication indication signal or the multi-multiplication indication signal. When the multi-multiplication indication signal indicates that the accumulated sum operation is performed, the P precoders 401 are configured to precode, based on the single-multiplication indication signal or the multi-multiplication indication signal, the first value obtained after the 2N pieces of $A0[m_3-1:0]$ are arranged or arranged and filled.

The Q groups of fusion coders 402 are configured to code the precoding result and a second value, to obtain a plurality of partial products. The second value is $B[m_2-1:0]$ when the single-multiplication indication signal indicates that the single-multiplication operation is performed, or the second value includes 2N pieces of $B0[m_4-1:0]$ when the multi-multiplication indication signal indicates that the accumulated sum operation is performed, where the 2N pieces of $B0[m_4-1:0]$ are arranged in a sequence from a high digit weight to a low digit weight.

When the multi-multiplication indication signal indicates that the accumulated sum operation is performed, the 2N pieces of $B0[m_4-1:0]$ included in the second value are arranged in the sequence from the high digit weight to the low digit weight. For example, when $N=2$, the 2N pieces of $B0[m_4-1:0]$ are four pieces of $B0[m_4-1:0]$. If the four pieces of $B0[m_4-1:0]$ are respectively represented as $B1[m_4-1:0]$, $B2[m_4-1:0]$, $B3[m_4-1:0]$, and $B4[m_4-1:0]$, the second value is obtained by arranging the four pieces of $B0[m_4-1:0]$ in a sequence from a high digit weight to a low digit weight. If the second value is $b[4m_4-1:0]$, $B1[m_4-1:0]$ is mapped to the $(4m_4-1)^{th}$ digit weight to the $(3m_4)^{th}$ digit weight (that is, $b[4m_4-1:3m_4]$) in the second value, $B2[m_4-1:0]$ is mapped to the $(3m_4-1)^{th}$ digit weight to the $(2m_4)^{th}$ digit weight (that is, $b[3m_4-1:2m_4]$) in the second value, $B3[m_4-1:0]$ is mapped to the $(2m_4-1)^{th}$ digit weight to the $(m_4)^{th}$ digit weight (that is, $b[2m_4-1:m_4]$) in the second value, and $B4[m_4-1:0]$ is mapped to the $(m_4-1)^{th}$ digit weight to the $0^{th}$ digit weight (that is, $b_4-1:01$) in the second value.

Optionally, when $m_2$ is equal to $2N\times m_4$, a value obtained by arranging the 2N pieces of $B0[m_4-1:0]$ in the sequence from the high digit weight to the low digit weight is the second value used when the multiplier performs the accumulated sum operation. When $m_2$ is greater than $2N\times m_4$, a value obtained by arranging the 2N pieces of $B0[m_4-1:0]$ in the sequence from the high digit weight to the low digit weight is a value from the $(m_2-2N\times m_4)^{th}$ digit weight to the $(m_2-1)^{th}$ digit weight in the second value used when the multiplier performs the accumulated sum operation, and the $0^{th}$ digit weight to the $(m_2-2N\times m_4-1)^{th}$ digit weight in the second value are filled with invalid bits (for example, filled with 0), that is, last $(m_2-2N\times m_4)$ low digit weights in the second value are filled with invalid bits. This may also be understood as that a value obtained after the value obtained through arrangement is filled with invalid bits is the second value, and a quantity of digit weights of the value obtained after filling is equal to $m_2$.

Specifically, when the single-multiplication indication signal indicates that the single-multiplication operation is performed, the Q groups of fusion coders 402 are configured to code the second value $B[m_2-1:0]$ and a precoding result that is output by the P precoders 401 by precoding $A[m_1-1:0]$. When the multi-multiplication indication signal indicates that the accumulated sum operation is performed, the Q groups of fusion coders 402 are configured to code the second value obtained after the 2N pieces of $B0[m_4-1:0]$ are arranged or arranged and filled and a precoding result that is output by the P precoders 401 by precoding the first value obtained after the 2N pieces of $A0[m_3-1:0]$ are arranged or arranged and filled.

The compressor 403 is configured to compress the plurality of partial products that are output by the Q groups of fusion coders, to obtain two accumulated values, and a sum of the two accumulated values is a result of the single-multiplication operation or the accumulated sum operation.

The compressor 403 may include W layers of compressors, and W is a positive integer. When W is equal to 1, the compressor 403 includes a compressor at a first layer. The compressor at the first layer is configured to successively compress all digit weights in an arrangement array of the plurality of partial products in a sequence from a low digit weight to a high digit weight, until each digit weight corresponds to fewer than three remaining bits, to obtain a first compression array that includes two rows. Each row corresponds to one accumulated value. When W is an integer greater than 1, the compressor 403 includes a compressor at a first layer and a compressor at each layer up to and including a compressor at a $W^{th}$ layer. The compressor at the first layer is configured to successively compress all digit weights in an arrangement array of the plurality of partial products in a sequence from a low digit weight to a high digit weight, until each digit weight corresponds to fewer than three remaining bits, to obtain a first compression array. A compressor at a $j^{th}$ layer is configured to successively compress all digit weights in a $(j-1)^{th}$ compression array in a sequence from a low digit weight to a high digit weight, until each digit weight corresponds to fewer than three remaining bits, to obtain a $j^{th}$ compression array. A value range of j is 2 to W, a $W^{th}$ compression array includes two rows, and each row corresponds to one accumulated value.

In addition, compression performed by a compressor at each layer on each digit weight is performed for three bits on the digit weight, and neither of a carry output bit and a current summation bit that are obtained through compression by the compressor at the layer is compressed. In the arrangement array of the plurality of partial products, each row includes one partial product item, and each column includes a plurality of bits corresponding to a same digit weight in the plurality of partial products. One partial product item includes a plurality of partial products that correspond to a same precoder and that are output by a group of fusion coders.

The adder 404 is configured to: receive the two accumulated values, and calculate a sum of the two accumulated values to obtain the result of the single-multiplication operation or the accumulated sum operation. After the compressor 403 compresses the plurality of partial products to obtain the two accumulated values, the compressor 403 may send the two accumulated values to the adder 404. When receiving the two accumulated values, the adder 404 may obtain a product of the first value and the second value by calculating the sum of the two accumulated values. In this way, when the multiplier performs the single-multiplication operation, a result that is output by the adder 404 is a result of the single-multiplication operation $A[m_1-1:0]\times B[m_2-1:0]$. When the multiplier performs the accumulated sum operation, a result that is output by the adder 404 is a result of the accumulated sum operation of the 2N binary multiplications $A0[m_3-1:0]\times B0[m_4-1:0]$.

In a possible embodiment, if $N=1$, $m_1=2m_3+I$ (I is a non-negative integer), and $m_2=2m_4+J$ (J is a non-negative integer), the multiplier may be referred to as a single-double fusion multiplier with a single-multiplication mode and a double-multiplication mode. In the single-multiplication mode, the multiplier may be configured to implement a single-multiplication operation of $m_1$ bits$\times m_2$ bits (that is, $A[m_1-1:0]\times B[m_2-1:0]$). In the double-multiplication mode, the multiplier may be configured to implement an accumulated sum operation of two binary multiplications $m_3$ bits$\times m_4$ bits (that is, two pieces of $A0[m_3-1:0]\times B0[m_4-1:0]$). For ease of description, in the following, the two pieces of $A0[m_3-1:0]$ may be represented as $A1[m_3-1:0]$ and $A2[m_3-1:0]$, and the two pieces of $B0[m_4-1:0]$ may be represented as $B1[m_4-1:0]$ and $B2[m_4-1:0]$.

Figure 5:
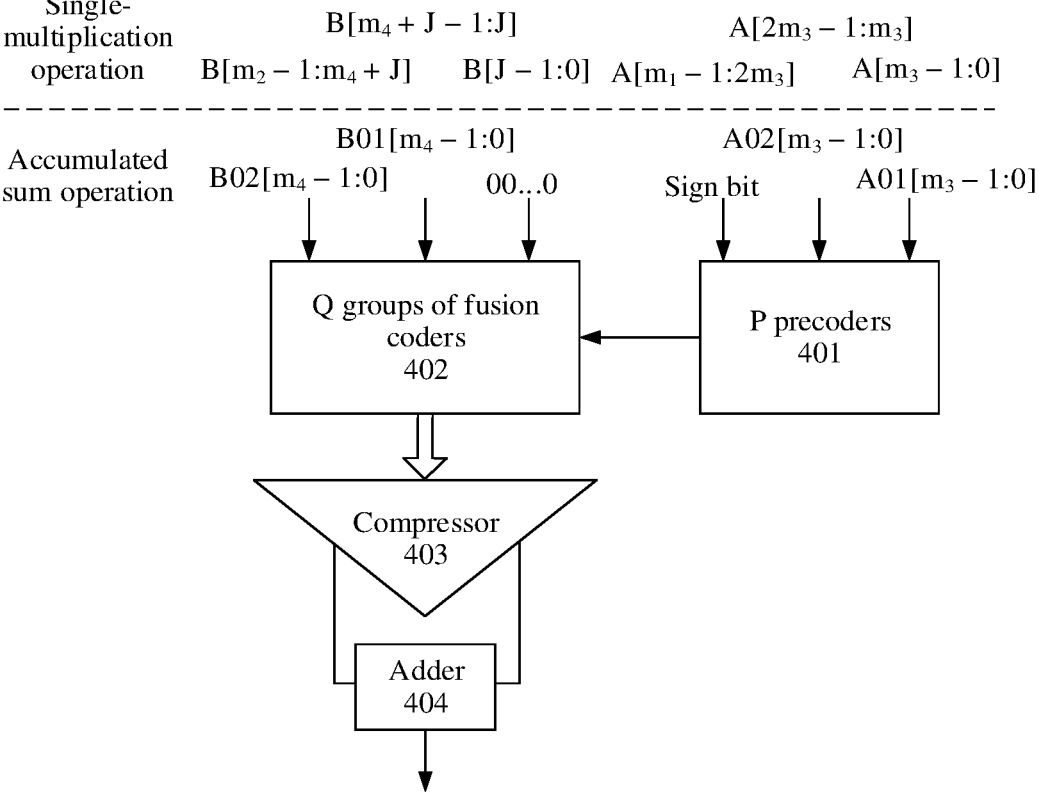

As shown in FIG. 5, when the multiplier performs the single-multiplication operation of $m_1$ bits$\times m_2$ bits, the first value is $A[m_1-1:0]$, and the second value is $B[m_2-1:0]$.

When the multiplier performs the accumulated sum operation of the two pieces of $m_3$ bits×$m_4$ bits, if I is 0, A1[$m_3$−1:0] is mapped to the $(m_3−1)^{th}$ digit weight to the $0^{th}$ digit weight (which correspond to A[$m_3$−1:0] in the single-multiplication operation) of the first value, and A2[$m_3$−1:0] is mapped to the $(2m_3−1)^{th}$ digit weight to the $(m_3)^{th}$ digit weight (which correspond to A[$2m_3$−1:$m_3$] in the single-multiplication operation) of the first value; or if I is not 0, the $(2m_3+I−1)^{th}$ digit weight to the $(2m_3)^{th}$ digit weight (which correspond to A[$2m_3+I−1:2_{m1}$] or A[$m_1$−1:$2m_3$] in the single-multiplication operation) of the first value are filled with sign bits. When the multiplier performs the accumulated sum operation of the two pieces of $m_3$ bits×$m_4$ bits, if J is 0, B1[$m_4$−1:0] is mapped to the $(2m_4+J−1)^{th}$ digit weight to the $(m_4+J)^{th}$ digit weight (which correspond to B[$2m_4+J−1:m_4+$ J] or B[$m_2$−1:$m_4+J$] in the single-multiplication operation) of the second value, and B2[$m_4$−1:0] is mapped to the $(m_4+J−1)^{th}$ digit weight to the $J^{th}$ digit weight (which correspond to B[$m_4+J−1:J$] in the single-multiplication operation) of the second value; or if J is not 0, the $(J−1)^{th}$ digit weight to the $0^{th}$ digit weight of the second value are filled with invalid bits (the invalid bits may be 0). In FIG. 5, an example in which neither I nor J is 0 is used for description.

In a possible embodiment, if N=2, $m_1$=$4m_3$+I (I is a non-negative integer), and $m_2$=$4m_4$+J (J is a non-negative integer), the multiplier may be referred to as a single-four fusion multiplier with a single-multiplication mode and a four-multiplication mode. In the single-multiplication mode, the multiplier may be configured to implement a single-multiplication operation of $m_1$ bits×$m_2$ bits (that is, A[$m_1$−1:0]×B[$m_2$−1:0]). In the four-multiplication mode, the multiplier may be configured to implement an accumulated sum operation of four binary multiplications $m_3$ bits×$m_4$ bits (that is, four pieces of A0[$m_3$−1:0]×B0[$m_4$−1:0]). For ease of description, in the following, the four pieces of A0[$m_3$−1:0] may be represented as A1[$m_3$−1:0], A2[$m_3$−1:0], A3[$m_3$−1: 0], and A4[$m_3$−1:0], and the four pieces of B0[$m_4$−1:0] may be represented as B1[$m_4$−1:0], B2[$m_4$−1:0], B3[$m_4$−1:0], and B4[$m_4$−1:0].

Figure 6:
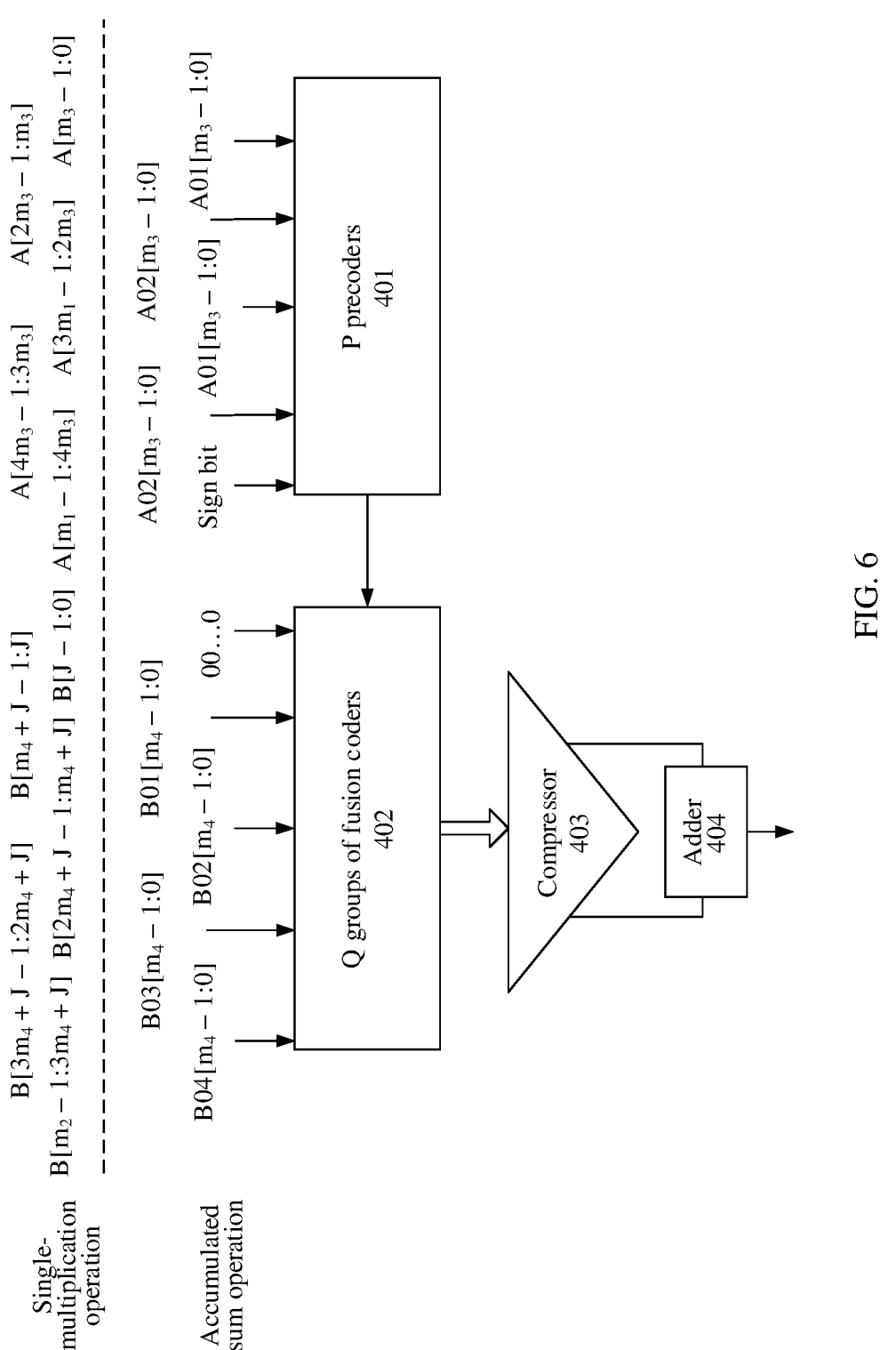

As shown in FIG. 6, when the multiplier performs the single-multiplication operation of $m_1$ bits×$m_2$ bits, the first value is A[$m_1$−1:0], and the second value is B[$m_2$−1:0]. When the multiplier performs the accumulated sum operation of the four pieces of $m_3$ bits×$m_4$ bits, if I is 0, A1[$m_3$−1:0] is mapped to the $(m_3−1)^{th}$ digit weight to the $0^{th}$ digit weight (which correspond to A[$m_3$−1:0] in the single-multiplication operation) of the first value, A2[$m_3$−1:0] is mapped to the $(2m_3−1)^{th}$ digit weight to the $(m_3)^{th}$ digit weight (which correspond to A[$2m_3$−1:$m_3$] in the single-multiplication operation) of the first value, A3[$m_3$−1:0] is mapped to the $(3m_3−1)^{th}$ digit weight to the $(2m_3)^{th}$ digit weight (which correspond to A[$3m_3$−1:$2m_3$] in the single-multiplication operation) of the first value, and A4[$m_3$−1:0] is mapped to the $(4m_3−1)^{th}$ digit weight to the $(3m_3)^{th}$ digit weight (which correspond to A[$4m_3$−1:$3m_3$] in the single-multiplication operation) of the first value; or if I is not 0, the $(4m_3+I−1)^{th}$ digit weight to the $(4m_3)^{th}$ digit weight (which correspond to A[$4m_3+I−1:4m_3$] or A[$m_1$−1:$4m_3$] in the single-multiplication operation) of the first value are filled with sign bits. When the multiplier performs the accumulated sum operation of the four pieces of $m_3$ bits×$m_4$ bits, if J is 0, B1[$m_4$−1:0] is mapped to the $(4m_4+J−1)^{th}$ digit weight to the $(3m_4+J)^{th}$ digit weight (which correspond to B[$4m_4+$ J−1:$3m_4+J$] in the single-multiplication operation) of the second value, B2[$m_4$−1:0] is mapped to the $(3m_4−1)^{th}$ digit weight to the $(2m_4+J)^{th}$ digit weight (which correspond to B[$m_4+J−1:2m_4+J$] in the single-multiplication operation) of the second value, B3[$m_4$−1:0] is mapped to the $(2m_4+J−1)^{th}$ digit weight to the $(m_4+J)^{th}$ digit weight (which correspond to B[$2m_4+J−1:m_4+J$] in the single-multiplication operation) of the second value, and B4[$m_4$−1:0] is mapped to the $(m_4+J−1)^{th}$ digit weight to the $J^{th}$ digit weight (which correspond to B[$m_4+J−1:J$] in the single-multiplication operation) of the second value; or if J is not 0, the $(J−1)^{th}$ digit weight to the $0^{th}$ digit weight of the second value are filled with invalid bits (the invalid bits may be 0). In FIG. 6, an example in which neither I nor J is 0 is used for description.

In the single-double fusion multiplier shown in FIG. 5 or the single-four fusion multiplier shown in FIG. 6, the Q groups of fusion coders 402 may all be configured to code a value in the single-multiplication operation or the multi-multiplication accumulated sum operation, and output the plurality of partial products to the compressor 403. The compressor 403 may be configured to compress the plurality of partial products corresponding to the single-multiplication operation or the multi-multiplication accumulated sum operation to obtain the two accumulated values. Finally, the adder 404 calculates the sum of the two accumulated values to obtain the result of the single-multiplication operation or the accumulated sum operation. Therefore, compared with a multiplier that supports two different multiplication modes in the conventional technology, the multiplier provided in embodiments of this application does not need to separately code and compress values in two different multiplication modes by using different coders or compressors, so that a quantity of coders required by the multiplier is reduced, operation duration is shortened, and power consumption of the multiplier is reduced.

Further, the P precoders 401 include an $i^{th}$ precoder, configured to: determine an $i^{th}$ group of selection signals, an $i^{th}$ group of single-multiplication selection signals, a single-multiplication control signal SCi, and a first multi-multiplication control signal MCi in the precoder result based on the single-multiplication indication signal, the multi-multiplication indication signal, and at least two bits in the first value when 0≤i≤N×$m_3$, where ≤ represents less than or equal to, and i is an even number; or determine an $i^{th}$ group of selection signals, an $i^{th}$ group of single-multiplication selection signals, a single-multiplication control signal SCi, a second multi-multiplication control signal MCNi, and a control signal Si in the precoder result based on the single-multiplication indication signal, the multi-multiplication indication signal, and at least two bits in the first value when N×$m_3$≤i≤$m_1$−1, where i is an even number.

The group of selection signals includes a first selection signal M1Mi and a second selection signal M2Mi, and the $i^{th}$ group of single-multiplication selection signals includes a first single-multiplication selection signal SM1Mi and a second single-multiplication selection signal SM2Mi. In the following, the single-multiplication indication signal is represented as an SMI, and the multi-multiplication indication signal is represented as an MMI.

In addition, the P precoders 401 may include a plurality of different types of precoders. The following separately describes logical functions and circuit structures of the plurality of different types of precoders in detail.

Figure 1:
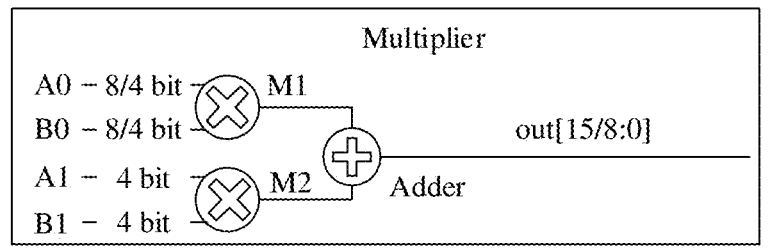
FIG. 1 is a schematic diagram of a structure of a multiplier in the conventional technology.
Figures 1, 7:
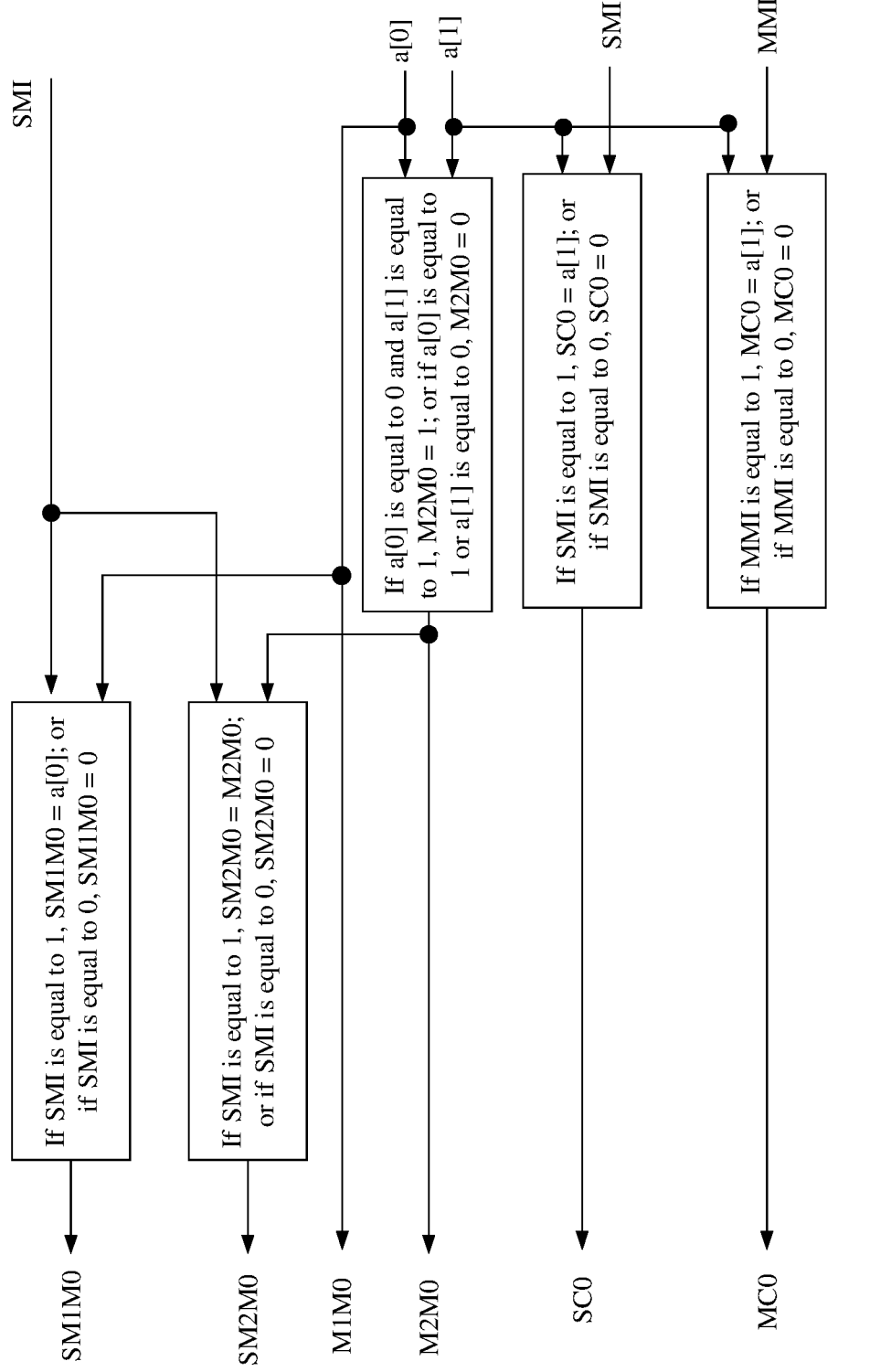
Figures 2, 7:
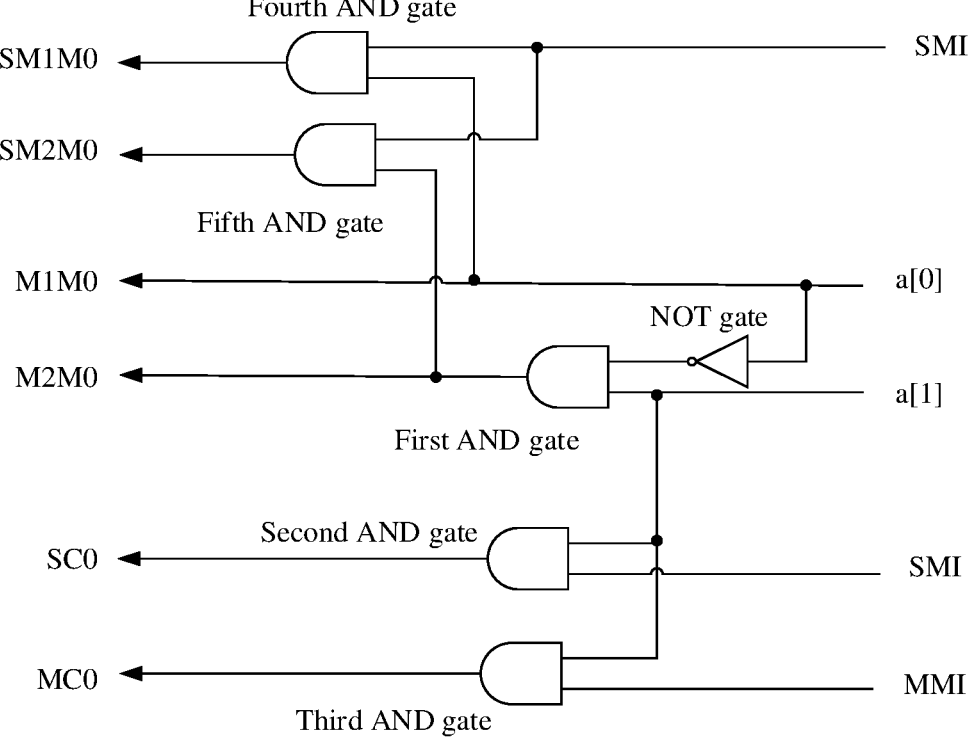

As shown in FIG. 7-1, when i=0, the at least two bits in the first value include a first bit a[0] and a second bit a[1], and the P precoders 401 include a $0^{th}$ precoder. For ease of description, the $0^{th}$ precoder existing when i=0 is referred to as a first-type precoder below.

Specifically, the first-type precoder is configured to perform the following coding operations: setting the first selection signal M1M0 to the first bit a[0]; setting the second selection signal M2M0 to 1 when the first bit a[0] is 0 and the second bit a[1] is 1; or setting the second selection signal M2M0 to 0 when the first bit a[0] is not 0 or the second bit a[1] is not 1; setting the single-multiplication control signal SC0 to the second bit a[1] when the single-multiplication indication signal SMI is 1; or setting the single-multiplication control signal SC0 to 0 when the single-multiplication indication signal SMI is 0; setting the first multi-multiplication control signal MC0 to the second bit a[1] when the multi-multiplication indication signal MMI is 1; or setting the first multi-multiplication control signal MC0 to 0 when the multi-multiplication indication signal MMI is 0; and setting the first single-multiplication selection signal SM1M0 to the first bit a[0] and setting the second single-multiplication selection signal SM2M0 to the second selection signal M2M0 when the single-multiplication indication signal SMI is 1; or setting both the first single-multiplication selection signal SM1M0 and the second single-multiplication selection signal SM2M0 to 0 when the single-multiplication indication signal SMI is 0.

Figure 2:
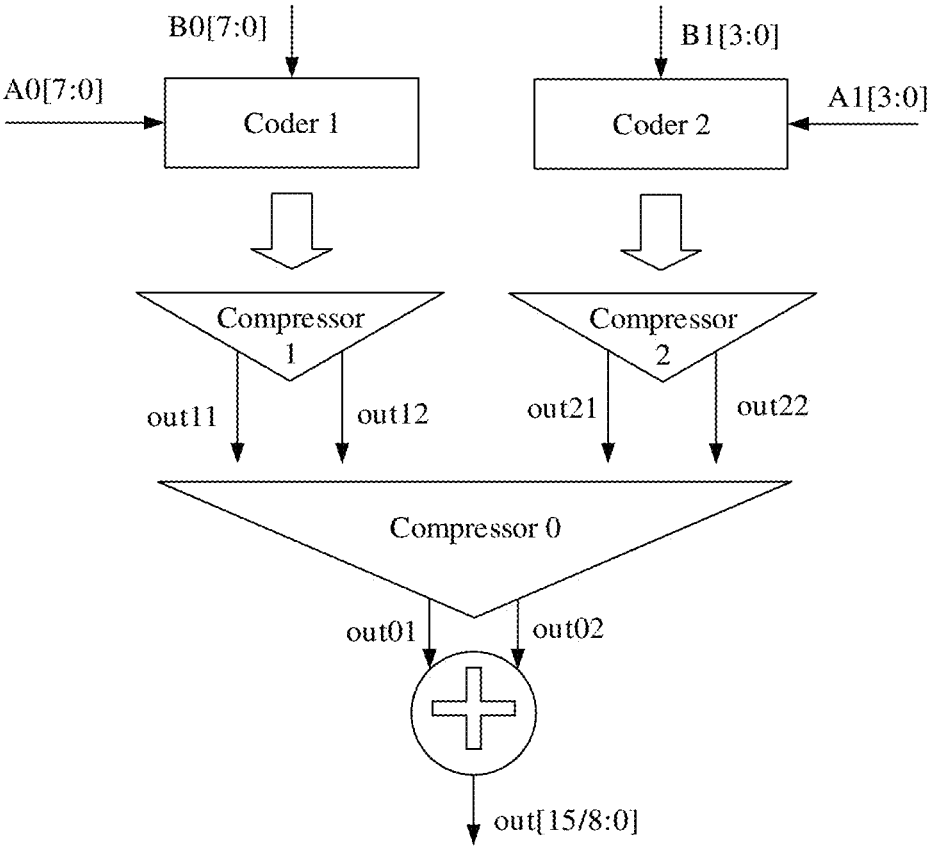
FIG. 2 is a schematic diagram of a structure of another multiplier in the conventional technology.

In a possible implementation, as shown in FIG. 7-2, the first-type precoder includes five AND gates and one NOT gate. An input end of the NOT gate is configured to receive the first bit a[0], an output end of the NOT gate is coupled to one input end of the first AND gate in the five AND gates, the other input end of the first AND gate is configured to receive the second bit a[1], and an output end of the first AND gate is configured to output the second selection signal M2M0. One input end of the second AND gate and one input end of the third AND gate in the five AND gates are both configured to receive the second bit a[1], the other input end of the second AND gate is configured to receive the single-multiplication indication signal SMI, an output end of the second AND gate is configured to output the single-multiplication control signal SC0, the other input end of the third AND gate is configured to receive the multi-multiplication indication signal MMI, and an output end of the third AND gate is configured to output the first multi-multiplication control signal MC0. One input end of the fourth AND gate and one input end of the fifth AND gate in the five AND gates are configured to receive the single-multiplication indication signal SMI, the other input end of the fourth AND gate is configured to receive the first bit a[0], an output end of the fourth AND gate is configured to output the first single-multiplication selection signal SM1M0, the other input end of the fifth AND gate is coupled to the output end of the first AND gate, and an output end of the fifth AND gate is configured to output the second single-multiplication selection signal SM2M0.

Figures 1, 8:
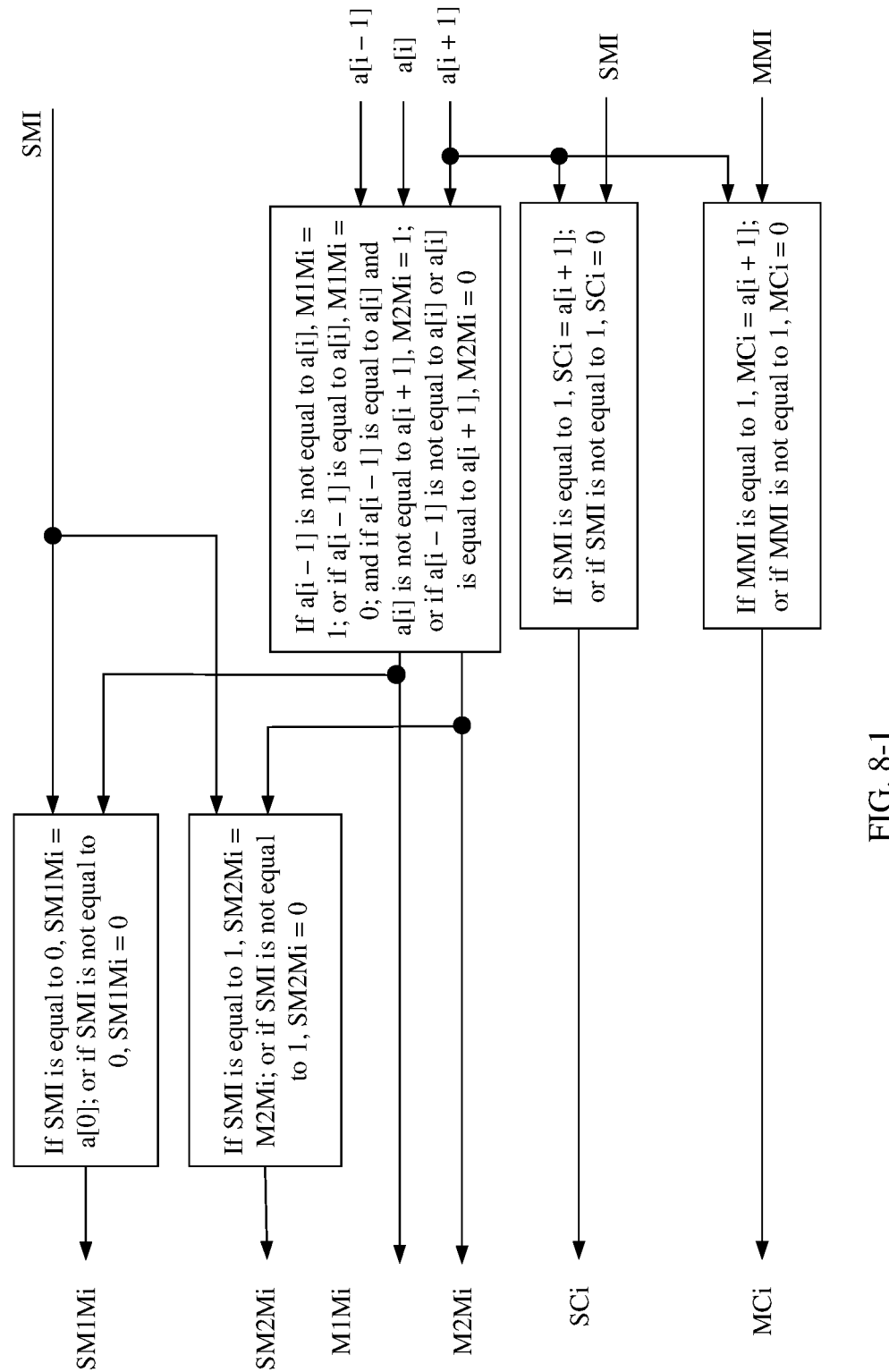
Figures 2, 8:
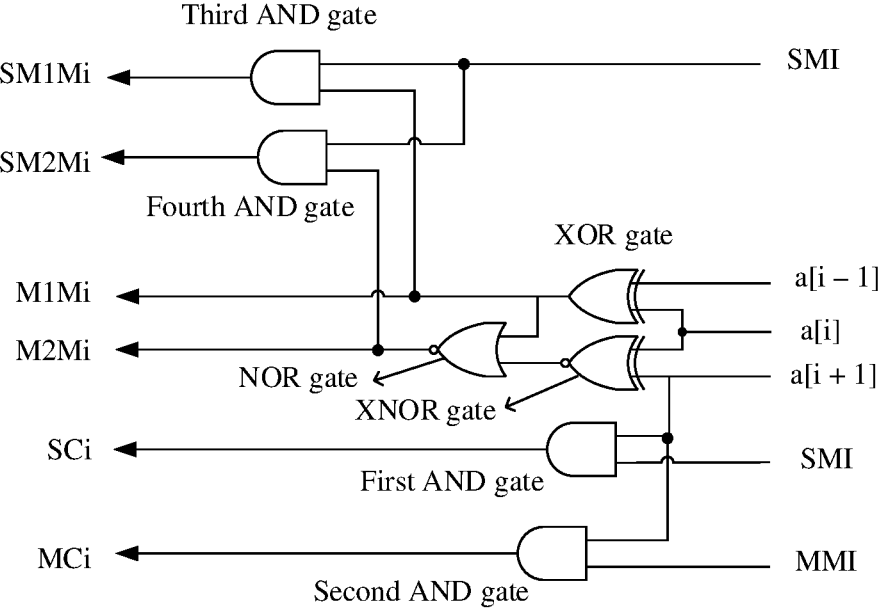

As shown in FIG. 8-1, when $0 < i \le N \times m_3 - 1$, the at least two bits in the first value include a first bit a[i−1], a second bit a[i], and a third bit a[i+1], and the P precoders 401 include the $i^{th}$ precoder. For ease of description, the $i^{th}$ precoder existing when $0 < i \le N \times m_3 - 1$ is referred to as a second-type precoder below.

Specifically, the second-type precoder is configured to perform the following coding operations: setting the first selection signal M1Mi to 1 when the first bit a[i−1] is not equal to the second bit a[i]; or setting the first selection signal M1Mi to 0 when the first bit a[i−1] is equal to the second bit a[i]; setting the second selection signal M2Mi to 1 when the first bit a[i−1] is equal to the second bit a[i] and the second bit a[i] is not equal to the third bit a[i+1]; or setting the second selection signal M2Mi to 0 when the first bit a[i−1] is not equal to the second bit a[i] or the second bit a[i] is equal to the third bit a[i+1]; setting the single-multiplication control signal SCi to the third bit a[i+1] when the single-multiplication indication signal SMI is 1; or setting the single-multiplication control signal SCi to 0 when the single-multiplication indication signal SMI is 0; setting the first multi-multiplication control signal MCi to the third bit a[i+1] when the multi-multiplication indication signal MMI is 1; or setting the first multi-multiplication control signal MCi to 0 when the multi-multiplication indication signal MMI is 0; and setting the first single-multiplication selection signal SM1Mi to the first selection signal M1Mi and setting the second single-multiplication selection signal SM2Mi to the second selection signal M2Mi when the single-multiplication indication signal SMI is 1; or setting both the first single-multiplication selection signal SM1Mi and the second single-multiplication selection signal SM2Mi to 0 when the single-multiplication indication signal SMI is 0.

In a possible implementation, as shown in FIG. 8-2, the second-type precoder includes four AND gates, one NOR gate, one XOR gate, and one XNOR gate. Two input ends of the XOR gate are configured to separately receive the first bit a[i−1] and the second bit [i], and an output end of the XOR gate is configured to output the first selection signal M1Mi. Two input ends of the XNOR gate are separately configured to receive the second bit a[i] and the third bit a[i+1]. Two input ends of the NOR gate are separately coupled to the output end of the XOR gate and an output end of the XNOR gate, and an output end of the NOR gate is configured to output the second selection signal M2Mi. One input end of the first AND gate and one input end of the second AND gate in the four AND gates are both configured to receive the third bit a[i+1], the other input end of the first AND gate is configured to receive the single-multiplication indication signal SMI, an output end of the first AND gate is configured to output the single-multiplication control signal SCi, the other input end of the second AND gate is configured to receive the multi-multiplication indication signal MMI, and an output end of the second AND gate is configured to output the first multi-multiplication control signal MCi. One input end of the third AND gate and one input end of the fourth AND gate in the four AND gates are both configured to receive the single-multiplication indication signal SMI, the other input end of the third AND gate is coupled to the output end of the XOR gate, an output end of the third AND gate is configured to output the first single-multiplication selection signal SM1Mi, the other input end of the fourth AND gate is coupled to the output end of the NOR gate, and an output end of the fourth AND gate is configured to output the second single-multiplication selection signal SM2Mi.

Figures 1, 9:
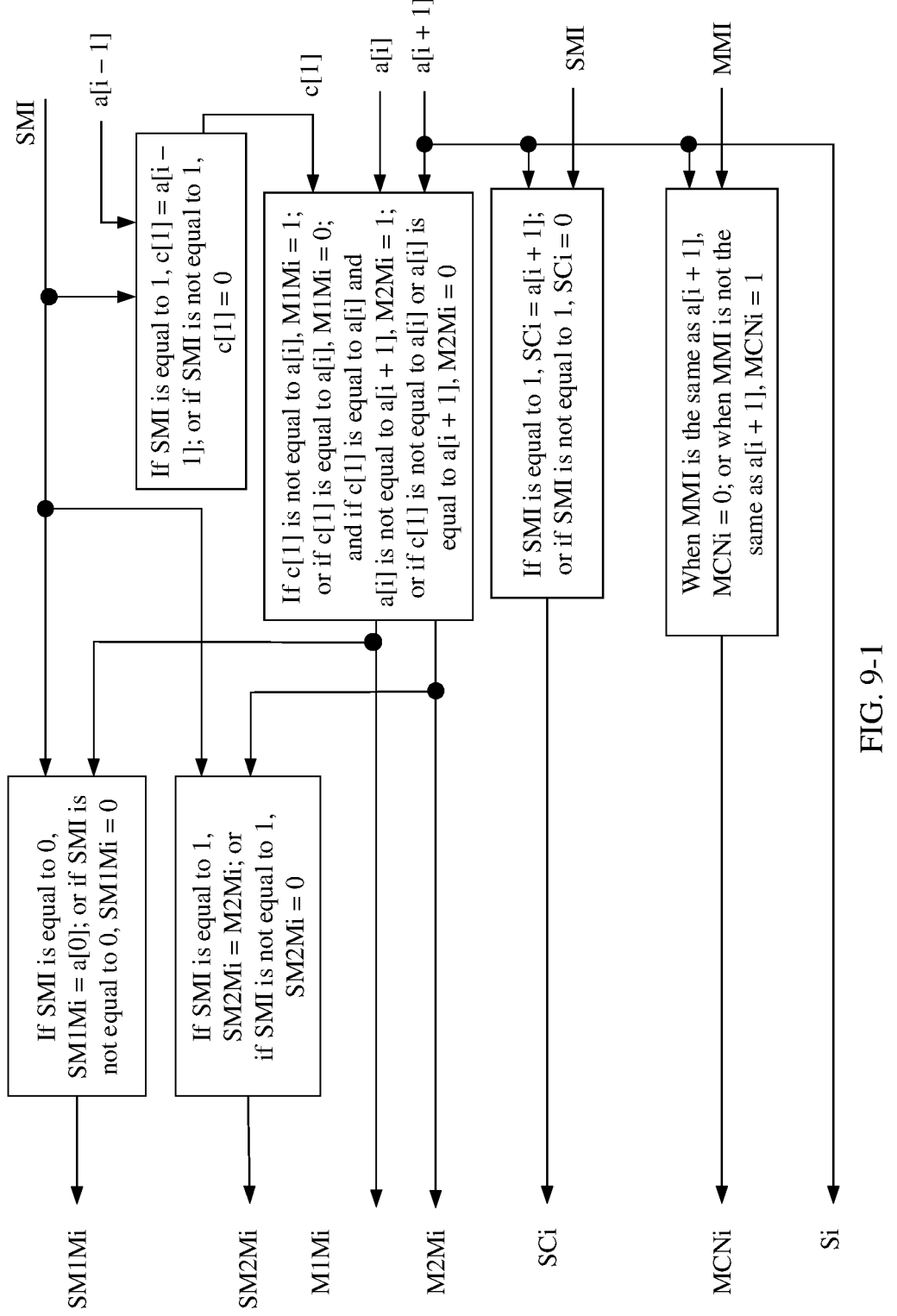
Figures 2, 9:
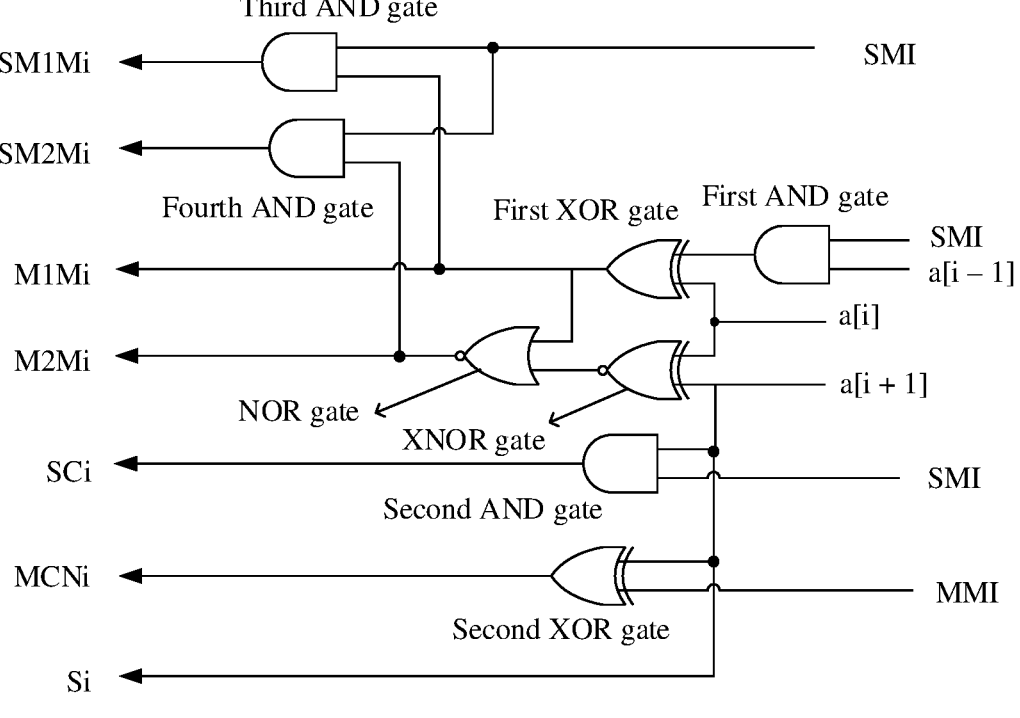

As shown in FIG. 9-1, when i is equal to $N \times m_3$, the at least two bits in the first value include a first bit a[i−1], a second bit a[i], and a third bit a[i+1], and the P precoders 401 include an $(N \times m_3)^{th}$ precoder. For ease of description, the $(N \times m_3)^{th}$ precoder existing when i is equal to $N \times m_3$ is referred to as a third-type precoder below.

The third-type precoder is configured to perform the following coding operations: setting a fourth bit c[1] to the first bit a[i−1] when the single-multiplication indication signal SMI is 1; or setting a fourth bit c[1] to 0 when the single-multiplication indication signal SMI is 0; setting the first selection signal M1Mi to 1 when the fourth bit c[1] is not equal to the second bit a[i]; or setting the first selection signal M1Mi to 0 when the fourth bit c[1] is equal to the second bit a[i]; setting the second selection signal M2Mi to 1 when the fourth bit is equal to the second bit a[i] and the second bit a[i] is not equal to the third bit a[i+1]; or setting the second selection signal M2Mi to 0 when the fourth bit is not equal to the second bit a[i] or the second bit a[i] is equal to the third bit a[i+1]; setting the single-multiplication control signal SCi to the third bit a[i+1] when the single-multiplication indication signal SMI is 1; or setting the single-multiplication control signal SCi to 0 when the single-multiplication indication signal SMI is 0; setting the second multi-multiplication control signal MCNi to 0 when the multi-multiplication indication signal MMI is equal to the third bit a[i+1]; or setting the second multi-multiplication control signal MCNi to 1 when the multi-multiplication indication signal MMI is not equal to the third bit a[i+1]; setting the first single-multiplication selection signal SM1Mi to the first selection signal M1Mi and setting the second single-multiplication selection signal SM2Mi to the second selection signal M2Mi when the single-multiplication indication signal SMI is 1; or setting both the first single-multiplication selection signal SM1Mi and the second single-multiplication selection signal SM2Mi to 0 when the single-multiplication indication signal SMI is 0; and setting the control signal Si to the third bit a[i+1].

In a possible implementation, as shown in FIG. 9-2, the third-type precoder includes four AND gates, one NOR gate, two XOR gates, and one XNOR gate. In a possible implementation of the first aspect, when i is equal to $N \times m_3$, the ($N \times m_3$)th precoder includes four AND gates, one NOR gate, two XOR gates, and one XNOR gate. One input end of the first AND gate in the four AND gates is configured to receive the first bit a[i−1], the other input end of the first AND gate is configured to receive the single-multiplication indication signal SMI, and an output end of the first AND gate is coupled to one input end of the first XOR gate in the two XOR gates. The other input end of the first XOR gate is coupled to one input end of the XNOR gate and is configured to receive the second bit a[i], and an output end of the first XOR gate is configured to output the first selection signal M1Mi. The other input end of the XNOR gate is configured to receive the third bit a[i+1], and an output end of the XNOR gate and the output end of the first XOR gate are separately coupled to two input ends of the NOR gate. An output end of the NOR gate is configured to output the second selection signal M2Mi. One input end of the second AND gate in the four AND gates is coupled to one input end of the second XOR gate in the two XOR gates and is configured to receive the third bit a[i+1], the other input end of the second AND gate is configured to receive the single-multiplication indication signal SMI, and an output end of the second AND gate is configured to output the single-multiplication control signal SCi. The other input end of the second XOR gate is configured to receive the multi-multiplication indication signal MMI, and an output end of the second XOR gate is configured to output the second multi-multiplication control signal MCNi. The third bit a[i+1] is output as the control signal Si. One input end of the third AND gate and one input end of the fourth AND gate in the four AND gates are configured to receive the single-multiplication indication signal SMI, the other input end of the third AND gate is coupled to the output end of the first XOR gate, and an output end of the third AND gate is configured to output the first single-multiplication selection signal SM1Mi. The other input end of the fourth AND gate is coupled to the output end of the NOR gate, and an output end of the fourth AND gate is configured to output the second single-multiplication selection signal SM2Mi.

Figures 1, 10:
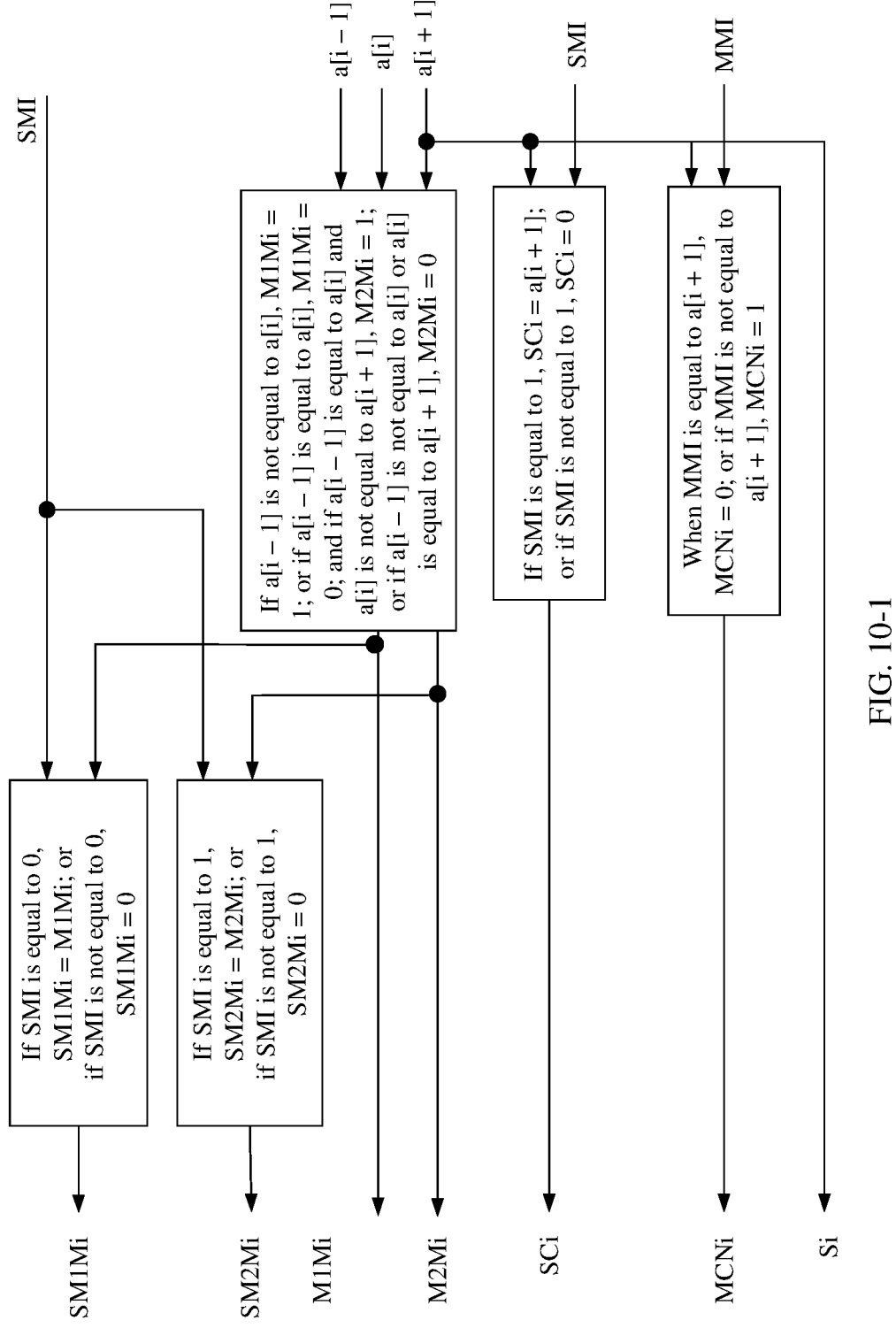
Figures 2, 10:
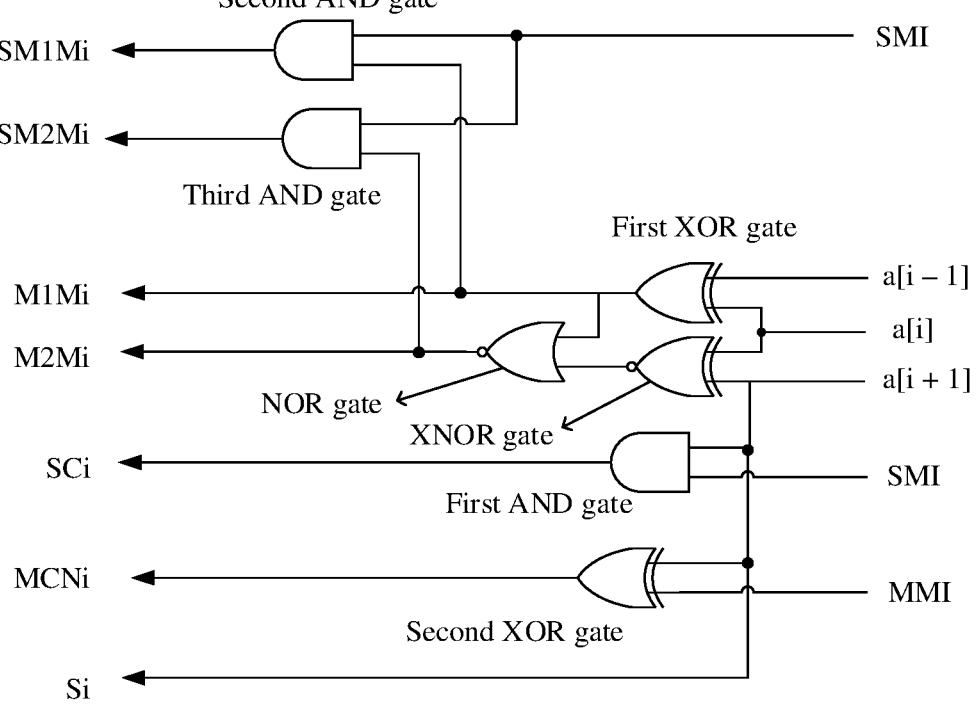

As shown in FIG. 10-1, when $N \times m_3 < i \leq m_1 - 1$, the at least two bits in the first value include a first bit a[i−1], a second bit a[i], and a third bit a[i+1], and the P precoders 401 include the precoder. For ease of description, the $i^{th}$ precoder existing when $N \times m_3 < i \leq m_1 - 1$ is referred to as a fourth-type precoder below.

The fourth-type precoder is configured to perform the following coding operations: setting the first selection signal M1Mi to 1 when the first bit a[i−1] is not equal to the second bit a[i]; or setting the first selection signal M1Mi to 0 when the first bit a[i−1] is equal to the second bit a[i]; setting the second selection signal M2Mi to 1 when the first bit a[i−1] is equal to the second bit a[i] and the second bit a[i] is not equal to the third bit a[i+1]; or setting the second selection signal M2Mi to 0 when the first bit a[i−1] is not equal to the second bit a[i] or the second bit a[i] is equal to the third bit a[i+1]; setting the single-multiplication control signal SCi to the third bit a[i+1] when the single-multiplication indication signal SMI is 1; or setting the single-multiplication control signal SCi to 0 when the single-multiplication indication signal SMI is 0; setting the second multi-multiplication control signal MCNi to 0 when the multi-multiplication indication signal MMI is equal to the third bit a[i+1]; or setting the second multi-multiplication control signal MCNi to 1 when the multi-multiplication indication signal MMI is not equal to the third bit a[i+1]; setting the first single-multiplication selection signal SM1Mi to the first selection signal M1Mi and setting the second single-multiplication selection signal SM2Mi to the second selection signal M2Mi when the single-multiplication indication signal SMI is 1; or setting both the first single-multiplication selection signal SM1Mi and the second single-multiplication selection signal SM2Mi to 0 when the single-multiplication indication signal SMI is 0; and setting the control signal Si to the third bit a[i+1].

In a possible implementation, as shown in FIG. 10-2, the fourth-type precoder includes three AND gates, one NOR gate, two XOR gates, and one XNOR gate. One input end of the first XOR gate in the two XOR gates is configured to receive the first bit a[i−1], the other input end of the first XOR gate is coupled to one input end of the XNOR gate and is configured to receive the second bit a[i], and an output end of the first XOR gate is configured to output the first selection signal M1Mi. The other input end of the XNOR gate is configured to receive the third bit a[i+1], and an output end of the XNOR gate and the output end of the first XOR gate are separately coupled to two input ends of the NOR gate. An output end of the NOR gate is configured to output the second selection signal M2Mi. One input end of the first AND gate in the three AND gates is coupled to one input end of the second XOR gate in the two XOR gates and is configured to receive the third bit a[i+1], the other input end of the first AND gate is configured to receive the single-multiplication indication signal SMI, and an output end of the first AND gate is configured to output the single-multiplication control signal SCi. The other input end of the second XOR gate is configured to receive the multi-multiplication indication signal MMI, and an output end of the second XOR gate is configured to output the second multi-multiplication control signal MCNi. The third bit a[i+1] is output as the control signal Si. One input end of the second AND gate and one input end of the third AND gate in the three AND gates are configured to receive the single-multiplication indication signal SMI, the other input end of the second AND gate is coupled to the output end of the first XOR gate, and an output end of the second AND gate is configured to output the first single-multiplication selection signal SM1Mi. The other input end of the third AND gate is coupled to the output end of the NOR gate, and an output end of the third AND gate is configured to output the second single-multiplication selection signal SM2Mi.

Further, the Q groups of fusion coders 402 may include a plurality of different coders. For example, the plurality of different coders may include the following 14 coders. The following separately describes logical functions and circuit structures of the plurality of different coders in detail.

The Q groups of fusion coders 402 include a first coder. As shown in (a) in FIG. 11, the first coder is configured to perform the following coding operation: setting a partial product p(i, k) to an inversion of the single-multiplication control signal SCi when both the first single-multiplication selection signal SM1Mi and a first bit KM in the second value are 1 or both the second single-multiplication selection signal SM2Mi and a second bit b[k−1] in the second value are 1; or setting a partial product p(i, k) to the single-multiplication control signal SCi when the first single-multiplication selection signal SM1Mi and a first bit b[k] in the second value are not both 1 and the second single-multiplication selection signal SM2Mi and a second bit b[k−1] in the second value are not both 1, where k is an integer greater than or equal to 1, and k is less than or equal to $m_2-1$.

Figure 11:
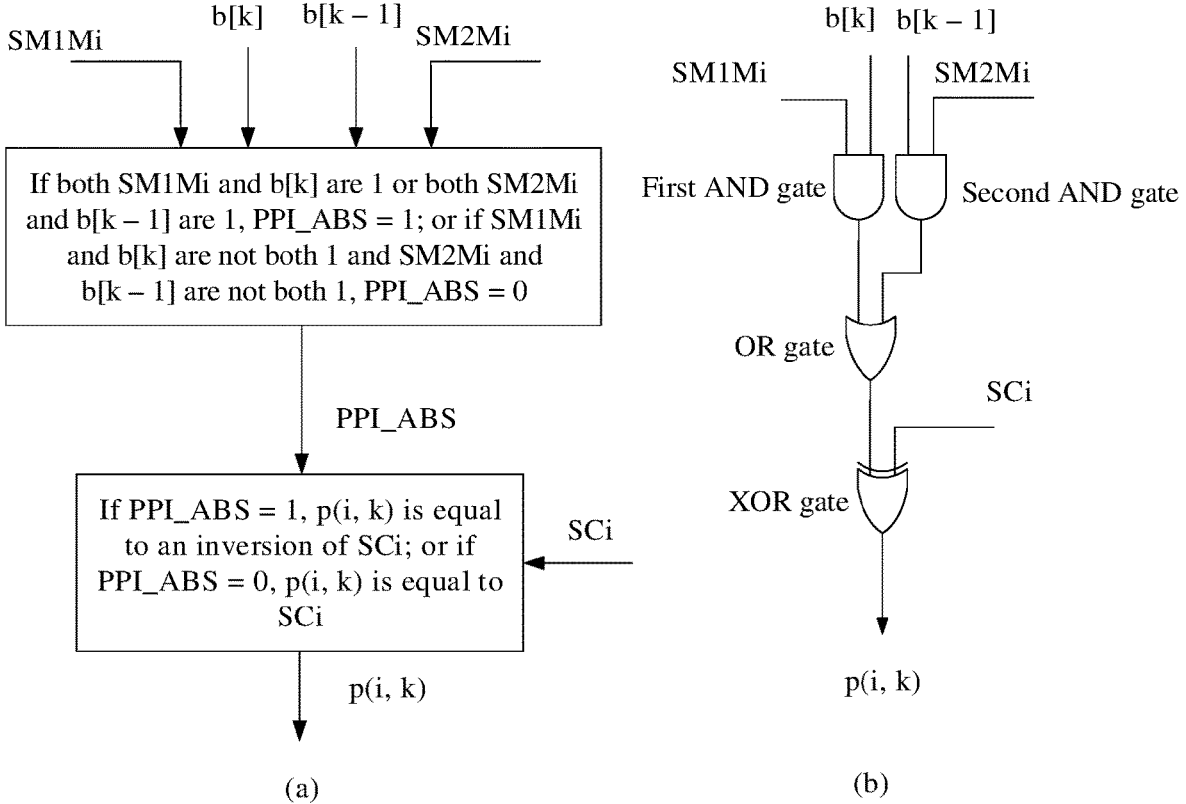

In a possible implementation, as shown in (b) in FIG. 11, the first coder includes two AND gates, an OR gate, and an XOR gate. Output ends of the two AND gates are separately connected to two input ends of the OR gate, and an output end of the OR gate is connected to one input end of the XOR gate. Two input ends of the two AND gates are configured to separately receive the first single-multiplication selection signal SM1Mi and the second single-multiplication selection signal SM2Mi, and the other two input ends of the two AND gates are configured to separately receive the first bit KM and the second bit b[k−1]. The other input end of the XOR gate is configured to receive the single-multiplication control signal SCi, and an output end of the XOR gate is configured to output the partial product p(i, k).

The Q groups of fusion coders 402 further include a second coder. As shown in (a) in FIG. 12, the second coder is configured to perform the following coding operations: setting a first intermediate item to 1 when both the multi-multiplication indication signal MMI and the first bit b[k−1] in the second value are 1 or both the single-multiplication indication signal SMI and the second bit KM in the second value are 1; or setting a first intermediate item to 0 when the multi-multiplication indication signal MMI and the first bit b[k−1] in the second value are not both 1 and the single-multiplication indication signal SMI and the second bit KM in the second value are not both 1; setting a second intermediate item to 1 when both the first intermediate item and the first selection signal M1Mi are 1 or both the second selection signal M2Mi and the first bit b[k−1] are 1; or setting a second intermediate item to 0 when the first intermediate item and the first selection signal M1Mi are not both 1 and the second selection signal M2Mi and the first bit b[k−1] are not both 1; and setting an inversion of the second multi-multiplication control signal MCNi to a partial product p(i, k) when the second intermediate item is 1; or setting the second multi-multiplication control signal MCi to a partial product p(i, k) when the second intermediate item is 0.

Figure 12:
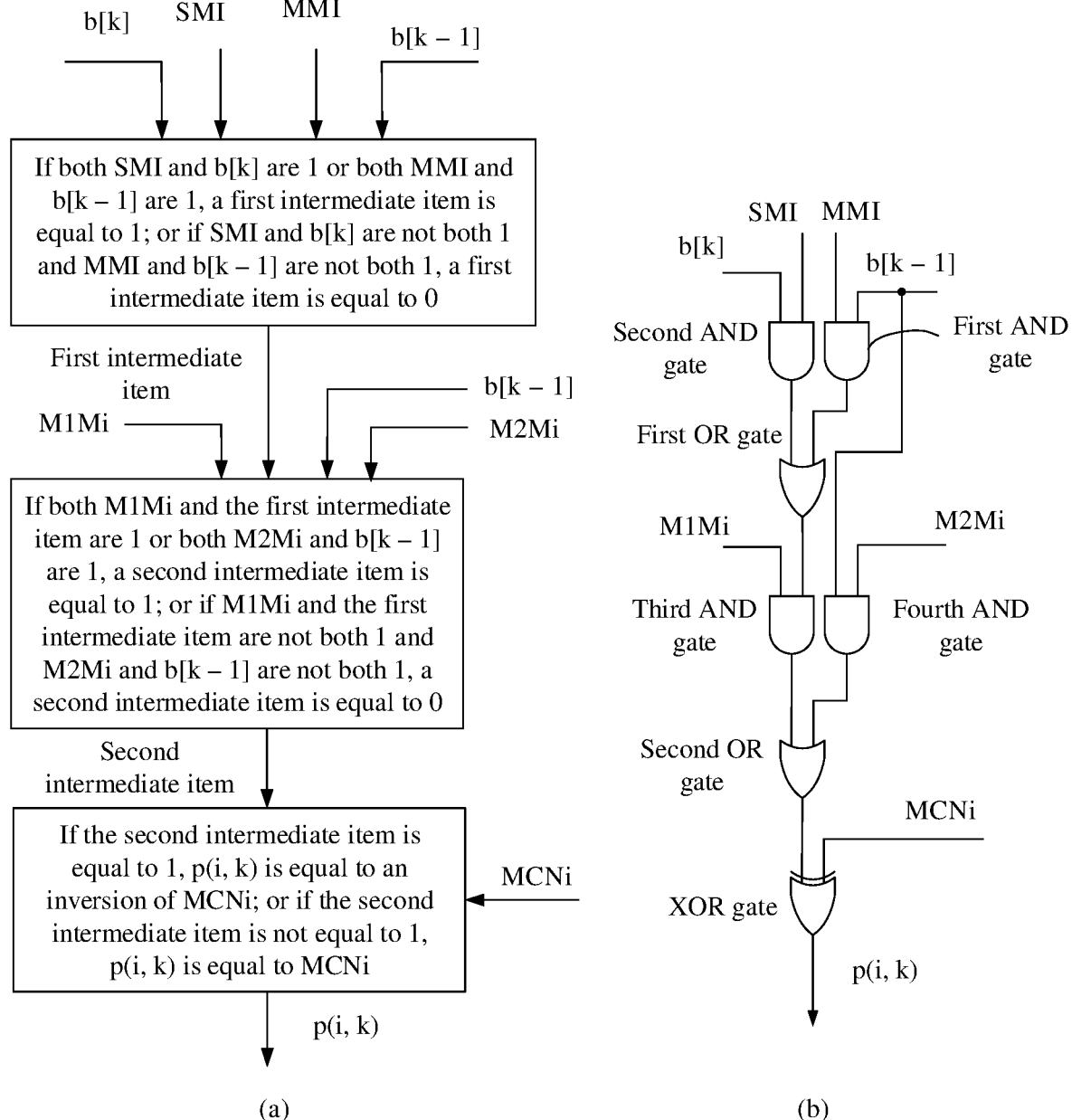

In a possible implementation, as shown in (b) in FIG. 12, the second coder includes four AND gates, two OR gates, and one XOR gate. An output end of the first AND gate and an output end of the second AND gate in the four AND gates are separately coupled to two input ends of the first OR gate in the two OR gates. An output end of the first OR gate is coupled to one input end of the third AND gate in the four AND gates. An output end of the fourth AND gate and an output end of the third AND gate in the four AND gates are coupled to two input ends of the second OR gate in the two OR gates. An output end of the second OR gate is coupled to one input end of the XOR gate. Two input ends of the first AND gate are separately configured to receive the first bit b[k−1] and the multi-multiplication indication signal MMI, two input ends of the second AND gate are separately configured to receive the second bit KM and the single-multiplication indication signal SMI, the other input end of the third AND gate is configured to receive the first selection signal M1Mi, and two input ends of the fourth AND gate are separately configured to receive the first bit b[k−1] and the second selection signal M2Mi. The other input end of the XOR gate is configured to receive the second multi-multiplication control signal MCNi, and an output end of the XOR gate is configured to output the partial product p(i, k).

The Q groups of fusion coders 402 further include a third coder. As shown in (a) in FIG. 13, the third coder is configured to perform the following coding operation: setting a partial product p(i, k) to an inversion of the single-multiplication control signal SCi when both the first single-multiplication selection signal SM1Mi and the first bit KM in the second value are 1; or setting a partial product p(i, k) to the single-multiplication control signal SCi when the first single-multiplication selection signal SM1Mi and the first bit KM in the second value are not both 1.

Figure 13:
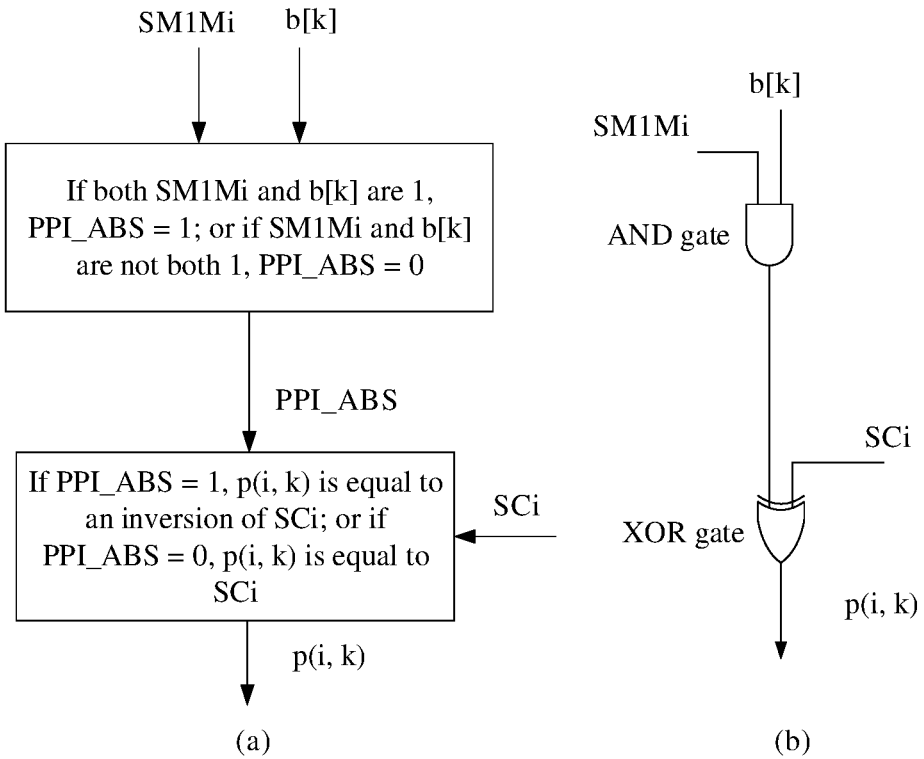

In a possible implementation, as shown in (b) in FIG. 13, the third coder includes one AND gate and one XOR gate. An output end of the AND gate is coupled to one input end of the XOR gate, two input ends of the AND gate are separately configured to receive the first single-multiplication selection signal SM1Mi and the first bit KM in the second value, the other input end of the XOR gate is configured to receive the single-multiplication control signal SCi, and an output end of the XOR gate is configured to output the partial product p(i, k).

The Q groups of fusion coders 402 further include a fourth coder. As shown in (a) in FIG. 14, the fourth coder is configured to perform the following coding operations: setting a first intermediate item to 1 when both the first single-multiplication selection signal SM1Mi and the first bit b[k] in the second value are 1 or both the second single-multiplication selection signal SM2Mi and the second bit b[k−1] in the second value are 1; or setting a first intermediate item to 0 when the first single-multiplication selection signal SM1Mi and the first bit KM in the second value are not both 1 and the second single-multiplication selection signal SM2Mi and the second bit b[k−1] in the second value are not both 1; setting a second intermediate item to an inversion of the single-multiplication control signal SCi when the first intermediate item is 1; or setting a second intermediate item to the single-multiplication control signal SCi when the first intermediate item is 0; and setting a partial product p(i, k) to 1 when the multi-multiplication indication signal MMI is 1; or setting a partial product p(i, k) to the second intermediate item when the multi-multiplication indication signal MMI is 0.

Figure 14:
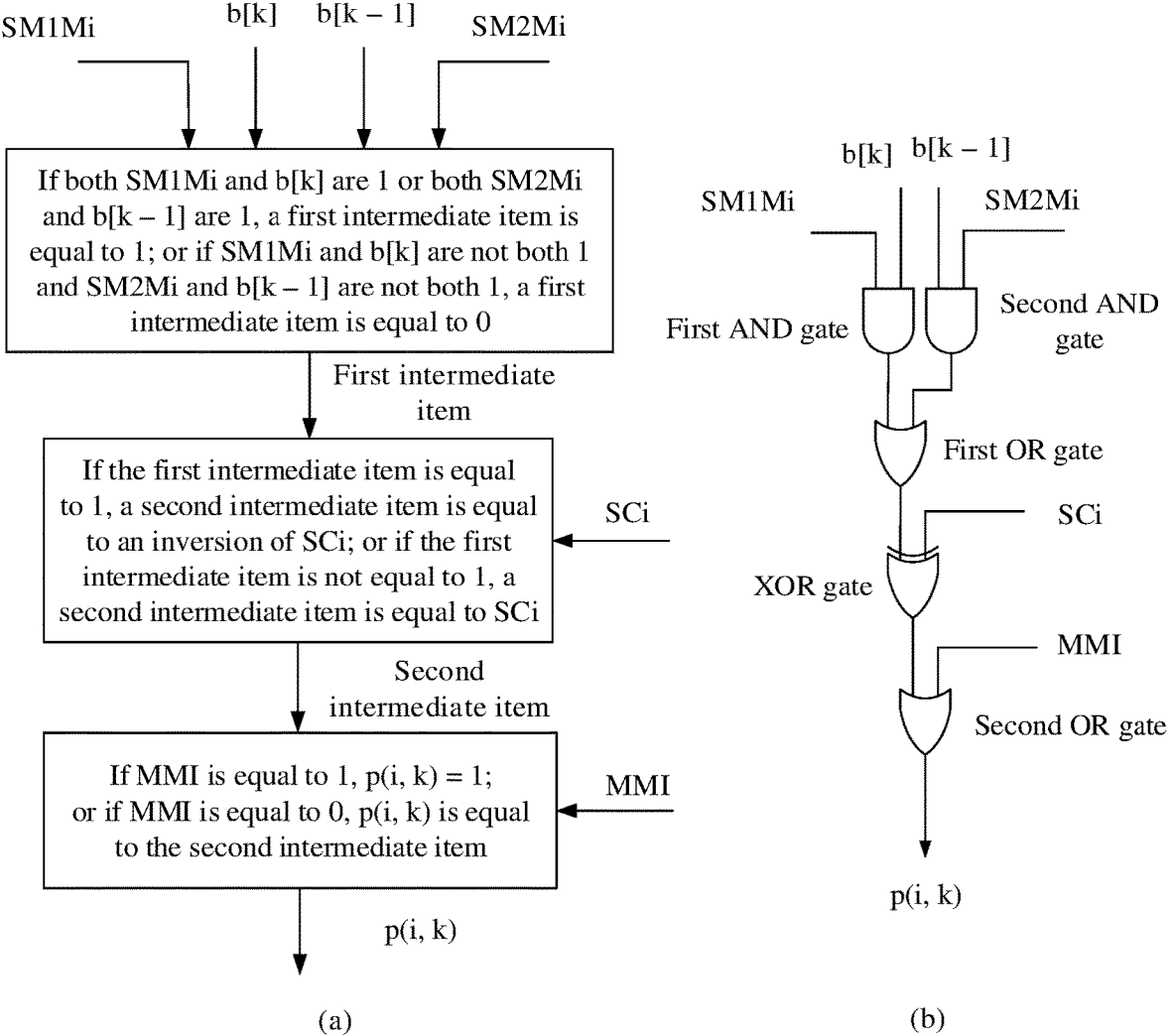

In a possible implementation, as shown in (b) FIG. 14, the fourth coder includes two AND gates, two OR gates, and one XOR gate. Output ends of the two AND gates are separately coupled to two input ends of the first OR gate in the two OR gates, an output end of the first OR gate is coupled to one input end of the XOR gate, and an output end of the XOR gate is coupled to one input end of the second OR gate in the two OR gates. Two input ends of the first AND gate in the two AND gates are separately configured to receive the first single-multiplication selection signal SM1Mi and the first bit b[k] in the second value, two input ends of the second AND gate in the two AND gates are separately configured to receive the second single-multiplication selection signal SM2Mi and the second bit b[k–1] in the second value, the other input end of the XOR gate is configured to receive the single-multiplication control signal SCi, and the other input end of the second OR gate is configured to receive the multi-multiplication indication signal MMI.

The Q groups of fusion coders 402 further include a fifth coder. As shown in (a) in FIG. 15, the fifth coder is configured to perform the following coding operation: setting a partial product p(i, k) to the single-multiplication control signal SCi when both the first single-multiplication selection signal SM1Mi and the first bit b[k] in the second value are 1 or both the second single-multiplication selection signal SM2Mi and the first bit b[k] in the second value are 1; or setting a partial product p(i, k) to an inversion of the single-multiplication control signal SCi when the first single-multiplication selection signal SM1Mi and the first bit b[k] in the second value are not both 1 and the second single-multiplication selection signal SM2Mi and the first bit KM in the second value are not both 1.

Figure 15:
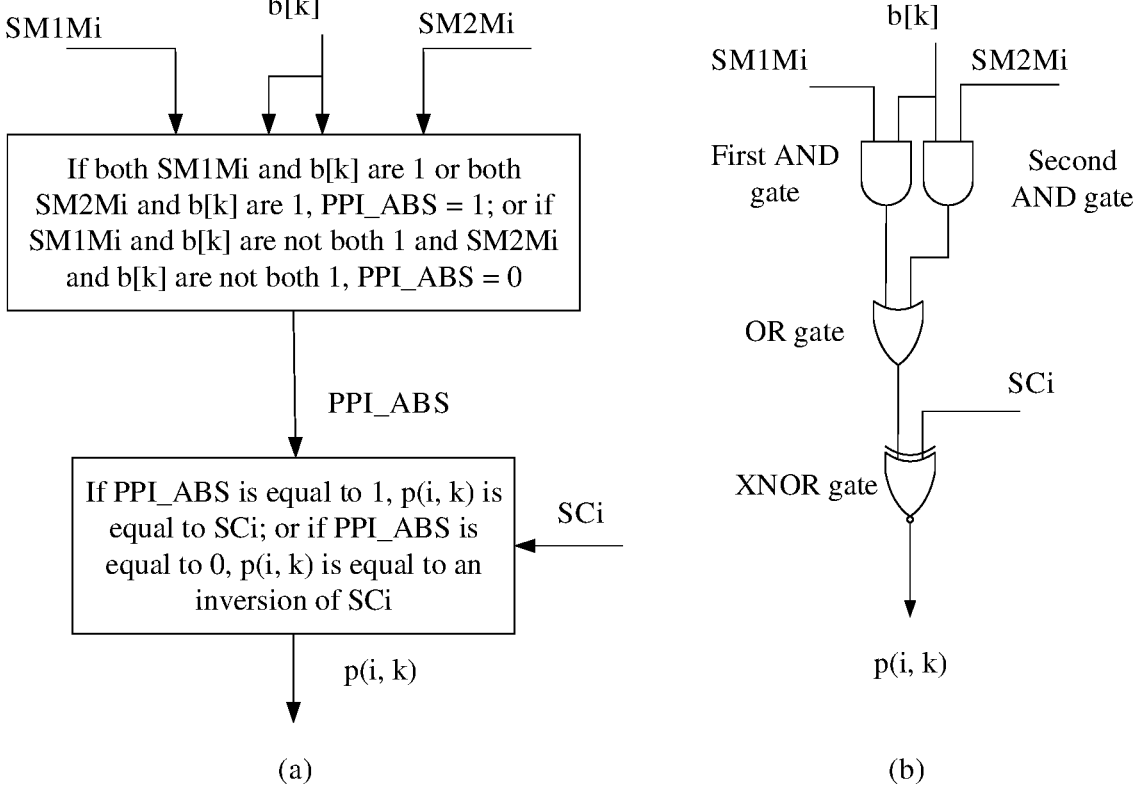

In a possible implementation, as shown in (b) in FIG. 15, the fifth coder includes two AND gates, one OR gate, and one XNOR gate. Output ends of the two AND gates are separately coupled to two input ends of the OR gate, and an output end of the OR gate is coupled to one input end of the XNOR gate. Two input ends of the first AND gate in the two AND gates are separately configured to receive the first single-multiplication selection signal SM1Mi and the first bit KM in the second value, two input ends of the second AND gate in the two AND gates are separately configured to receive the second single-multiplication selection signal SM2Mi and the first bit KM in the second value, the other input end of the XNOR gate is configured to receive the single-multiplication control signal SCi, and an output end of the XNOR gate is configured to output the partial product p(i, k).

The Q groups of fusion coders 402 further include a sixth coder. As shown in (a) in FIG. 16, the sixth coder is configured to perform the following coding operation: setting a partial product p(i, k) to an inversion of the control signal Si when both the first selection signal M1Mi and the first bit KM in the second value are 1 or both the second selection signal M2Mi and the first bit KM in the second value are 1; or setting a partial product p(i, k) to the control signal Si when the first selection signal M1Mi and the first bit b[k] in the second value are not both 1 and the second selection signal M2Mi and the first bit b[k] in the second value are not both 1.

Figure 16:
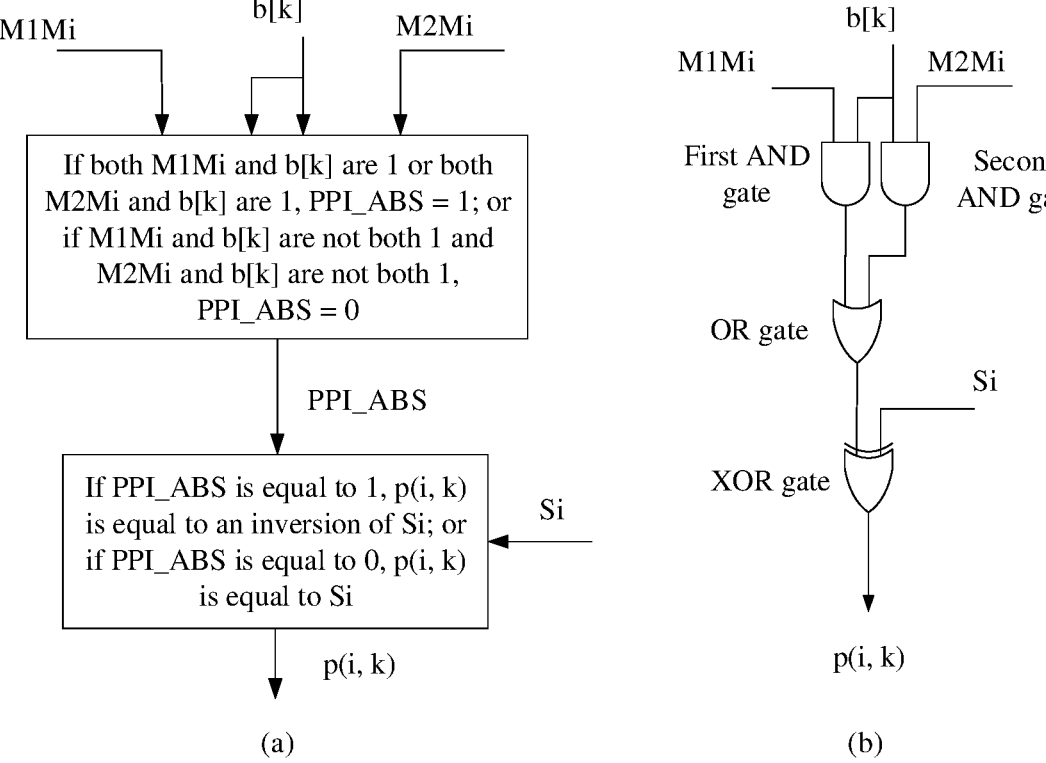

In a possible implementation, as shown in (b) in FIG. 16, the sixth coder includes two AND gates, one OR gate, and one XOR gate. Output ends of the two AND gates are separately coupled to two input ends of the OR gate, and an output end of the OR gate is coupled to one input end of the XOR gate. Two input ends of the first AND gate in the two AND gates are separately configured to receive the first selection signal M1Mi and the first bit KM in the second value, two input ends of the second AND gate in the two AND gates are separately configured to receive the second selection signal M2Mi and the first bit KM in the second value, the other input end of the XOR gate is configured to receive the control signal Si, and an output end of the XOR gate is configured to output the partial product p(i, k).

The Q groups of fusion coders 402 further include a seventh coder. As shown in (a) in FIG. 17, the seventh coder is configured to perform the following coding operations: setting a first intermediate item to 1 when both the first single-multiplication selection signal SM1Mi and the first bit b[k] in the second value are 1 or both the second single-multiplication selection signal SM2Mi and the first bit b[k] in the second value are 1; or setting a first intermediate item to 0 when the first single-multiplication selection signal SM1Mi and the first bit b[k] in the second value are not both 1 and the second single-multiplication selection signal SM2Mi and the first bit b[k] in the second value are not both 1; setting a second intermediate item to an inversion of the single-multiplication control signal SCi when the first intermediate item is 1; or setting a second intermediate item to the single-multiplication control signal SCi when the first intermediate item is 0; and setting a partial product p(i, k) to the second intermediate item when the single-multiplication indication signal SMI is 1; or setting a partial product p(i, k) to 0 when the single-multiplication indication signal SMI is 0.

Figure 17:
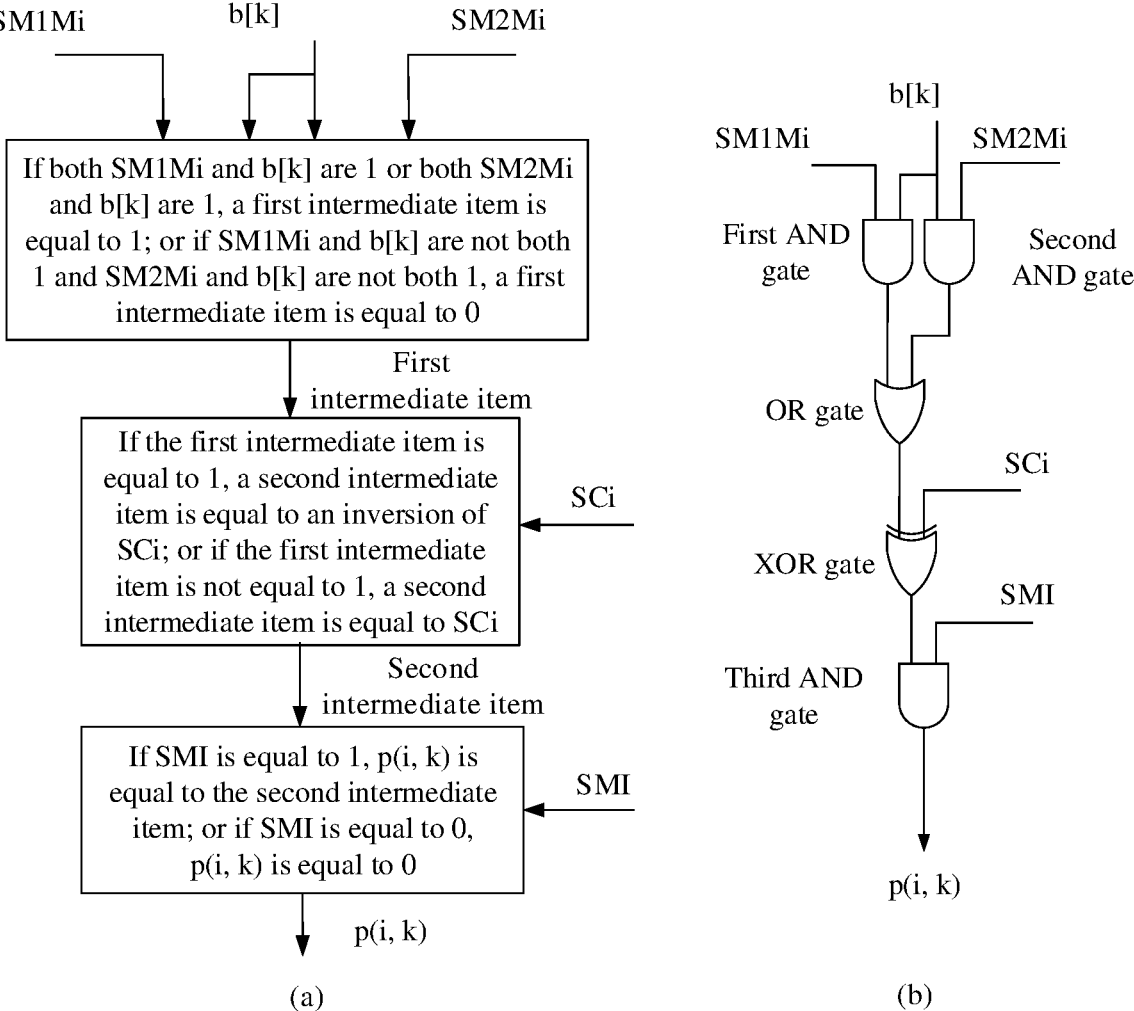

In a possible implementation, as shown in (b) in FIG. 17, the seventh coder includes three AND gates, one OR gate, and one XOR gate. An output end of the first AND gate and an output end of the second AND gate in the three AND gates are separately coupled to two input ends of the OR gate, an output end of the OR gate is coupled to one input end of the XOR gate, and an output end of the XOR gate is coupled to one input end of the third AND gate in the three AND gates. Two input ends of the first AND gate are separately configured to receive the first single-multiplication selection signal SM1Mi and the first bit b[k] in the second value, two input ends of the second AND gate are separately configured to receive the second single-multiplication selection signal SM2Mi and the first bit b[k] in the second value, the other input end of the XOR gate is configured to receive the single-multiplication control signal SCi, and the other input end of the third AND gate is configured to receive the single-multiplication indication signal SMI.

The Q groups of fusion coders 402 further include an eighth coder. As shown in (a) in FIG. 18, the eighth coder is configured to perform the following coding operations: setting a first intermediate item to 1 when both the first single-multiplication selection signal SM1Mi and the first bit b[k] in the second value are 1 or both the second single-multiplication selection signal SM2Mi and the first bit b[k] in the second value are 1; or setting a first intermediate item to 0 when the first single-multiplication selection signal SM1Mi and the first bit b[k] in the second value are not both 1 and the second single-multiplication selection signal SM2Mi and the first bit b[k] in the second value are not both 1; setting a second intermediate item to an inversion of the single-multiplication control signal SCi when the first intermediate item is 1; or setting a second intermediate item to the single-multiplication control signal SCi when the first intermediate item is 0; and setting a partial product p(i, k) to the second intermediate item when the single-multiplication indication signal SMI is 1; or setting a partial product p(i, k) to an inversion of the second intermediate item when the single-multiplication indication signal SMI is 0.

In a possible implementation, as shown in (b) in FIG. 18, the eighth coder includes two AND gates, one OR gate, one XOR gate, and one XNOR gate. Two output ends of the two AND gates are separately coupled to two input ends of the OR gate, an output end of the OR gate is coupled to one input end of the XOR gate, and an output end of the XOR gate is coupled to one input end of the XNOR gate. Two input ends of the first AND gate in the two AND gates are separately configured to receive the first single-multiplication selection signal SM1Mi and the first bit KM in the second value, two input ends of the second AND gate in the two AND gates are separately configured to receive the second single-multiplication selection signal SM2Mi and the first bit KM in the second value, the other input end of the XOR gate is configured to receive the single-multiplication control signal SCi, the other input end of the XNOR gate is configured to receive the single-multiplication indication signal SMI, and an output end of the XNOR gate is configured to output the partial product p(i, k).

The Q groups of fusion coders 402 further include a ninth coder. As shown in (a) in FIG. 19, the ninth coder is configured to perform the following coding operations: setting a first intermediate item to 1 when both the first single-multiplication selection signal SM1Mi and the first bit KM in the second value are 1 or both the second single-multiplication selection signal SM2Mi and the second bit b[k−1] in the second value are 1; or setting a first intermediate item to 0 when the first single-multiplication selection signal SM1Mi and the first bit KM in the second value are not both 1 and the second single-multiplication selection signal SM2Mi and the second bit b[k−1] in the second value are not both 1; setting a second intermediate item to an inversion of the single-multiplication control signal SCi when the first intermediate item is 1; or setting a second intermediate item to the single-multiplication control signal SCi when the first intermediate item is 0; and setting a partial product p(i, k) to 1 when the first multi-multiplication control signal MCi is 1; or setting a partial product p(i, k) to the second intermediate item when the first multi-multiplication control signal MCi is 0.

In a possible implementation, as shown in (b) in FIG. 19, the ninth coder includes two AND gates, two OR gates, and one XOR gate. Output ends of the two AND gates are separately coupled to two input ends of the first OR gate in the two OR gates, an output end of the first OR gate is coupled to one input end of the XOR gate, and an output end of the XOR gate is coupled to one input end of the second OR gate in the two OR gates. Two input ends of the first AND gate in the two AND gates are separately configured to receive the first single-multiplication selection signal SM1Mi and the first bit KM in the second value, two input ends of the second AND gate in the two AND gates are separately configured to receive the second single-multiplication selection signal SM2Mi and the second bit b[k−1] in the second value, the other input end of the XOR gate is configured to receive the single-multiplication control signal SCi, the other input end of the second OR gate is configured to receive the first multi-multiplication control signal MCi, and an output end of the second OR gate is configured to output the partial product p(i, k).

The Q groups of fusion coders 402 further include a tenth coder. As shown in (a) in FIG. 20, the tenth coder is configured to perform the following coding operations: setting a first intermediate item to 1 when both the multi-multiplication indication signal MMI and the first bit b[k−1] in the second value are 1 or both the single-multiplication indication signal SMI and the second bit KM in the second value are 1; or setting a first intermediate item to 0 when the multi-multiplication indication signal MMI and the first bit b[k−1] in the second value are not both 1 and the single-multiplication indication signal SMI and the second bit KM in the second value are not both 1; setting a second intermediate item to 1 when both the first intermediate item and the first selection signal M1Mi are 1 or both the second selection signal M2Mi and the first bit b[k−1] are 1; or setting a second intermediate item to 0 when the first intermediate item and the first selection signal M1Mi are not both 1 and the second selection signal M2Mi and the first bit b[k−1] are not both 1; setting a third intermediate item to an inversion of the second multi-multiplication control signal MCNi when the second intermediate item is 1; or setting a third intermediate item to the second multi-multiplication control signal MCNi when the second intermediate item is 0; and setting a partial product p(i, k) to an inversion of the third intermediate item when the multi-multiplication indication signal MMI is 1; or setting a partial product p(i, k) to the third intermediate item when the multi-multiplication indication signal MMI is 0.

Figure 20:
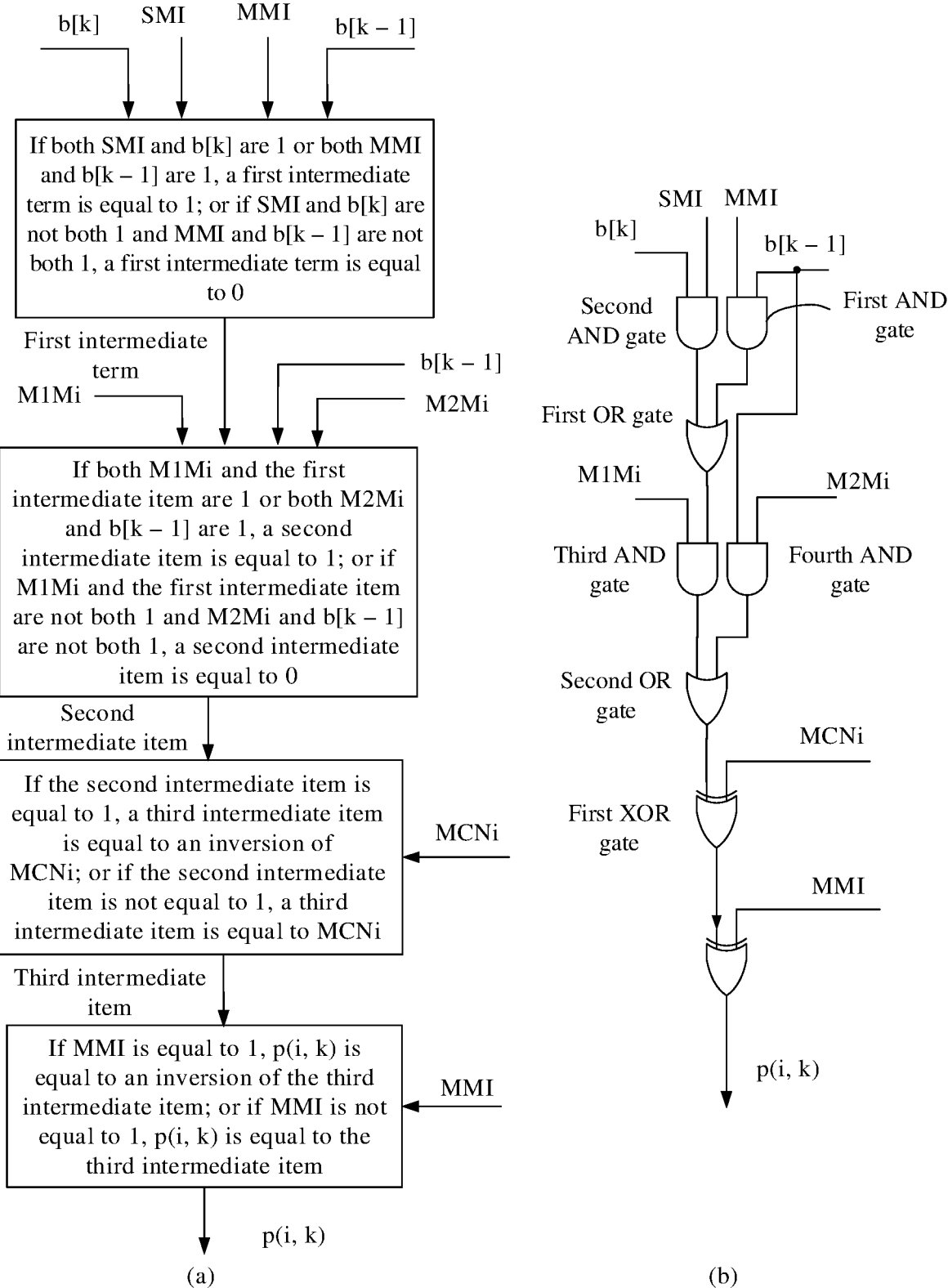

In a possible implementation, as shown in (b) in FIG. 20, the tenth coder includes four AND gates, two OR gates, and two XOR gates. An output end of the first AND gate and an output end of the second AND gate in the four AND gates are separately coupled to two input ends of the first OR gate in the two OR gates. An output end of the first OR gate is coupled to one input end of the third AND gate in the four AND gates. An output end of the fourth AND gate and an output end of the third AND gate in the four AND gates are separately coupled to two input ends of the second OR gate in the two OR gates. An output end of the second OR gate is coupled to one input end of the first XOR gate in the two XOR gates. An output end of the first OR gate is coupled to one input end of the second XOR gate in the two XOR gates. Two input ends of the first AND gate are configured to receive the multi-multiplication indication signal MMI and the first bit b[k−1], two input ends of the second AND gate are configured to receive the single-multiplication indication signal SMI and the second bit b[k], the other input end of the third AND gate is configured to receive the first selection signal M1Mi, and two input ends of the fourth AND gate are separately configured to receive the first bit b[k−1] and the second selection signal M2Mi. The other input end of the first XOR gate is configured to receive the second multi-multiplication control signal MCNi, and the other input end of the second XOR gate is configured to receive the multi-multiplication indication signal MMI.

The Q groups of fusion coders 402 further include an eleventh coder. The eleventh coder is configured to perform the following coding operation: setting a partial product p(i, k) to 1 when the single-multiplication indication signal SMI is 1; or setting a partial product p(i, k) to 0 when the single-multiplication indication signal SMI is 0. In a possible implementation, the eleventh coder includes an AND gate. Two input ends of the AND gate are separately configured to receive the single-multiplication indication signal SMI and 1, and an output end of the AND gate is configured to output the partial product p(i, k).

The Q groups of fusion coders 402 further include a twelfth coder. The twelfth coder is configured to perform the following coding operation: setting s(i, 0) to the control signal Si when the single-multiplication indication signal SMI is 1; or setting s(i, 0) to 0 when the single-multiplication indication signal SMI is 0. In a possible implementation, the twelfth coder includes an AND gate. Two input ends of the AND gate are separately configured to receive the single-multiplication indication signal SMI and the control signal Si, and an output end of the AND gate is configured to output s(i, 0).

The Q groups of fusion coders 402 further include a thirteenth coder. The thirteenth coder is configured to perform the following coding operation: setting s(0, k) to the control signal Si when the multi-multiplication indication signal MMI is 1; or setting s(0, k) to 0 when the multi-multiplication indication signal MMI is 0. In a possible implementation, the thirteenth coder includes an AND gate. Two input ends of the AND gate are separately configured to receive the multi-multiplication indication signal MMI and the control signal Si, and an output end of the AND gate is configured to output s(0, k).

The Q groups of fusion coders 402 further include a fourteenth coder. The fourteenth coder is configured to perform the following coding operation: setting a partial product item Q(0, 1) to 1 when the multi-multiplication indication signal MMI is 1; or setting s(0, k) to 0 when the multi-multiplication indication signal MMI is 0. In a possible implementation, the fourteenth coder includes an AND gate. Two input ends of the AND gate are separately configured to receive the multi-multiplication indication signal MMI and 1, and an output end of the AND gate is configured to output Q(0, 1).

For ease of understanding, the following separately describes structures of the multiplier in embodiments of this application with reference to the single-double fusion multiplier shown in FIG. 5 and the single-four fusion multiplier shown in FIG. 6.

Figure 21:
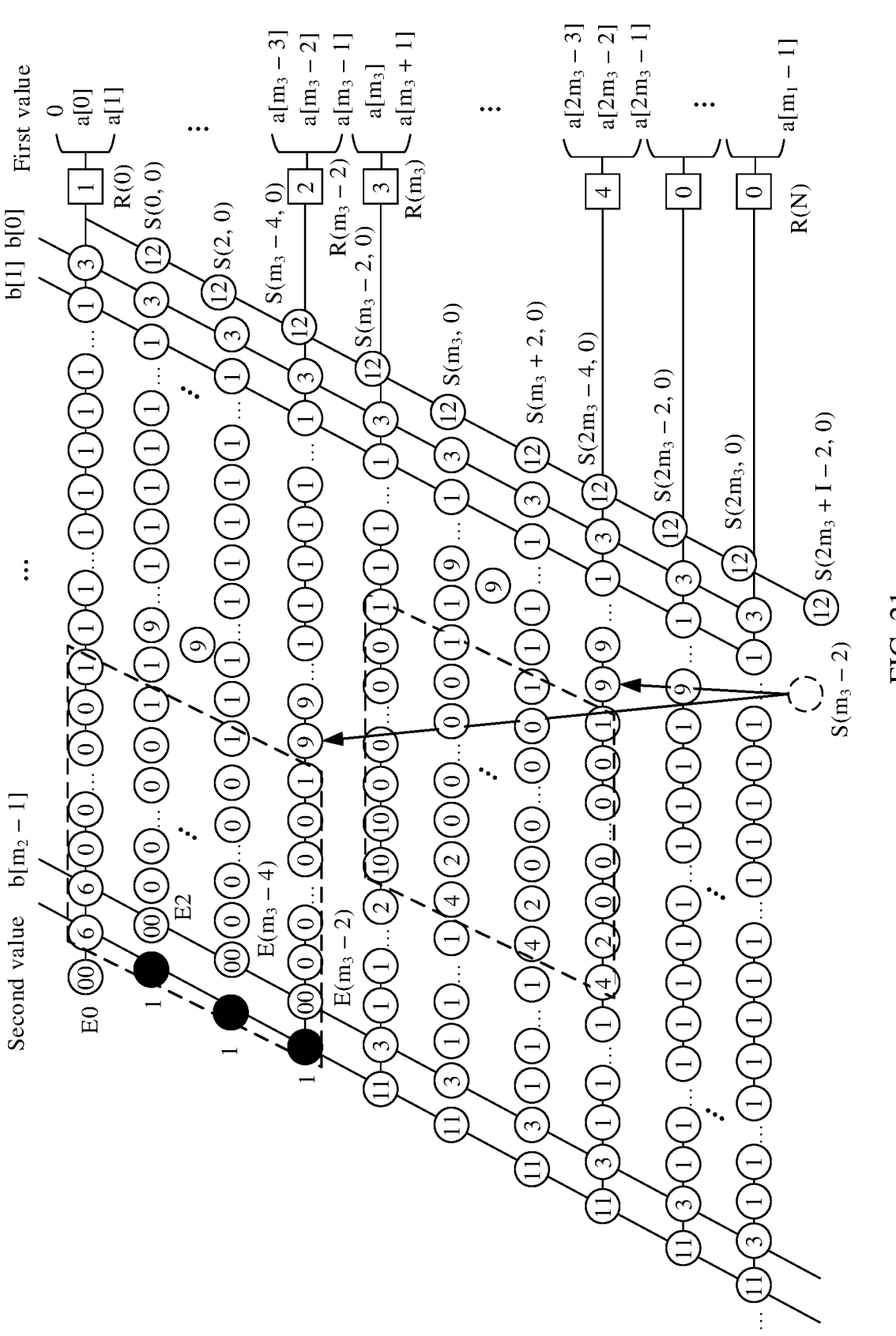
FIG. 21 is a schematic diagram of a structure of a single-double fusion multiplier according to an embodiment of this application.

With reference to FIG. 5, FIG. 21 is a schematic diagram of a structure of a single-double fusion multiplier according to an embodiment of this application. In FIG. 21, each hollow circle is used to represent one coder, and a number in each hollow circle represents a type of the coder corresponding to the hollow circle. For example, if a number in a hollow circle is 1, it indicates that a coder corresponding to the hollow circle is the first coder. If a number in a circle is 0 or 00, it indicates that a coder corresponding to the circle is a standard coder in an existing multiplier. Each solid circle is used to represent a constant 1 or a sign bit (that is, E0, E2, or the like). Each quadrangle is used to represent one precoder, and a number in each quadrangle represents a type of the precoder corresponding to the rectangle. For example, if a number in a rectangle is 1, it indicates that a precoder corresponding to the quadrangle is the first-type precoder. It should be noted that a coder and a precoder in the other figures in this specification are represented in a manner similar to that in FIG. 21. Details are not described in embodiments of this application.

When the multiplier works in a double-multiplication mode, the first value is a value obtained by arranging two pieces of $A0[m_3-1:0]$ in a sequence from a low digit weight to a high digit weight or a value obtained after the value obtained through arrangement is filled with sign bits, and the second value is a value obtained by arranging two pieces of $B0[m_4-1:0]$ in a sequence from a high digit weight to a low digit weight or a value obtained after the value obtained through arrangement is filled with invalid bits. Specifically, if the two pieces of $A0[m_3-1:0]$ are represented as $A1[m_3-1:0]$ and $A2[m_3-1:0]$, $A1[m_3-1:0]$ is mapped to the $(m_3-1)^{th}$ digit weight to the $0^{th}$ digit weight (which correspond to $A[m_3-1:0]$ in the single-multiplication operation) of the first value, and $A2[m_3-1:0]$ is mapped to the $(2m_3-1)^{th}$ digit weight to the $(m_3)^{th}$ digit weight (which correspond to $A[2m_3-1:m_3]$ in the single-multiplication operation) of the first value. If the two pieces of $B0[m_4-1:0]$ are represented as $B1[m_4-1:0]$ and $B2[m_4-1:0]$, $B1[m_4-1:0]$ is mapped to the $(2m_4+J-1)^{th}$ digit weight to the $(m_4+J)^{th}$ digit weight (which correspond to $B[2m4+J-1:m_4+J]$ in the single-multiplication operation) of the second value, and $B2[m_4-1:0]$ is mapped to the $(m_4+J-1)^{th}$ digit weight to the $J^{th}$ digit weight (which correspond to $B[2m_4+J-1:J]$ in the single-multiplication operation) of the second value.

In addition, when the multiplier works in the double-multiplication mode, number points (which may also be referred to as partial products) corresponding to two binary multiplications $A0[m_3-1:0] \times B0[m_4-1:0]$ may form two rhombic arrays. The two rhombic arrays are mapped to a number point array in a single-multiplication mode from top to bottom according to a left-alignment principle. The two rhombic arrays may be specifically shown in FIG. 21. Optionally, when I<2, a number point $S(m_3-2)$ arranged at the lower right side of the rhombic array in the double-multiplication mode cannot be mapped to a rhombic array in the single-multiplication mode, and a vertical depth of number points in such a column is reduced through decomposition and equivalent exchange, that is, $S(m_3-2)$ is removed. Two equal number points $p(m_3-2, m_4+J-1)\_S$ $(m_3-2)$ and $p(2m_3-2, J-1)\_S(m_3-2)$ are added at right adjacent digit weights, and $S(m_3-2)$ is a number point $S(m_3-2, 0)$ in the double-multiplication mode.

In addition, when the multiplier works in the double-multiplication mode, input of an $(m_3-2)^{th}$ precoder is $A1[m_3-3], A1[m_3-2]$, and $A1[m_3-1]$, that is, the input of the $(m_3-2)^{th}$ precoder is bits on first three high digit weights in $A1[m_3-1:0]$; and input of an $(m_3)^{th}$ precoder is 0, A2[0], and A2[1], that is, the input of the $(m_3)^{th}$ precoder is bits on last two low digit weights in $A2[m_3-1:0]$.

Optionally, when the multiplier works in the double-multiplication mode or the single-multiplication mode, if number points generated through sign bit extension in an operation process in the two modes are constants 1, the constants 1 may be added in advance, and then a sum is mapped to a number point in the single-multiplication mode.

In FIG. 21, input and/or output of the P precoders 401 and the Q groups of fusion coders 402 are/is controlled, so that the multiplier can be enabled to work in the single-multiplication mode or the double-multiplication mode. When the multiplier works in the single-multiplication mode, the P precoders 401 and the Q groups of fusion coders 402 may be configured to code the first value and the second value in the single-multiplication mode. When the multiplier works in the double-multiplication mode, the P precoders 401 and the Q groups of fusion coders 402 may be configured to code the first value and the second value in the double-multiplication mode.

Figure 22:
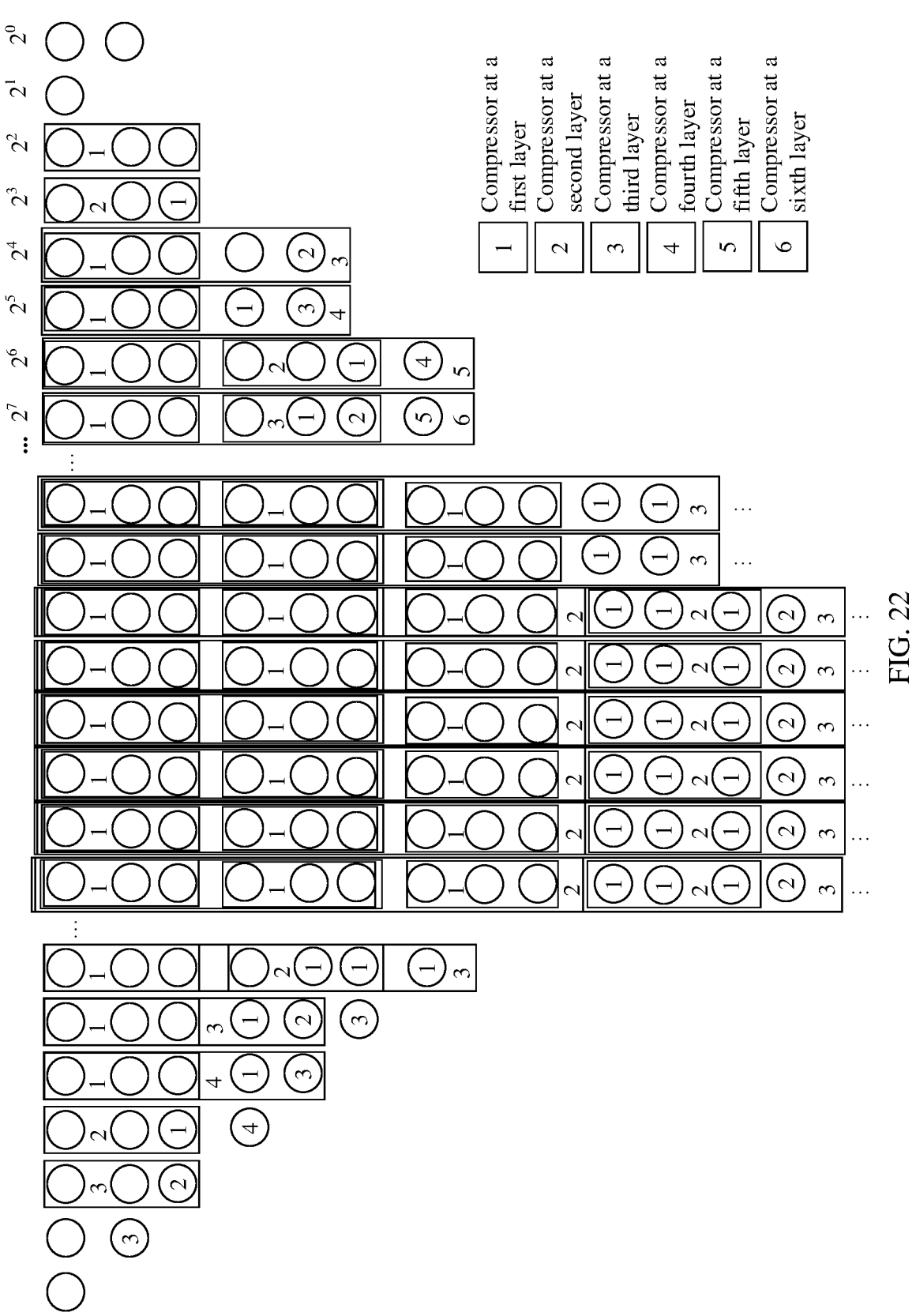
FIG. 22 is a schematic diagram of a structure of a compressor according to an embodiment of this application.

FIG. 22 is a schematic diagram of a structure of a compressor 403 of a single-double fusion multiplier according to an embodiment of this application. Each circle in the figure represents one partial product or carry output bit. A circle with no number represents a partial product. A circle with a number represents a carry output bit and the number in the circle represents a carry output bit that is output by a compressor with a corresponding layer number. A rectangle in the figure represents a compressor, and a number in the rectangle represents a layer number of the compressor. It should be noted that a compressor in the other figures in this specification is represented in a manner similar to that in FIG. 22. Details are not described in embodiments of this application.

$2^0, 2^1, 2^2, \ldots$, and $2^{m2}$ represent different digit weights. The digit weight is described with respect to an output result of the compressor 403, and is similar to ones, tens, or hundreds in a decimal system. The digit weight is used to represent a bit in a binary value of the output result. For example, if the output result of the compressor 403 is a 32-bit binary number, the output result includes 32 digit weights. A bit corresponding to the digit weight corresponds to 0 or 1, and represents one piece of binary information. It may be considered that one digit weight is one bit in the output result of the compressor 403.

Figure 23:
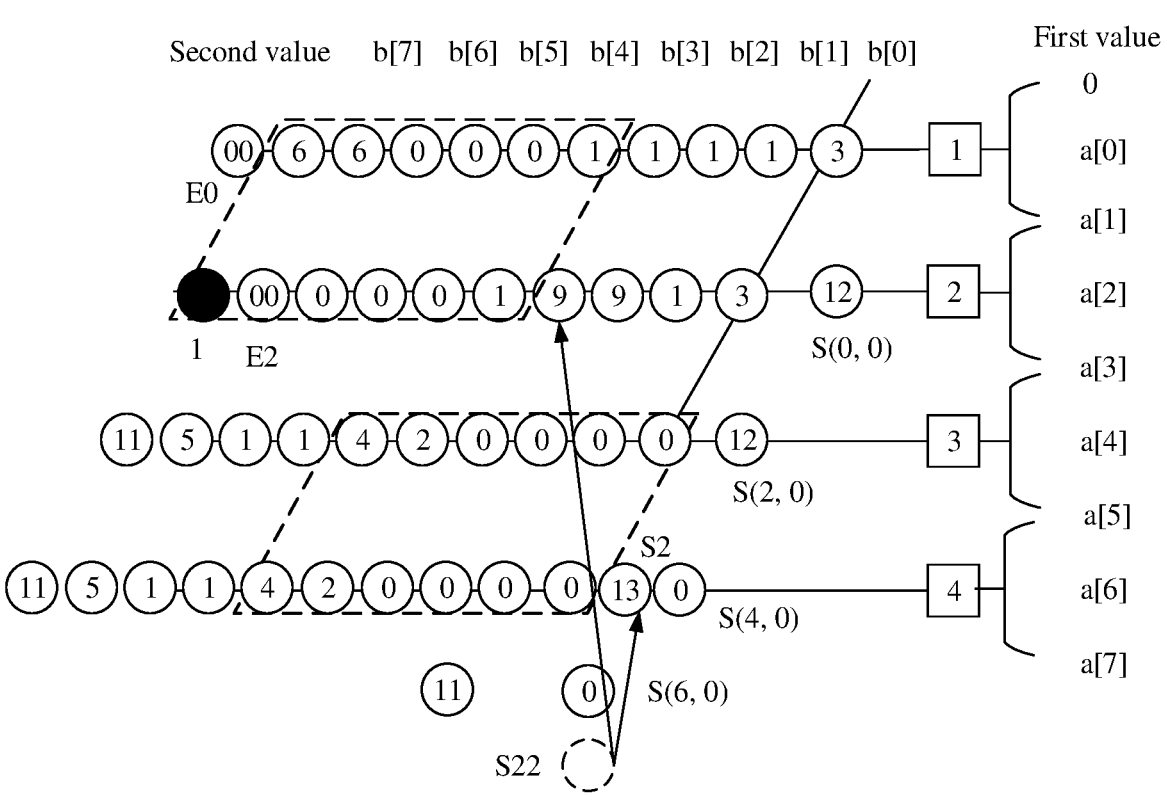
FIG. 23 is a schematic diagram of a structure of another single-double fusion multiplier according to an embodiment of this application.

For example, as shown in FIG. 23, the single-double fusion multiplier may be configured to implement a single-multiplication operation of 8 bits×8 bits (that is, A[7:0]×B [7:0]) or implement an accumulated sum operation of two pieces of 4 bits×4 bits (that is, two pieces of A0[3:0]×B0 [3:0]). For ease of description, the two pieces of A0[3:0] are represented as A1[3:0] and A2[3:0], and the two pieces of B0[3:0] are represented as B1[3:0] and B2[3:0].

When the multiplier is configured to perform the single-multiplication operation, the first value is A[7:0], and the second value is B[7:0]. When the multiplier is configured to perform the accumulated sum operation, A1 [3:0] is mapped to the third digit weight to the $0^{th}$ digit weight (which correspond to A[3:0] in the single-multiplication operation) of the first value, and A2[3:0] is mapped to the seventh digit weight to the fourth digit weight (which correspond to A[7:4] in the single-multiplication operation) of the first value. When the multiplier is configured to perform the accumulated sum operation, B1[3:0] is mapped to the seventh digit weight to the fourth digit weight (which correspond to B[7:4] in the single-multiplication operation) of the second value, and B2[3:0] is mapped to the third digit weight to the $0^{th}$ digit weight (which correspond to B[3:0] in the single-multiplication operation) of the second value.

Figure 24:
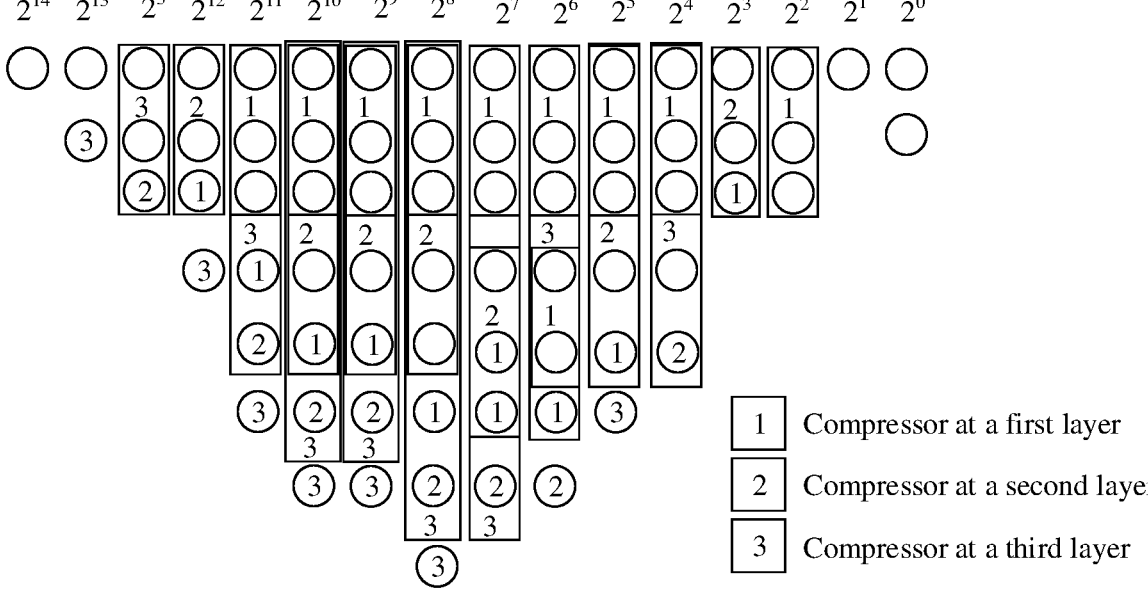
FIG. 24 is a schematic diagram of a structure of another compressor according to an embodiment of this application.

In FIG. 23, when the multiplier works in the double-multiplication mode, number points corresponding to two pieces of 4 bits×4 bits may form two rhombic arrays. The two rhombic arrays are mapped to a number point array in a single-multiplication mode from top to bottom according to a left-alignment principle. The two rhombic arrays may be specifically shown in FIG. 23. Optionally, a number point S22 arranged at the lower right side of the rhombic array in the double-multiplication mode cannot be mapped to a rhombic array in the single-multiplication mode, and a vertical depth of number points in such a column may be reduced through decomposition and equivalent exchange, that is, S22 may be removed. Two equal number points p(2, 3)_S2 and S2 are added at right adjacent digit weights. FIG. 24 is a schematic diagram of a structure of a compressor 403 in the single-double fusion multiplier corresponding to FIG. 23. S22 is a number point S(2, 0) in the double-multiplication mode.

In addition, when the multiplier works in the double-multiplication mode, input of a second precoder R(2) is A1[1], A1[2], and A1[3], and input of a fourth precoder R(4) is 0, A2[0], and A2[1]. Input and/or output of the precoders and the coders 402 are/is controlled, so that the multiplier can be enabled to work in the single-multiplication mode or the double-multiplication mode.

Figure 25:
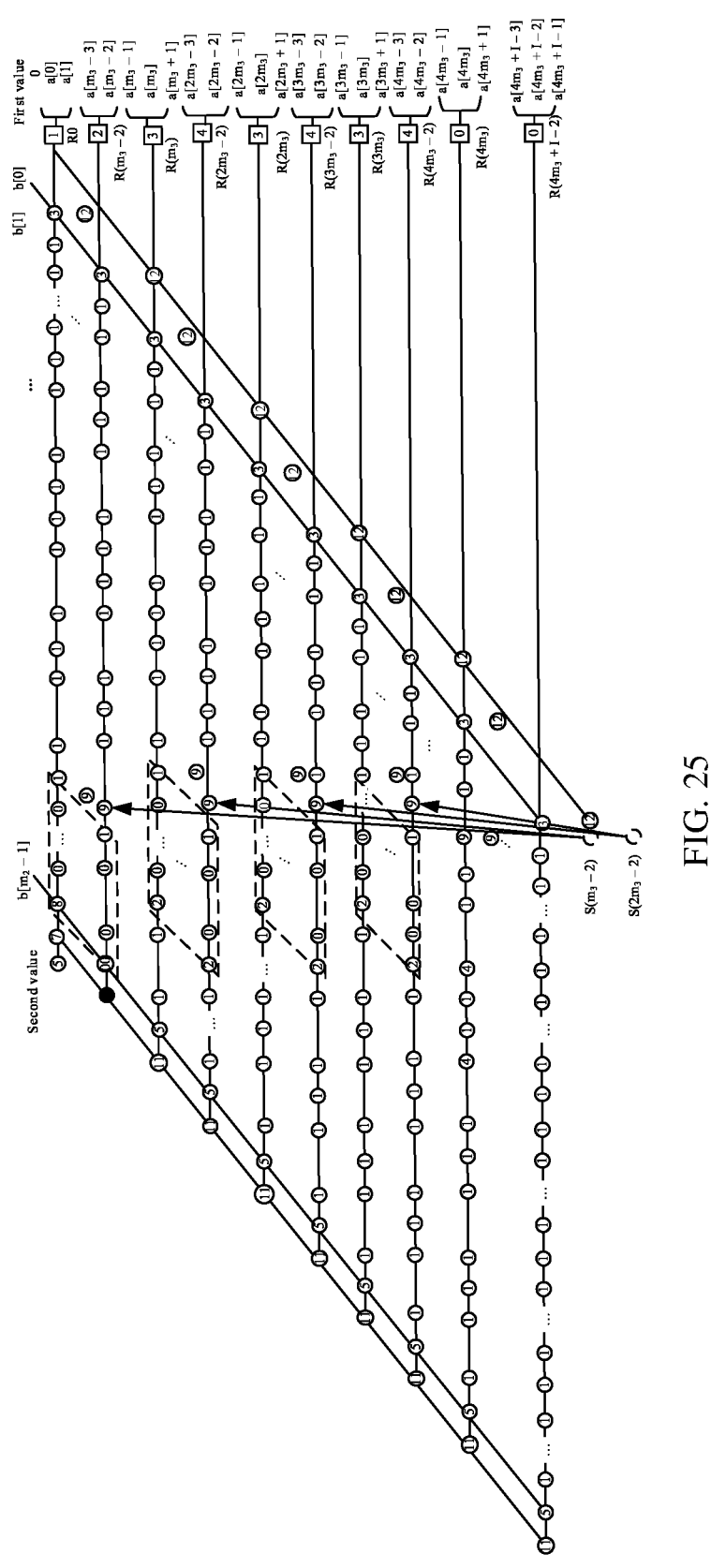
FIG. 25 is a schematic diagram of a structure of a single-four fusion multiplier according to an embodiment of this application.

With reference to FIG. 6, FIG. 25 is a schematic diagram of a structure of a single-four fusion multiplier according to an embodiment of this application. In FIG. 25, each circle is used to represent one coder, and a number in each circle represents a type of the coder corresponding to the circle. For example, if a number in a circle is 1, it indicates that a coder corresponding to the circle is the first coder. If a number in a circle is 0, it indicates that a coder corresponding to the circle is a standard coder in an existing multiplier. Each quadrangle is used to represent one precoder, and a number in each quadrangle represents a type of the precoder corresponding to the quadrangle. For example, if a number in a quadrangle is 1, it indicates that a precoder corresponding to the quadrangle is the first-type precoder. If a number in a quadrangle is 0, it indicates that a precoder corresponding to the quadrangle is a standard precoder in an existing multiplier.

When the multiplier works in a four-multiplication mode, the first value is a value obtained by arranging four pieces of A0[$m_3$−1:0] in a sequence from a low digit weight to a high digit weight or a value obtained after the value obtained through arrangement is filled with sign bits, and the second value is a value obtained by arranging four pieces of B0[$m_4$−1:0] in a sequence from a high digit weight to a low digit weight or a value obtained after the value obtained through arrangement is filled with invalid bits.

Specifically, if the four pieces of A0[$m_3$−1:0] are represented as A1[$m_3$−1:0], A2[$m_3$−1:0], A3[$m_3$−1:0], and A4[$m_3$−1:0], A1[$m_3$−1:0] is mapped to the $(m_3−1)^{th}$ digit weight to the $0^{th}$ digit weight (which correspond to A[$m_3$−1:0] in the single-multiplication operation) of the first value, A2[$m_3$−1:0] is mapped to the $(2m_3−1)^{th}$ digit weight to the $(m_3)$th digit weight (which correspond to A[$2m_3$−1:$m_3$] in the single-multiplication operation) of the first value, A3[$m_3$−1:0] is mapped to the $(3m_3−1)^{th}$ digit weight to the $(2m_3)$th digit weight (which correspond to A[$3m_3$−1:$2m_3$] in the single-multiplication operation) of the first value, and A4[$m_3$−1:0] is mapped to the $(4m_3−1)^{th}$ digit weight to the $(3m_3)^{th}$ digit weight (which correspond to A[$4m_3$−1:$3m_3$] in the single-multiplication operation) of the first value. If the four pieces of B0[$m_4$−1:0] are represented as B1[$m_4$−1:0], B2[$m_4$−1:0], B3[$m_4$−1:0], and B4[$m_4$−1:0], B1[$m_4$−1:0] is mapped to the $(4m_4+J−1)^{th}$ digit weight to the $(3m_4+J)^{th}$ digit weight (which correspond to B[$4m_4$+J−1:$3m_4$+J] in the single-multiplication operation) of the second value, B2[$m_4$−1:0] is mapped to the $(3m_4+J−1)^{th}$ digit weight to the $(2m_4+J)^{th}$ digit weight (which correspond to B[$3m_4$+J−1:$2m_4$+J] in the single-multiplication operation) of the second value, B3[$m_4$−1:0] is mapped to the $(2m_4+J−1)^{th}$ digit weight to the $(m_4+J)^{th}$ digit weight (which correspond to B[$2m_4$+J−1:$m_4$+J] in the single-multiplication operation) of the second value, and B4[$m_4$−1:0] is mapped to the $(m_4+J−1)^{th}$ digit weight to the $J^{th}$ digit weight (which correspond to B[$m_4$+J−1:J] in the single-multiplication operation) of the second value.

In addition, when the multiplier works in the four-multiplication mode, number points (which may also be referred to as partial products) corresponding to four binary multiplications A0[$m_3$−1:0]×B0[$m_4$−1:0] may form four rhombic arrays. The four rhombic arrays are mapped to a number point array in a single-multiplication mode from top to bottom according to a left-alignment principle. The four rhombic arrays may be specifically shown in FIG. 25. Optionally, when I<2, number points S($m_3$−2) and S($2m_3$−2) arranged at the lower right side of the rhombic arrays in the four-multiplication mode cannot be mapped to a rhombic array in the single-multiplication mode, and a vertical depth of number points in such a column is reduced through decomposition and equivalent exchange. S($m_3$−2) is a number point S($m_3$−2, 0) in the four-multiplication mode, and S($2m_3$−2) is a number point S($2m_3$−2, 0) in the four-multiplication mode. For S($m_3$−2), S($m_3$−2) is removed, and two equal number points p($m_3$−2, $3m_4$+J−1)_S($m_3$−2) and p($2m_3$−2, $2m_4$+J−1)_S($m_3$−2) are added at right adjacent digit weights. For S($2m_3$−2), S($2m_3$−2) is removed, and two equal number points p($3m_3$−2, $m_4$+J−1)_S($2m_3$−2) and p($4m_3$−2, J−1)_S($2m_3$−2) are added at right adjacent digit weights.

In addition, when the multiplier works in the four-multiplication mode, input of an $(m_3−2)^{th}$ precoder is A1[$m_3$−3], A1[$m_3$−2], and A1[$m_3$−1]; input of an $(m_3)^{th}$ precoder is 0, A2[0], and A2[1]; input of a $(2m_3-2)^{th}$ precoder is A2[$m_3-$3], A2[$m_3-2$], and A2[$m_3-1$]; input of a $(2m_3)^{th}$ precoder is 0, A3[0], and A3[1]; input of a $(3m_3-2)^{th}$ precoder is A3[$m_3-3$], A3[$m_3-2$], and A3[$m_3-1$]; and input of a $(3m_3)^{th}$ precoder is 0, A4[0], and A4[1].

Optionally, when the multiplier works in the four-multiplication mode or the single-multiplication mode, if number points generated through sign bit extension in an operation process in the two modes are constants 1, the constants 1 may be added in advance, and then a sum is mapped to a number point in the single-multiplication mode.

In FIG. 25, input and/or output of the P precoders 401 and the Q groups of fusion coders 402 are/is controlled, so that the multiplier can be enabled to work in the single-multiplication mode or the four-multiplication mode. When the multiplier works in the single-multiplication mode, the P precoders 401 and the Q groups of fusion coders 402 may be configured to code the first value and the second value in the single-multiplication mode. When the multiplier works in the four-multiplication mode, the P precoders 401 and the Q groups of fusion coders 402 may be configured to code the first value and the second value in the four-multiplication mode.

Figure 26:
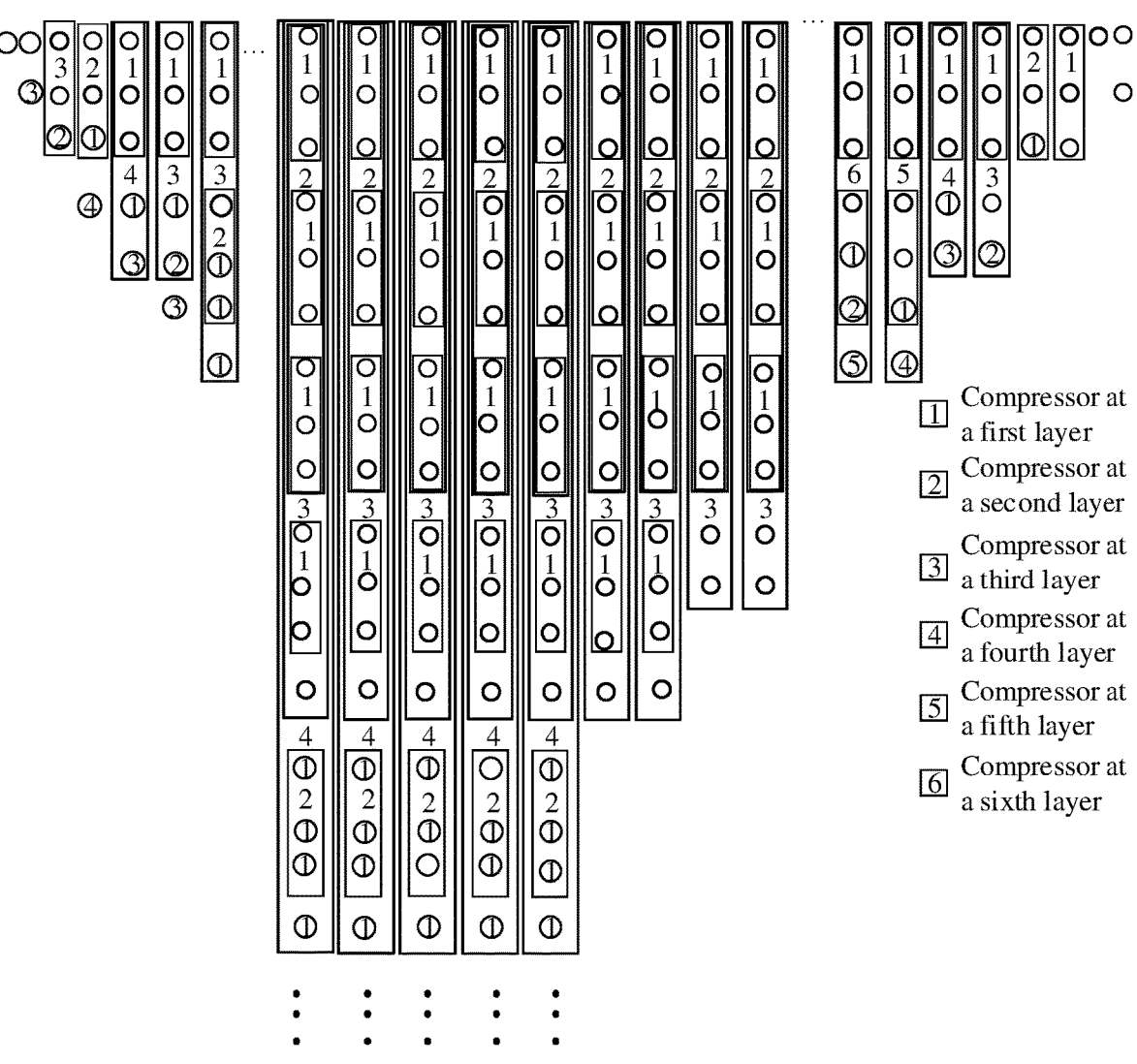
FIG. 26 is a schematic diagram of a structure of still another compressor according to an embodiment of this application.

FIG. 26 is a schematic diagram of a structure of a compressor 403 of a single-four fusion multiplier according to an embodiment of this application. Each circle in the figure represents one partial product, and a number in the circle may be used to represent a type of a coder that outputs the partial product. A rectangle in the figure represents a compressor, and a number in the rectangle represents a layer number of the compressor. $2^2, 2^1, 2^2, \ldots$, and $2^{m2}$ represent different digit weights. The digit weight is described with respect to an output result of the compressor 403, and is similar to ones, tens, or hundreds in a decimal system. The digit weight is used to represent a bit in a binary value of the output result. For example, if the output result of the compressor 403 is a 32-bit binary number, the output result includes 32 digit weights. A bit corresponding to the digit weight corresponds to 0 or 1, and represents one piece of binary information. It may be considered that one digit weight is one bit in the output result of the compressor 403.

In embodiments of this application, the Q groups of fusion coders 402 may all be configured to code a value in the single-multiplication operation or the multi-multiplication accumulated sum operation, and output the plurality of partial products to the compressor 403. The compressor 403 may be configured to compress the plurality of partial products corresponding to the single-multiplication operation or the multi-multiplication accumulated sum operation to obtain the two accumulated values. Finally, the adder 404 calculates the sum of the two accumulated values to obtain the result of the single-multiplication operation or the accumulated sum operation. Therefore, compared with a multiplier that supports two different multiplication modes in the conventional technology, the multiplier provided in embodiments of this application does not need to separately code and compress values in two different multiplication modes by using different coders or compressors, so that a quantity of coders required by the multiplier is reduced, operation duration is shortened, and power consumption of the multiplier is reduced.

According to another aspect of this application, a processor or a chip is further provided, and the processor or the chip includes a multiplier. The multiplier may include the multiplier, the precoder, the coder, or the like provided in any one of FIG. 3 to FIG. 26. Optionally, the processor includes a neural-network processing unit.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A multi-mode fusion multiplier, configured to receive inputs A[$m_1-1$:0] and B[$m_2-1$:0] or A0[$m_3-1$:0] and B0[$m_4-1$:0] and to perform a binary single-multiplication operation A[$m_1-1$:0]×B[$m_2-1$:0] or an accumulated sum operation of 2N binary multiplications A0[$m_3-1$:0]×B0[$m_4-1$:0], wherein $m_1 \geq 2N \times m3$, $m_2 \geq 2N \times m4$, N is a positive integer, the multi-mode fusion multiplier comprises P precoders, Q groups of fusion coders, and a compressor, and $m_1$, $m_2$, $m_3$, $m_4$, P, and Q are integers greater than 1;

the P precoders are configured to precode a first value based on a single-multiplication indication signal or a multi-multiplication indication signal, to provide a precoding result, wherein the first value is A[$m_1-1$:0] when the single-multiplication indication signal indicates that the single-multiplication operation is performed, or the first value comprises 2N pieces of A0[$m_3-1$:0] when the multi-multiplication indication signal indicates that the accumulated sum operation is performed, wherein the 2N pieces of A0[$m_3-1$:0] are arranged in a sequence from a low digit weight to a high digit weight;

the Q groups of fusion coders are configured to code the precoding result and a second value, to provide a plurality of partial products, wherein the second value is B[$m_2-1$:0] when the single-multiplication indication signal indicates that the single-multiplication operation is performed, or the second value comprises 2N pieces of B0[$m_4-1$:0] when the multi-multiplication indication signal indicates that the accumulated sum operation is performed, wherein the 2N pieces of B0[$m_4-1$:0] are arranged in a sequence from a high digit weight to a low digit weight; and the compressor is configured to compress the plurality of partial products, to provide two accumulated values, wherein a sum of the two accumulated values is a result of the single-multiplication operation or the accumulated sum operation.

2. The multi-mode fusion multiplier according to claim 1, wherein when $m_1 > 2N \times m_3$, first ($m_1-2N \times m_3$) high digit weights in the first value comprise sign bits; and/or when $m_2 > 2N \times m_4$, last ($m_2-2N \times m_4$) low digit weights in the second value comprise invalid bits.

3. The multi-mode fusion multiplier according to claim 1, wherein the P precoders comprise an $i^{th}$ precoder, configured to:

determine an $i^{th}$ group of selection signals, an $i^{th}$ group of single-multiplication selection signals, a single-multiplication control signal SCi, and a first multi-multiplication control signal MCi in the precoding result based on the single-multiplication indication signal, the multi-multiplication indication signal, and at least two bits in the first value when i is an even number and $0 \leq i \leq N \times m_3-1$; or determine the $i^{th}$ group of selection signals, the $i^{th}$ group of single-multiplication selection signals, the single-multiplication control signal SCi, a second multi-multiplication control signal MCNi, and a control signal Si in the precoding result based on the single-multiplication indication signal, the multi-multiplication indication signal, and at least two bits in the first value when i is an even number and $N \times m_3 \leq i \leq m_1 - 1$, wherein the $i^{th}$ group of selection signals comprises a first selection signal M1Mi and a second selection signal M2Mi, and the $i^{th}$ group of single-multiplication selection signals comprises a first single-multiplication selection signal SM1Mi and a second single-multiplication selection signal SM2Mi.

4. The multi-mode fusion multiplier according to claim 3, wherein when i is equal to 0, the at least two bits of the first value comprise a first bit a[0] and a second bit a[1] in the first value; and the $0^{th}$ precoder is configured to perform coding operations comprising:

setting the first selection signal M1Mi to the first bit a[0];

setting the second selection signal M2Mi to 1 when the first bit a[0] is 0 and the second bit a[1] is 1, or setting the second selection signal M2Mi to 0 when the first bit a[0] is not 0 or the second bit a[1] is not 1;

setting the single-multiplication control signal SCi to the second bit a[1] when the single-multiplication indication signal is 1, or setting the single-multiplication control signal SC0 to 0 when the single-multiplication indication signal is 0;

setting the first multi-multiplication control signal MCi to the second bit a[1] when the multi-multiplication indication signal is 1, or setting the first multi-multiplication control signal MCi to 0 when the multi-multiplication indication signal is 0; and setting the first single-multiplication selection signal SM1Mi to the first bit a[0] and setting the second single-multiplication selection signal SM2Mi to the second selection signal M2Mi when the single-multiplication indication signal is 1, or setting both the first single-multiplication selection signal SM1Mi and the second single-multiplication selection signal SM2Mi to 0 when the single-multiplication indication signal is 0.

5. The multi-mode fusion multiplier according to claim 3, wherein when $0 < i \leq N \times m_3 - 1$, the at least two bits of the first value comprise a first bit a[i−1], a second bit a[i], and a third bit a[i+1] in the first value; and the $i^{th}$ precoder is configured to perform coding operations comprising:

setting the first selection signal M1Mi to 1 when the first bit a[i−1] is not equal to the second bit a[i], or setting the first selection signal M1Mi to 0 when the first bit a[i−1] is equal to the second bit a[i];

setting the second selection signal M2Mi to 1 when the first bit a[i−1] is equal to the second bit a[i] and the second bit a[i] is not equal to the third bit a[i+1], or setting the second selection signal M2Mi to 0 when the first bit a[i−1] is not equal to the second bit a[i] or the second bit a[i] is equal to the third bit a[i+1];

setting the single-multiplication control signal SCi to the third bit a[i+1] when the single-multiplication indication signal is 1, or setting the single-multiplication control signal SCi to 0 when the single-multiplication indication signal is 0;

setting the first multi-multiplication control signal MCi to the third bit a[i+1] when the multi-multiplication indication signal is 1, or setting the first multi-multiplication control signal MCi to 0 when the multi-multiplication indication signal is 0; and setting the first single-multiplication selection signal SM1Mi to the first selection signal M1Mi and setting the second single-multiplication selection signal SM2Mi to the second selection signal M2Mi when the single-multiplication indication signal is 1, or setting both the first single-multiplication selection signal SM1Mi and the second single-multiplication selection signal SM2Mi to 0 when the single-multiplication indication signal is 0.

6. The multi-mode fusion multiplier according to claim 3, wherein when i is equal to $N \times m_3$, the at least two bits of the first value comprise a first bit a[i−1], a second bit a[i], and a third bit a[i+1] in the first value; and the $(N \times m_3)^{th}$ precoder is configured to perform coding operations comprising:

setting a fourth bit to the first bit a[i−1] when the single-multiplication indication signal is 1, or setting a fourth bit to 0 when the single-multiplication indication signal is 0;

setting the first selection signal M1Mi to 1 when the fourth bit is not equal to the second bit a[i], or setting the first selection signal M1Mi to 0 when the fourth bit is equal to the second bit a[i];

setting the second selection signal M2Mi to 1 when the fourth bit is equal to the second bit a[i] and the second bit a[i] is not equal to the third bit a[i+1], or setting the second selection signal M2Mi to 0 when the fourth bit is not equal to the second bit a[i] or the second bit a[i] is equal to the third bit a[i+1];

setting the single-multiplication control signal SCi to the third bit a[i+1] when the single-multiplication indication signal is 1, or setting the single-multiplication control signal SCi to 0 when the single-multiplication indication signal is 0;

setting the second multi-multiplication control signal MCNi to 0 when the multi-multiplication indication signal is equal to the third bit a[i+1], or setting the second multi-multiplication control signal MCNi to 1 when the multi-multiplication indication signal is not equal to the third bit a[i+1];

setting the control signal Si to the third bit a[i+1]; and setting the first single-multiplication selection signal SM1Mi to the first selection signal M1Mi and setting the second single-multiplication selection signal SM2Mi to the second selection signal M2Mi when the single-multiplication indication signal is 1, or setting both the first single-multiplication selection signal SM1Mi and the second single-multiplication selection signal SM2Mi to 0 when the single-multiplication indication signal is 0.

7. The multi-mode fusion multiplier according to claim 3, wherein when $N \times m_3 < i < m_1 - 1$, the at least two bits of the first value comprise a first bit a[i−1], a second bit a[i], and a third bit a[i+1]; and the $i^{th}$ precoder is configured to perform coding operations comprising:

setting the first selection signal M1Mi to 1 when the first bit a[i−1] is not equal to the second bit a[i], or setting the first selection signal M1Mi to 0 when the first bit a[i−1] is equal to the second bit a[i];

setting the second selection signal M2Mi to 1 when the first bit a[i−1] is equal to the second bit a[i] and the second bit a[i] is not equal to the third bit a[i+1], or setting the second selection signal M2Mi to 0 when the first bit a[i−1] is not equal to the second bit a[i] or the second bit a[i] is equal to the third bit a[i+1];

setting the single-multiplication control signal SCi to the third bit a[i+1] when the single-multiplication indication signal is 1, or setting the single-multiplication control signal SCi to 0 when the single-multiplication indication signal is 0;

setting the second multi-multiplication control signal MCNi to 0 when the multi-multiplication indication signal is equal to the third bit a[i+1], or setting the second multi-multiplication control signal MCNi to 1 when the multi-multiplication indication signal is not equal to the third bit a[i+1];

setting the first single-multiplication selection signal SM1Mi to the first selection signal M1Mi and setting the second single-multiplication selection signal SM2Mi to the second selection signal M2Mi when the single-multiplication indication signal is 1, or setting both the first single-multiplication selection signal SM1Mi and the second single-multiplication selection signal SM2Mi to 0 when the single-multiplication indication signal is 0; and setting the control signal Si to the third bit a[i+1].

8. The multi-mode fusion multiplier according to claim 3, wherein the Q groups of fusion coders comprise a first coder configured to perform coding operation comprising:

setting a partial product p(i, k) to an inversion of the single-multiplication control signal SCi when both the first single-multiplication selection signal SM1Mi and a first bit b[k] in the second value are 1 or both the second single-multiplication selection signal SM2Mi and a second bit b[k−1] in the second value are 1; or setting a partial product p(i, k) to the single-multiplication control signal SCi when the first single-multiplication selection signal SM1Mi and a first bit b[k] in the second value are not both 1 and the second single-multiplication selection signal SM2Mi and a second bit b[k−1] in the second value are not both 1.

9. The multi-mode fusion multiplier according to claim 3, wherein the Q groups of fusion coders further comprise a second coder configured to perform coding operations comprising:

setting a first intermediate item to 1 when both the multi-multiplication indication signal and the first bit b[k−1] in the second value are 1 or both the single-multiplication indication signal and the second bit b[k] in the second value are 1, or setting a first intermediate item to 0 when the multi-multiplication indication signal and the first bit b[k−1] in the second value are not both 1 and the single-multiplication indication signal and the second bit b[k] in the second value are not both 1;

setting a second intermediate item to 1 when both the first intermediate item and the first selection signal M1Mi are 1 or both the second selection signal M2Mi and the first bit b[k−1] are 1, or setting a second intermediate item to 0 when the first intermediate item and the first selection signal M1Mi are not both 1 and the second selection signal M2Mi and the first bit b[k−1] are not both 1; and setting an inversion of the second multi-multiplication control signal MCNi to a partial product p(i, k) when the second intermediate item is 1, or setting the second multi-multiplication control signal MCNi to a partial product p(i, k) when the second intermediate item is 0.

10. The multi-mode fusion multiplier according to claim 3, wherein the Q groups of fusion coders further comprise a third coder configured to perform coding operation:

setting a partial product p(i, k) to an inversion of the single-multiplication control signal SCi when both the first single-multiplication selection signal SM1Mi and the first bit b[k] in the second value are 1; or setting a partial product p(i, k) to the single-multiplication control signal SCi when the first single-multiplication selection signal SM1Mi and the first bit b[k] in the second value are not both 1.

11. The multi-mode fusion multiplier according to claim 3, wherein the Q groups of fusion coders further comprise a fourth coder configured to perform coding operations comprising:

setting a first intermediate item to 1 when both the first single-multiplication selection signal SM1Mi and the first bit b[k] in the second value are 1 or both the second single-multiplication selection signal SM2Mi and the second bit b[k−1] in the second value are 1, or setting a first intermediate item to 0 when the first single-multiplication selection signal SM1Mi and the first bit b[k] in the second value are not both 1 and the second single-multiplication selection signal SM2Mi and the second bit b[k−1] in the second value are not both 1;

setting a second intermediate item to an inversion of the single-multiplication control signal SCi when the first intermediate item is 1, or setting a second intermediate item to the single-multiplication control signal SCi when the first intermediate item is 0; and setting a partial product p(i, k) to 1 when the multi-multiplication indication signal is 1, or setting a partial product p(i, k) to the second intermediate item when the multi-multiplication indication signal is 0.

12. The multi-mode fusion multiplier according to claim 3, wherein the Q groups of fusion coders further comprise a fifth coder configured to perform coding operation comprising:

setting a partial product p(i, k) to the single-multiplication control signal SCi when both the first single-multiplication selection signal SM1Mi and the first bit b[k] in the second value are 1 or both the second single-multiplication selection signal SM2Mi and the first bit b[k] in the second value are 1; or setting a partial product p(i, k) to an inversion of the single-multiplication control signal SCi when the first single-multiplication selection signal SM1Mi and the first bit b[k] in the second value are not both 1 and the second single-multiplication selection signal SM2Mi and the first bit b[k] in the second value are not both 1.

13. The multi-mode fusion multiplier according to claim 3, wherein the Q groups of fusion coders further comprise a sixth coder configured to perform coding operation comprising:

setting a partial product p(i, k) to an inversion of the control signal Si when both the first selection signal M1Mi and the first bit b[k] in the second value are 1 or both the second selection signal M2Mi and the first bit b[k] in the second value are 1; or setting a partial product p(i, k) to the control signal Si when the first selection signal M1Mi and the first bit b[k] in the second value are not both 1 and the second selection signal M2Mi and the first bit b[k] in the second value are not both 1.

14. The multi-mode fusion multiplier according to claim 3, wherein the Q groups of fusion coders further comprise a seventh coder configured to perform coding operations comprising:

setting a first intermediate item to 1 when both the first single-multiplication selection signal SM1Mi and the first bit b[k] in the second value are 1 or both the second single-multiplication selection signal SM2Mi and the first bit b[k] in the second value are 1, or setting a first intermediate item to 0 when the first single-multiplication selection signal SM1Mi and the first bit b[k] in the second value are not both 1 and the second single-multiplication selection signal SM2Mi and the first bit b[k] in the second value are not both 1;

setting a second intermediate item to an inversion of the single-multiplication control signal SCi when the first intermediate item is 1, or setting a second intermediate item to the single-multiplication control signal SCi when the first intermediate item is 0; and setting a partial product p(i, k) to the second intermediate item when the single-multiplication indication signal is 1, or setting a partial product p(i, k) to 0 when the single-multiplication indication signal is 0.

15. The multi-mode fusion multiplier according to claim 3, wherein the Q groups of fusion coders further comprise an eighth coder configured to perform coding operations comprising:

setting a first intermediate item to 1 when both the first single-multiplication selection signal SM1Mi and the first bit b[k] in the second value are 1 or both the second single-multiplication selection signal SM2Mi and the first bit b[k] in the second value are 1, or setting a first intermediate item to 0 when the first single-multiplication selection signal SM1Mi and the first bit b[k] in the second value are not both 1 and the second single-multiplication selection signal SM2Mi and the first bit b[k] in the second value are not both 1;

setting a second intermediate item to an inversion of the single-multiplication control signal SCi when the first intermediate item is 1, or setting a second intermediate item to the single-multiplication control signal SCi when the first intermediate item is 0; and setting a partial product p(i, k) to the second intermediate item when the single-multiplication indication signal is 1, or setting a partial product p(i, k) to an inversion of the second intermediate item when the single-multiplication indication signal is 0.

16. The multi-mode fusion multiplier according to claim 3, wherein the Q groups of fusion coders further comprise a ninth coder configured to perform coding operations comprising:

setting a first intermediate item to 1 when both the first single-multiplication selection signal SM1Mi and the first bit b[k] in the second value are 1 or both the second single-multiplication selection signal SM2Mi and the second bit b[k−1] in the second value are 1, or setting a first intermediate item to 0 when the first single-multiplication selection signal SM1Mi and the first bit b[k] in the second value are not both 1 and the second single-multiplication selection signal SM2Mi and the second bit b[k−1] in the second value are not both 1;

setting a second intermediate item to an inversion of the single-multiplication control signal SCi when the first intermediate item is 1, or setting a second intermediate item to the single-multiplication control signal SCi when the first intermediate item is 0; and setting a partial product p(i, k) to 1 when the first multi-multiplication control signal MCi is 1, or setting a partial product p(i, k) to the second intermediate item when the first multi-multiplication control signal MCi is 0.

17. The multi-mode fusion multiplier according to claim 3, wherein the Q groups of fusion coders further comprise a tenth coder configured to perform coding operations comprising:

setting a first intermediate item to 1 when both the multi-multiplication indication signal and the first bit b[k−1] in the second value are 1 or both the single-multiplication indication signal and the second bit b[k] in the second value are 1, or setting a first intermediate item to 0 when the multi-multiplication indication signal and the first bit b[k−1] in the second value are not both 1 and the single-multiplication indication signal and the second bit b[k] in the second value are not both 1;

setting a second intermediate item to 1 when both the first intermediate item and the first selection signal M1Mi are 1 or both the second selection signal M2Mi and the first bit b[k−1] are 1, or setting a second intermediate item to 0 when the first intermediate item and the first selection signal M1Mi are not both 1 and the second selection signal M2Mi and the first bit b[k−1] are not both 1;

setting a third intermediate item to an inversion of the second multi-multiplication control signal MCNi when the second intermediate item is 1, or setting a third intermediate item to the second multi-multiplication control signal MCNi when the second intermediate item is 0; and setting a partial product p(i, k) to an inversion of the third intermediate item when the multi-multiplication indication signal is 1, or setting a partial product p(i, k) to the third intermediate item when the multi-multiplication indication signal is 0.

18. A method performed by a multi-mode fusion multiplier comprising P precoders, Q groups of fusion coders, and a compressor, the method comprising:

receiving $A[m_1-1:0]$ and $B[m_2-1:0]$ as inputs to a binary single-multiplication operation $A[m_1-1:0] \times B[m_2-1:0]$ or an accumulated sum operation of 2N binary multiplications $A0[m3-1:0] \times B0[m_4-1:0]$, wherein $m_1 \geq 2N \times m_3$, $m_2 \geq 2N \times m_4$, N is a positive integer, and $m_1$, $m_2$, $m_3$, $m_4$, P, and Q are integers greater than 1;

precoding, by the P precoders of the multi-mode fusion multiplier, a first value based on a single-multiplication indication signal or a multi-multiplication indication signal, to provide a precoding result, wherein the first value is $A[m_1-1:0]$ when the single-multiplication indication signal indicates that the single-multiplication operation is performed, or the first value comprises 2N pieces of $A0[m_3-1:0]$ when the multi-multiplication indication signal indicates that the accumulated sum operation is performed, wherein the 2N pieces of $A0[m_3-1:0]$ are arranged in a sequence from a low digit weight to a high digit weight;

coding, by the Q groups of fusion coders of the multi-mode fusion multiplier, the precoding result and a second value, to provide a plurality of partial products, wherein the second value is $B[m_2-1:0]$ when the single-multiplication indication signal indicates that the single-multiplication operation is performed, or the second value comprises 2N pieces of $B0[m_4-1:0]$ when the multi-multiplication indication signal indicates that the accumulated sum operation is performed, wherein the 2N pieces of $B0[m_4-1:0]$ are arranged in a sequence from a high digit weight to a low digit weight; and compress, by the compressor, the plurality of partial products, to provide two accumulated values, wherein a sum of the two accumulated values is a result of the single-multiplication operation or the accumulated sum operation.

* * * * *